US012266042B2

(12) United States Patent
Kimura

(10) Patent No.: US 12,266,042 B2
(45) Date of Patent: Apr. 1, 2025

(54) IMAGE PROCESSING DEVICE AND IMAGE PROCESSING METHOD

(71) Applicant: SONY GROUP CORPORATION, Tokyo (JP)

(72) Inventor: Seiji Kimura, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 528 days.

(21) Appl. No.: 17/633,900

(22) PCT Filed: Jul. 20, 2020

(86) PCT No.: PCT/JP2020/028147
§ 371 (c)(1),
(2) Date: Feb. 8, 2022

(87) PCT Pub. No.: WO2021/033478
PCT Pub. Date: Feb. 25, 2021

(65) Prior Publication Data
US 2022/0292751 A1    Sep. 15, 2022

(30) Foreign Application Priority Data

Aug. 16, 2019 (JP) .................. 2019-149444
Oct. 25, 2019 (JP) .................. 2019-194517

(51) Int. Cl.
*G06T 13/40* (2011.01)
*G06T 17/00* (2006.01)
*G06V 40/16* (2022.01)

(52) U.S. Cl.
CPC .............. *G06T 13/40* (2013.01); *G06T 17/00* (2013.01); *G06V 40/168* (2022.01); *G06V 40/176* (2022.01)

(58) Field of Classification Search
None
See application file for complete search history.

(56) References Cited

U.S. PATENT DOCUMENTS

2015/0035825 A1* 2/2015 Zhou ................ G06T 7/251
345/419
2018/0197322 A1 7/2018 Sagar et al.

FOREIGN PATENT DOCUMENTS

CN     109978996 A      7/2019
JP     2014-211719 A   11/2014
(Continued)

OTHER PUBLICATIONS

P. Breuer, K.-I. Kim, W. Kienzle, B. Scholkopf and V. Blanz, "Automatic 3D face reconstruction from single images or video," 2008 8th IEEE International Conference on Automatic Face & Gesture Recognition, Amsterdam, Netherlands, 2008, pp. 1-8, doi: 10.1109/AFGR.2008.4813339. (Year: 2008).*

(Continued)

*Primary Examiner* — Peter Hoang
(74) *Attorney, Agent, or Firm* — CHIP LAW GROUP

(57) ABSTRACT

Provided are a device and method that enable highly accurate and efficient three-dimensional model generation processing. The device includes: a facial feature information detection unit that analyzes a facial image of a subject shot by an image capturing unit and detects facial feature information; an input data selection unit that selects, from a plurality of facial images shot by the image capturing unit and a plurality of pieces of facial feature information corresponding to the plurality of facial images, a set of a facial image and feature information optimal for generating a 3D model; and a facial expression 3D model generation unit that generates a 3D model using the facial image and the feature information selected by the input data selection unit. As the data optimal for generating a 3D model, the input data selection unit selects, for example, a facial image having feature information with a large change from standard data (Continued)

constituted by an expressionless 3D model and high reliability, as well as feature information.

15 Claims, 51 Drawing Sheets

(56) References Cited

FOREIGN PATENT DOCUMENTS

| JP | 2018-532216 A | 11/2018 |
|---|---|---|
| WO | 2017/044499 A1 | 3/2017 |

OTHER PUBLICATIONS

International Search Report and Written Opinion of PCT Application No. PCT/JP2020/028147, issued on Oct. 13, 2020, 08 pages of ISRWO.

Seymour, et al., "Meet Mike: Epic Avatars", SIGGRAPH 2017, Los Angeles, CA, USA, Aug. 3, 2017, 2 pages.

Casas, et al., "Rapid Photorealistic Blendshape Modeling from RGB-D Sensors", CASA 2016, May 23-25, 2016, 9 pages.

Kazemi, et al., "One Millisecond Face Alignment with an Ensemble of Regression Trees", KTH, Royal Institute of Technology Computer Vision and Active Perception Lab Teknikringen 14, Stockholm, Sweden, Jun. 2014, 8 pages.

Baltrusaitis, et al., "OpenFace 2.0: Facial Behavior Analysis Toolkit", IEEE International Conference on Automatic Face and Gesture Recognition, 2018, 8 pages.

Nagano, et al., "paGAN: Real-time Avatars Using Dynamic Textures", ACM Transactions on Graphics, vol. 37, No. 6, Article 258, Nov. 2018, 12 pages.

Pumarola, et al., "GANimation: Anatomically-aware Facial Animation from a Single Image", 2018, 16 pages.

Thies, et al., "Real-time Expression Transfer for Facial Reenactment", ACM Transactions on Graphics, Oct. 26, 2015, 14 pages.

Huber, et al., "A Multiresolution 3D Morphable Face Model and Fitting Framework", VISAPP, 2016, 8 pages.

Cao, et al., "Real-time Facial Animation with Image-based Dynamic Avatars", State Key Lab of CAD&CG, Zhejiang University, SIGGRAPH, 2016, 12 pages.

\* cited by examiner

| ACTION UNIT (AU) NO. | ACTION CONTENT |
|---|---|
| 1 | RAISING INSIDE OF EYEBROW |
| 2 | RAISING OUTSIDE OF EYEBROW |
| ⋮ | ⋮ |
| 6 | LIFTING CHEEKS |
| ⋮ | ⋮ |
| 12 | RAISING BOTH ENDS OF LIPS |
| 13 | SHARPLY RAISING LIPS |
| ⋮ | ⋮ |
| 25 | OPENING LIPS WITHOUT DROPPING CHIN |
| ⋮ | ⋮ |
| 27 | OPENING MOUTH WIDE |
| ⋮ | ⋮ |
| 45 | BLINKING |
| 46 | WINKING |

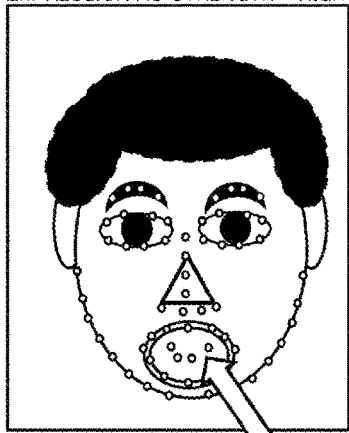

Fig. 15A SHOT DATA a

ERRONEOUS FEATURE POINT DETECTION
CORRESPONDING FACIAL EXPRESSION AU STRENGTH = HIGH

ERRONEOUSLY-DETECTED FEATURE POINTS

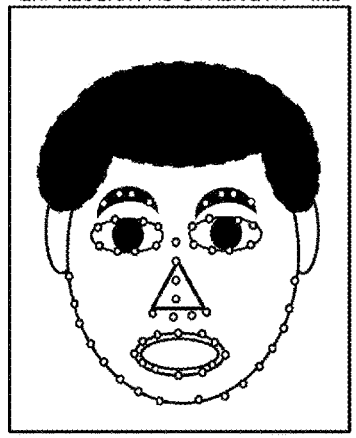

Fig. 15B SHOT DATA b

NO ERRONEOUS FEATURE POINT DETECTION
CORRESPONDING FACIAL EXPRESSION AU STRENGTH = MID

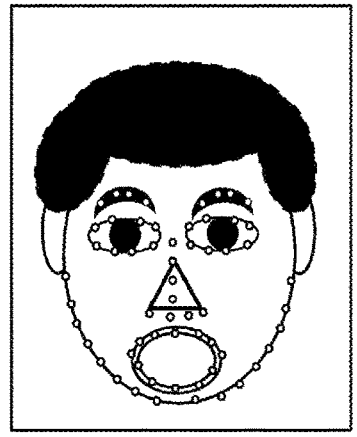

Fig. 15C SHOT DATA c

NO ERRONEOUS FEATURE POINT DETECTION
CORRESPONDING FACIAL EXPRESSION AU STRENGTH = HIGH

OUTPUT AS TARGET FACIAL INFORMATION DATA

FACIAL IMAGE DIFFERENCE DEGREE

FACIAL IMAGE DIFFERENCE DEGREE

FACIAL EXPRESSION DIFFERENCE DEGREE

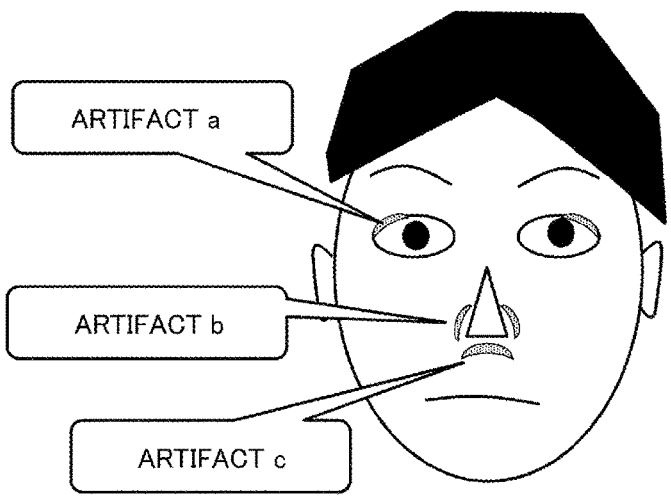
Fig. 32A  REWRITING-RENDERING IMAGE
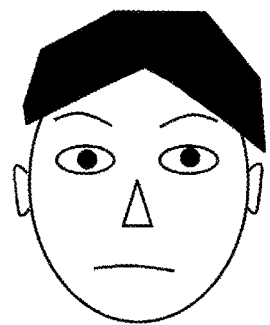
Fig. 32B  FACIAL IMAGE IN FACIAL EXPRESSION CAPTURE SIGNAL FOR PROCESSING FEATURE VECTOR OF FACIAL IMAGE IN
FACIAL EXPRESSION CAPTURE SIGNAL
FOR PROCESSING

DISTANCE BETWEEN
FEATURE VECTORS

FEATURE VECTOR IN
REWRITING-RENDERING IMAGE

ARTIFACT DEGREE

DISTANCE BETWEEN
FEATURE VECTORS

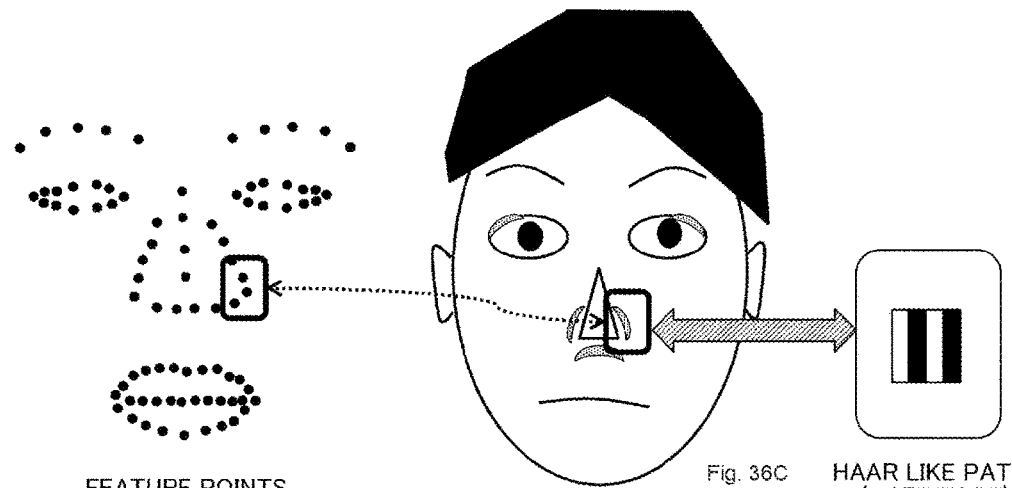

Fig. 37A  EXAMPLE OF UV MAP EXPANSION DIAGRAM
Fig. 37B  EXAMPLE OF UV MAP INDICATING ARTIFACT DEGREE
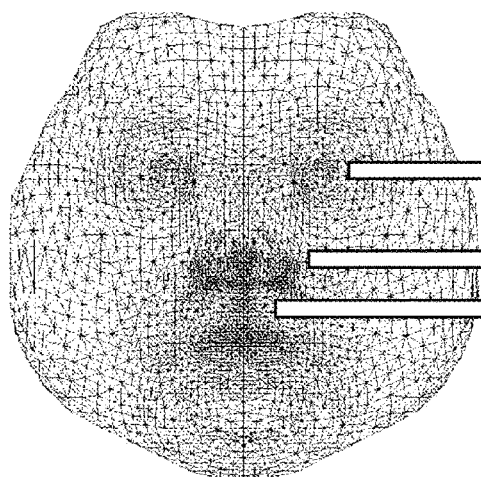
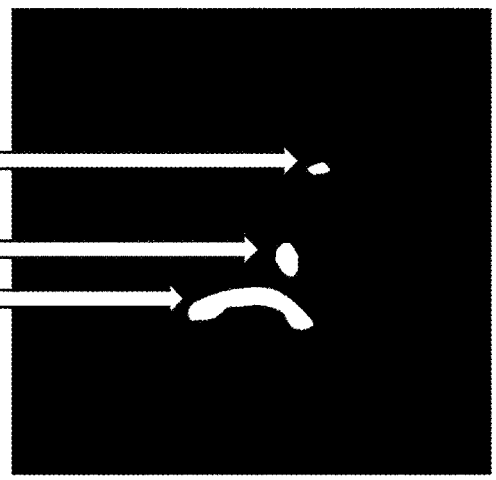

Fig. 39

EXAMPLE OF STRUCTURE OF TEXTURE-SHAPE COMBINATION DATA AND ARTIFACT UV MAP (n = 6)

| TEXTURE-SHAPE COMBINATION DATA INDEX | SHAPE INFORMATION | TEXTURE INFORMATION | ARTIFACT UV MAP |
|---|---|---|---|
| 0 | STANDARD SHAPE INFORMATION | STANDARD TEXTURE INFORMATION | |
| 1 | STANDARD SHAPE INFORMATION | FACIAL EXPRESSION PREDICTIVE TEXTURE INFORMATION | $\alpha_1$ |
| 2 | FACIAL EXPRESSION PREDICTIVE SHAPE INFORMATION | FACIAL EXPRESSION PREDICTIVE TEXTURE INFORMATION | $\alpha_2$ |
| 3 | FACIAL EXPRESSION PREDICTIVE SHAPE INFORMATION | ALREADY-OUTPUT DATA-APPLIED FACIAL EXPRESSION PREDICTIVE TEXTURE INFORMATION | $\alpha_3$ |
| 4 | ALREADY-OUTPUT DATA-APPLIED FACIAL EXPRESSION PREDICTIVE SHAPE INFORMATION | ALREADY-OUTPUT DATA-APPLIED FACIAL EXPRESSION PREDICTIVE TEXTURE INFORMATION | $\alpha_4$ |
| 5 | ALREADY-OUTPUT DATA-APPLIED FACIAL EXPRESSION PREDICTIVE SHAPE INFORMATION | FACIAL EXPRESSION TEXTURE INFORMATION | $\alpha_5$ |
| 6 | FACIAL EXPRESSION SHAPE INFORMATION | FACIAL EXPRESSION TEXTURE INFORMATION | $\alpha_6$ |

Fig. 46

EXAMPLE OF STRUCTURE OF TEXTURE-SHAPE COMBINATION DATA AND ARTIFACT UV MAP (n = 6)

| TEXTURE-SHAPE COMBINATION DATA INDEX | SHAPE INFORMATION | TEXTURE INFORMATION | ARTIFACT UV MAP |
|---|---|---|---|
| 0 | STANDARD SHAPE INFORMATION | FACIAL EXPRESSION CHANGE TEXTURE TIME-SERIES INFORMATION | |
| 1 | STANDARD SHAPE INFORMATION | FACIAL EXPRESSION PREDICTIVE TEXTURE INFORMATION | $\alpha_1$ |
| 2 | FACIAL EXPRESSION PREDICTIVE SHAPE INFORMATION | FACIAL EXPRESSION PREDICTIVE TEXTURE INFORMATION | $\alpha_2$ |
| 3 | FACIAL EXPRESSION PREDICTIVE SHAPE INFORMATION | ALREADY-OUTPUT DATA-APPLIED FACIAL EXPRESSION PREDICTIVE TEXTURE INFORMATION | $\alpha_3$ |
| 4 | ALREADY-OUTPUT DATA-APPLIED FACIAL EXPRESSION PREDICTIVE SHAPE INFORMATION | ALREADY-OUTPUT DATA-APPLIED FACIAL EXPRESSION PREDICTIVE TEXTURE INFORMATION | $\alpha_4$ |
| 5 | ALREADY-OUTPUT DATA-APPLIED FACIAL EXPRESSION PREDICTIVE SHAPE INFORMATION | FACIAL EXPRESSION TEXTURE INFORMATION | $\alpha_5$ |
| 6 | FACIAL EXPRESSION SHAPE INFORMATION | FACIAL EXPRESSION TEXTURE INFORMATION | $\alpha_6$ |

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/028147 filed on Jul. 20, 2020, which claims priority benefit of Japanese Patent Application No. JP 2019-149444 filed in the Japan Patent Office on Aug. 16, 2019, which claims priority benefit of Japanese Patent Application No. JP 2019-194517 filed in the Japan Patent Office on Oct. 25, 2019. Each of the above-referenced applications is hereby incorporated herein by reference in its entirety.

TECHNICAL FIELD

The present disclosure relates to an image processing device, an image processing method, and a program. More particularly, the present disclosure relates to an image processing device, an image processing method, and a program that execute three-dimensional (3D) model generation processing.

BACKGROUND ART

In recent years, three-dimensional image generation techniques using computer graphics (CG) techniques are being used in a wide range of fields, such as movies, video games, and the like.

In the field of CG techniques, as a method for generating three-dimensional animated images of the face of an actual person, processing which uses a three-dimensional (3D) model having various different facial expressions corresponding to that person, called "target shapes", is used.

3D models corresponding to the various different facial expressions of the actual person, i.e., various facial expressions such as smiling, crying, angry, and the like, are generated in advance as "target shapes". CG facial images for all facial expressions not included in the "target shapes" can be generated and displayed by performing arithmetic processing such as weighted linear summing and the like on the "target shapes". The arithmetic processing such as weighted linear summing of a "target shape" is typically called a "blendshape".

By displaying the weighting ratio of each target shape as a CG image with time-based variation, a CG image similar to an image of the real person (the model), i.e., a photorealistic facial animation image, can be realized.

"Target shape" generation processing is described in, for example, NPL 1, "'Meet Mike: epic Avatars' by Mike Seymour (SIGGRAPH 2017), Aug. 3, 2017".

To achieve realistic facial animation with various facial expression changes, it is necessary to generate "target shapes" for as many different facial expressions as possible in advance.

The "target shape" generation processing requires processing in which the person serving as the model makes various facial expressions and the facial expressions are shot with many cameras placed around the face.

There is a problem in that this "target shape" generation processing is not only burdensome for the photographer, but also requires the person who is the subject to make many facial expressions which they do not often do on a daily basis, which places a very heavy burden on the subject.

One method to reduce the burden of the "target shape" generation processing is to simply generate the "target shape" by analyzing feature points of the face parts (eyes, mouth, nose, eyebrows, face contours, and the like).

This method is described, for example, in NPL 2, "'Rapid Photorealistic Blendshape Modeling from RGB-D Sensors', by Dan Casas, (CASA 2016) May 23-25, 2016".

However, in this method, the accuracy of the "target shape" is highly dependent on the accuracy of the detection of the face part feature points. There is a problem in that the accuracy of the detection of the face part feature points varies greatly depending on the orientation of the face, changes in the facial expression, and the shooting environment, making the detection less robust and, as a result, making it difficult to generate highly-accurate "target shapes".

Furthermore, PTL 1 (JP 2014-211719 A) is an example of a conventional technique which discloses a simple method for performing "target shape" generation processing. PTL 1 discloses a method of generating different face target shapes for each of many different people by transforming a single generic model.

CITATION LIST

Patent Literature

[PTL 1]
JP 2014-211719 A

Non Patent Literature

[NPL 1]
"Meet Mike: epic Avatars", by Mike Seymour (SIGGRAPH 2017), Aug. 3, 2017
[NPL 2]
"Rapid Photorealistic Blendshape Modeling from RGB-D Sensors", by Dan Casas, (CASA 2016), May 23-25, 2016
[NPL 3]
"One Millisecond Face Alignment with an Ensemble of Regression Trees", by Vahid Kazemi and Josephine Sullivan, CVPR 2014
[NPL 4]
"OpenFace 2.0: Facial Behavior Analysis Toolkit", by Tadas Baltrusaitis (IEEE International Conference on Automatic Face and Gesture Recognition, 2018)
[NPL 5]
"paGAN: Real-time Avatars Using Dynamic Textures", by KOKI NAGANO (SIGGRAPH ASIA 2018), ACM Transactions on Graphics, Vol. 37, No. 6, Article 258. Publication date: November 2018
[NPL 6]
"GANimation: Anatomically-aware Facial Animation from a Single Image", by Albert Pumarola (ECCV 2018)
[NPL 7]
"Real-time Expression Transfer for Facial Reenactment", by Justus Thies (ACM Transactions on Graphics 2015)
[NPL 8]
"A Multiresolution 3D Morphable Face Model and Fitting", by Patric Huber (VISAPP 2016)
[NPL 9]
"Real-time Facial Animation with Image-based Dynamic Avatars", by Chen Cao (SIGGRAPH 2016)
[NPL 10]
"http://www.ee.surrey.ac.uk/CVSSP/Publications/papers/Huber-VISAPP-2016.pdf"

SUMMARY

Technical Problem

As described above, as a method for realizing three-dimensional CG images similar to those of a real person, i.e., photorealistic facial animation three-dimensional images, a method is known which uses "target shapes", which are 3D models based on shot images of various facial expressions of the person.

In order to realize photorealistic facial animation that looks like a person themselves, a large number of highly-accurate "target shapes" of different facial expressions of the person are required. In order to generate highly-accurate "target shapes", it is necessary to use a large-scale photography system that surrounds a user (subject) 10 with a large number of cameras to shoot a large number of different facial expressions of the subject (model), which is problematic in terms of the cost of the photography system, the large installation space, and the like.

It is also necessary to make the subject perform many facial expressions that they do not often do on a daily basis, which is very stressful for the subject. There is a further problem in that a target shape used in a blendshape must be an image shot with the head position fixed as much as possible, and the subject must have their head immobilized with an instrument for a long time, which increases physical and mental pain.

On the other hand, the above-described method of generating a "target shape" by analyzing feature points of face parts (eyes, mouth, nose, eyebrows, face contour, and the like) can, for example, generate a "target shape" by using images shot by a single imaging device having a depth sensor. There is thus no need for a large number of camera placements, which makes it possible to reduce costs and the amount of space required for shooting images.

However, as mentioned above, this method has a problem that the accuracy of the "target shape" is highly dependent on the accuracy of the detection of the feature points of the face parts, which makes it difficult to generate a highly-accurate "target shape".

This method also requires alignment processing by image analysis using the detection of feature points of face parts, but because the orientation of the face, changes in facial expression, and the shooting environment can cause misalignment of the head, it is difficult to achieve highly-accurate alignment, and the accuracy of the "target shape" decreases as a result.

The above-mentioned PTL 1 (JP 2014-211719 A) has an advantage in that many target shapes corresponding to various real people are predictively generated from one generic model, and it is therefore not necessary for each person (subject) to act out making many facial expressions.

However, this method consists of transforming a single generic model to generate facial expressions corresponding to various real people using predictive processing, and there is a high possibility that the facial expressions will differ from the actual facial expressions of the person.

In fact, there is a problem in that when target shapes generated using this predictive method are applied to generate and display facial animation images, the facial expressions often look unnatural and uncanny.

Having been achieved in light of the above-described circumstances, the present disclosure provides an image processing device, an image processing method, and a program that make it possible to efficiently generate highly-accurate three-dimensional models corresponding to a variety of facial expressions of a person.

In one embodiment of the present disclosure, for example, an image processing device, an image processing method, and a program are provided that efficiently generate a highly-accurate three-dimensional face model such as a "target shape" or the like by preferentially shooting images of facial expressions having unique characteristics of a person (subject).

Additionally, in one embodiment of the present disclosure, an image processing device, an image processing method, and a program are provided that, by analyzing a shooting state of a user (subject) in real time and shooting facial expressions while confirming the results of the analysis, makes it possible to reduce shooting errors, improve the stability of processing, and the like, which in turn makes it possible to shorten the shooting time.

Furthermore, in one embodiment of the present disclosure, an image processing device, an image processing method, and a program are provided that, by performing quality checks on various data generated within the device during the process of generating three-dimensional models corresponding to a variety of facial expressions of a person, make it possible to generate a high-quality three-dimensional model with few breakdowns.

Solution to Problem

A first aspect of the present disclosure is an image processing device including: a facial feature information detection unit that analyzes a facial image of a subject shot by an image capturing unit and detects facial feature information; an input data selection unit that selects, from a plurality of facial images shot by the image capturing unit and a plurality of pieces of facial feature information corresponding to the plurality of facial images, a set of a facial image and feature information optimal for generating a 3D model; and a facial expression 3D model generation unit that generates a 3D model using the facial image and the feature information selected by the input data selection unit.

Furthermore, a second aspect of the present disclosure is an image processing method executed by an image processing device, the method including: a facial feature information detection unit analyzing a facial image of a subject shot by an image capturing unit and detecting facial feature information; an input data selection unit selecting, from a plurality of facial images shot by the image capturing unit and a plurality of pieces of facial feature information corresponding to the plurality of facial images, a set of a facial image and feature information optimal for generating a 3D model; and a facial expression 3D model generation unit generating a 3D model using the facial image and the feature information selected by the input data selection unit.

Furthermore, a third aspect of the present disclosure is a program that causes an image processing device to execute image processing, the program causing: a facial feature information detection unit to analyze a facial image of a subject shot by an image capturing unit and detect facial feature information; an input data selection unit to select, from a plurality of facial images shot by the image capturing unit and a plurality of pieces of facial feature information corresponding to the plurality of facial images, a set of a facial image and feature information optimal for generating a 3D model; and a facial expression 3D model generation unit to generate a 3D model using the facial image and the feature information selected by the input data selection unit.

Meanwhile, the program of the present disclosure may be, for example, a program that can be provided through a storage medium and a communication medium that provide the program in a computer-readable format to an image processing device and a computer system capable of executing various program codes. By providing such a program in a computer-readable format, processing according to the program is realized in the image processing device and the computer system.

Other objects, features, and advantages of the present disclosure will become clear according to detailed description based on embodiments of the present disclosure which will be described later and the attached drawings. Note that, in the present description, a system is a logical set of a plurality of devices, and it does not matter whether or not devices of respective configurations are arranged in a single housing.

According to the configuration of an embodiment of the present disclosure, according to the configuration of an embodiment of the present disclosure, a device and method that enable highly accurate and efficient three-dimensional model generation processing are realized.

Specifically, for example, the device includes: a facial feature information detection unit that analyzes a facial image of a subject shot by an image capturing unit and detects facial feature information; an input data selection unit that selects, from a plurality of facial images shot by the image capturing unit and a plurality of pieces of facial feature information corresponding to the plurality of facial images, a set of a facial image and feature information optimal for generating a 3D model; and a facial expression 3D model generation unit that generates a 3D model using the facial image and the feature information selected by the input data selection unit. As the data optimal for generating a 3D model, the input data selection unit selects, for example, a facial image having feature information with a large change from standard data constituted by an expressionless 3D model and high reliability, as well as feature information.

Through this configuration, a device and method that enable highly accurate and efficient three-dimensional model generation processing are realized. Furthermore, by checking the quality of the various types of data generated internally, it is possible to generate data with fewer breakdowns.

Meanwhile, the advantageous effects described in the present description are merely exemplary and are not limiting, and other additional advantageous effects may be obtained.

BRIEF DESCRIPTION OF DRAWINGS

FIGS. 15A, 15B and 15C are diagrams illustrating processing executed by the input data selection unit.

FIGS. 32A and 32B are diagrams illustrating an example of a rewriting-rendering image and artifacts generated by the part adaptive facial expression 3D model compositing unit of the fourth embodiment.

FIGS. 36A, 36B and 36C are diagrams illustrating processing executed by the artifact UV map generation unit.

FIGS. 37A and 37B are diagrams illustrating processing executed by the artifact UV map generation unit.

FIG. 39 is a diagram illustrating an example of the structure of texture-shape combination data and an artifact UV map.

FIG. 46 is a diagram illustrating an example of the structure of texture-shape combination data and an artifact UV map of the fifth embodiment.

DESCRIPTION OF EMBODIMENTS

Hereinafter, an image processing device, an image processing method, and a program of the present disclosure will be described in detail with reference to the drawings. The descriptions will be given in the following order.

1. Overview of Processing Executed by Image Processing Device of Present Disclosure
2. (First Embodiment) Configuration and Processing of Image Processing Device of First Embodiment of Present Disclosure
  2-1. Details of Configuration of, and Processing Executed by, Facial Feature Information Detection Unit
  2-2. Details of Configuration of, and Processing Executed by, Subject State Determination/Display Unit
  2-3. Details of Configuration of, and Processing Executed by, Input Data Selection Unit
  2-4. Details of Configuration of, and Processing Executed by, Facial Expression 3D Model Prediction Unit
  2-5. Details of Configuration of, and Processing Executed by, Facial Expression Fidelity Verification Unit
  2-6. Details of Configuration of, and Processing Executed by, Facial Expression 3D Model Generation Unit
  2-7, Details of Configuration of, and Processing Executed by, Reprocessing Priority Facial Expression List Generation Unit
3. (Second Embodiment) Configuration and Processing of Image Processing Device of Second Embodiment of Present Disclosure
4. (Third Embodiment) Configuration and Processing of Image Processing Device of Third Embodiment of Present Disclosure
5. (Fourth Embodiment) Configuration and Processing of Image Processing Device of Fourth Embodiment of Present Disclosure
6. (Fifth Embodiment) Configuration and Processing of Image Processing Device of Fifth Embodiment of Present Disclosure
7. Example of Hardware Configuration of Image Processing Device
8. Summary of Configuration of Present Disclosure 1. Overview of Processing Executed by Image Processing Device of Present Disclosure An overview of processing executed by the image processing device of the present disclosure will be given first.

Figure 1:
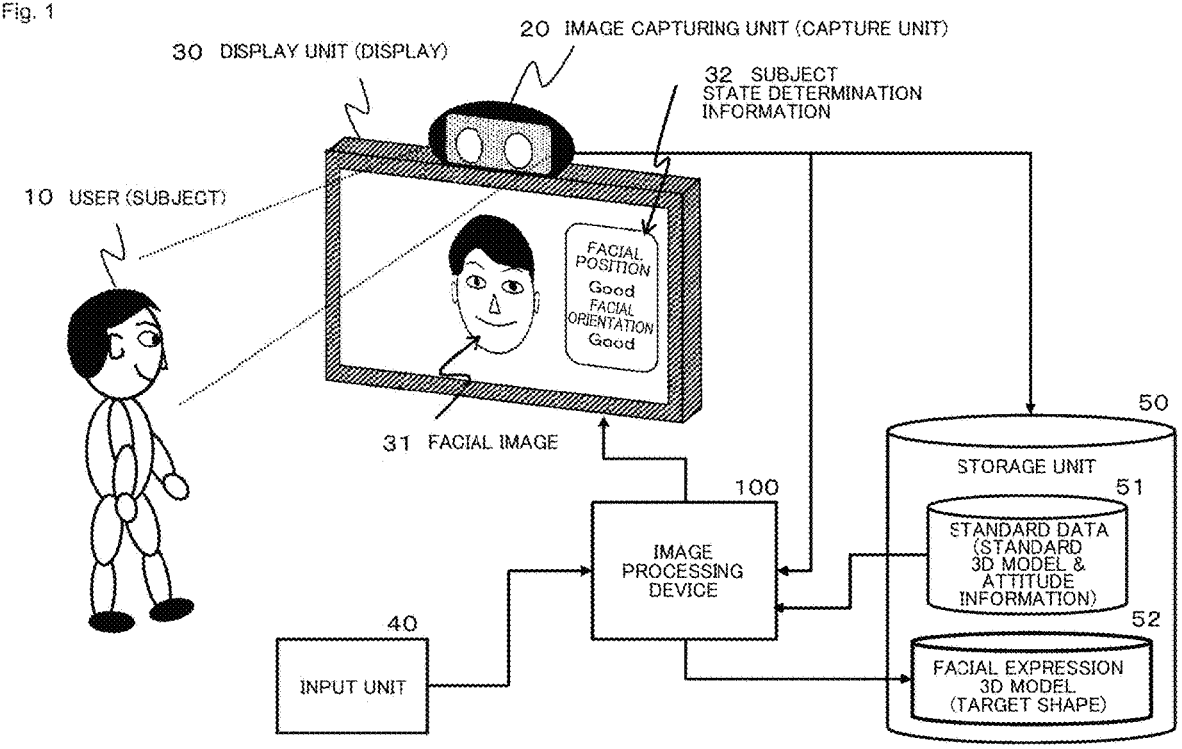
FIGS. 1A and 1B are diagrams illustrating an example of the configuration of a system using an image processing device of the present disclosure.

FIG. 1 is a diagram illustrating an overview of processing executed by an image processing device 100 of the present disclosure.

A user (subject) 10 is a user for which a three-dimensional (3D) model (3D image) of the face is to be generated.

The user 10 makes various facial expressions, e.g., smiling, angry, crying, and the like, and the image processing device 100 generates a three-dimensional (3D) model of these various facial expressions of the user 10. In other words, the image processing device 100 generates 3D models of faces having various facial expressions corresponding to "target shapes".

An image capturing unit (capture unit) 20 shoots an image including a facial region of the user (subject) 10. The image capturing unit (capture unit) 20 is constituted by, for example, an RGB camera, an RGB camera equipped with a depth sensor, or the like.

A facial image (RGB image) of the user 10, or a capture signal including a facial image and depth data, obtained by the image capturing unit (capture unit) 20, is input to the image processing device 100.

The image processing device 100 generates 3D models (three-dimensional images) of a variety of facial expressions of the user 10 using this capture signal.

Note that in the processing of generating 3D models of a variety of facial expressions of the user 10, the image processing device 100 of the present disclosure uses, as reference data, standard data constituted by a standard 3D model of the user 10, which is generated in advance, and data of the attitude (facial position, facial orientation) of the user 10 when the standard 3D model is generated.

This standard data is constituted by, for example, a 3D model generated in advance by shooting the user 10 in an expressionless state, and attitude data thereof.

This standard data is stored in a storage unit 50. This is standard data 51 in the storage unit 50 illustrated in FIG. 1.

Although the following embodiments will describe the standard data as data constituted by a 3D model based on an "expressionless" face of the user 10 and the attitude data thereof, it should be noted that the standard data does not absolutely have to be expressionless, and may be a 3D model and the attitude data thereof serving as a single standard. In other words, a single 3D model generated from shot data of the face of the user 10, and the attitude data thereof, can be used as the standard data.

The image processing device 100 generates 3D models (three-dimensional images) of a variety of facial expressions of the user 10 using the capture signal, such as a facial image, of the user 10 obtained by the image capturing unit (capture unit) 20, and the standard data 51 stored in the storage unit 50.

Note that the shot image from the image capturing unit (capture unit) 20 can be output to and displayed in a display unit (display) 30 via the image processing device 100, and confirmed by the user 10. This is a facial image 31 illustrated in the drawings.

Furthermore, the image processing device 100 generates subject state determination information 32 and outputs that information to the display unit 30. The subject state determination information 32 is information for communicating, to the user 10, whether or not it is necessary to correct the position, orientation, or the like of the user's face.

The user 10 can correct the position, orientation or the like of their own face by viewing the subject state determination information 32.

An input unit 40 is an input unit for inputting various commands, parameters, and the like to the image processing device 100.

Specifically, the input unit 40 is used, for example, to input commands requesting the start and end of 3D model generation processing, signals for requesting reprocessing for the generation of a 3D model for a given facial expression, and the like.

The image processing device 100 generates three-dimensional (3D) images of various facial expressions of the user 10, i.e., 3D models, and stores the 3D models in the storage unit 50.

These are facial expression 3D models (target shapes) 52 in the storage unit 50 illustrated in the drawings.

The specific processing will be described in detail hereinafter.

2. (First Embodiment) Configuration and Processing of Image Processing Device of First Embodiment of Present Disclosure The configuration of and processing by a first embodiment of the image processing device of the present disclosure will be described next.

Figure 2:
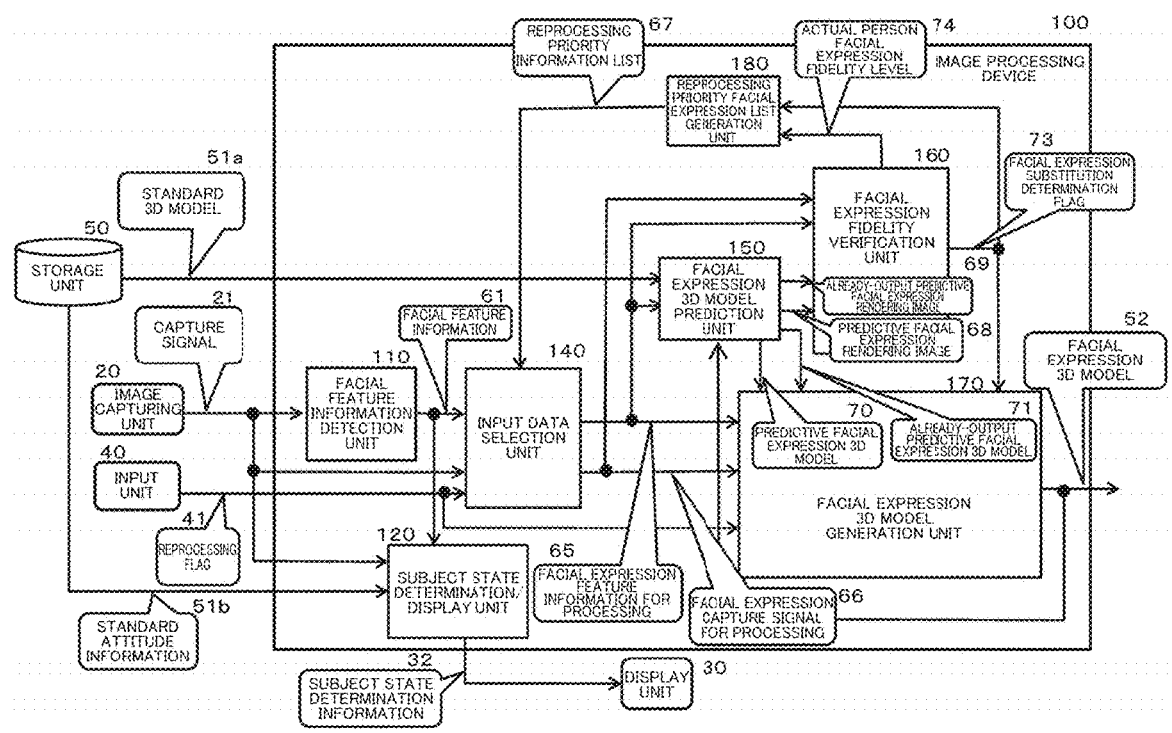
FIG. 2 is a diagram illustrating an example of the configuration of the image processing device of the present disclosure.

FIG. 2 is a block diagram illustrating an example of the configuration of the first embodiment of the image processing device 100 of the present disclosure.

As illustrated in FIG. 2, the image processing device 100 includes a facial feature information detection unit 110, a subject state determination/display unit 120, an input data selection unit 140, a facial expression 3D model prediction unit 150, a facial expression fidelity verification unit 160, a facial expression 3D model generation unit 170, and a reprocessing priority facial expression list generation unit 180.

As described earlier with reference to FIG. 1, in the image processing device 100 according to the present first embodiment, the image capturing unit 20, e.g., an image capturing unit 20 such as an RGB camera equipped with a depth sensor or a simple RGB camera, inputs a capture signal 21 constituted by a shot image signal of the user 10 for which a three-dimensional model is to be generated, or constituted by a shot image signal and depth data, which is then processed.

Note that as described earlier, the image processing device 100 obtains the standard data of the user (subject) 10, i.e., the 3D model from when the user (subject) 10 is expressionless, for example, and the attitude data thereof, from the storage unit 52, and generates 3D images corresponding to various facial expressions based on the shooting of the various facial expressions of the user 10, i.e., facial expression 3D models, using the standard data as reference data.

The standard data of the user (subject) 10, i.e., for example, the 3D model when the user is expressionless and the attitude data thereof, are generated by the image processing device 100 in advance and stored in the storage unit 50. Alternatively, data generated by an external device aside from the image processing device 100 may be used.

Note that the user 10 is asked to make a plurality of different facial expressions, and the image capturing unit 20 sequentially captures facial images of a variety of facial expressions and inputs the images to the image processing device 100.

When shooting the images of various different facial expressions in succession, it is preferable to decide in advance the facial expression sequence, i.e., the order of the facial expressions to be shot, such that the next facial expression is as similar as possible to the previous facial expression that was shot.

The capture signal 21 input from the image capturing unit 20 to the image processing device 100 is a signal in which various types of information such as a facial expression identification number that identifies the facial expression of the subject being shot, a synchronization signal, and the like are added to and multiplexed with an RGB image signal, or an RGB image signal and a depth signal.

The 3D model generated by the image processing device 100, the 3D model that is the standard data, and the like include vertex coordinates of meshes constituting the 3D model, shape data indicating a connection structure of the meshes, and texture information mapped onto the surface of each mesh.

The processing executed by the image processing device 100 of the first embodiment will be described in detail with reference to FIG. 2 and on.

First, an overview of the processing executed by the image processing device 100 of the first embodiment will be described with reference to FIG. 2. The configuration of, and processing performed by, each constituent element of the image processing device 100 will then be described in sequence with reference to FIG. 3 and on.

First, an overview of the processing executed by the image processing device 100 of the first embodiment will be described with reference to FIG. 2.

The capture signal 21 obtained by the image capturing unit (capture unit) 20 is input to the facial feature information detection unit 110, the subject state determination/display unit 120, and the input data selection unit 140.

The facial feature information detection unit 110 analyzes the capture signal 21 and outputs facial feature information 61 that indicates the position of each part of the face (the eyes, nose, mouth, and so on) of the user (subject) 10, features of the facial expression, and the like.

The subject state determination/display unit 120 determines whether or not the state of the face of the user (subject) 10 (the position, orientation, and so on of the face) included in the capture signal 21 is appropriate through comparison with the standard data, generates the subject state determination information 32 as a result of the determination, and outputs that information to the display unit 30.

As described earlier with reference to FIG. 1, the standard data 51 of the user (subject) 10, i.e., for example, a 3D model when the user is expressionless and attitude data thereof, is stored in the storage unit 50.

In the following, the constituent data of the standard data 51 stored in the storage unit 50 will be described separately as:

a standard 3D model 51a; and standard attitude information 51b.

The subject state determination/display unit 120 inputs the standard attitude information 51b from the storage unit 50 and the facial feature information 61 from the facial feature information detection unit 110, i.e., the facial feature information 61 indicating the position of each part of the face of the user (subject) 10 (the eyes, nose, mouth, and so on), the features of the facial expression, and the like, and on this basis of this input information, determines whether or not the state of the face of the user (subject) 10 included in the capture signal 21 (the position, orientation, and the like of the face) is appropriate.

To present this determination result to the user (subject) 10, the subject state determination/display unit 120 outputs the determination result to the display unit 30 as the subject state determination information 32.

This information is the subject state determination information 32 illustrated in FIG. 1.

The input data selection unit 140 inputs the capture signal 21 from the image capturing unit 20 and the facial feature information 61 from the facial feature information detection unit 110, selects facial feature information and a capture signal that are favorable input data for generating a 3D model in the facial expression 3D model generation unit 170 in a later stage, and outputs the selected data as facial expression feature information for processing 65 and a facial expression capture signal for processing 66 to processing units in later stages.

The facial expression 3D model prediction unit 150 inputs the standard 3D model 51a, which is constituent data of the standard data 51 of the user (subject) 10 generated in advance and already stored in the storage unit 50. Furthermore, the facial expression feature information for processing 65 is input from the input data selection unit 140.

On the basis of this input data, the facial expression 3D model prediction unit 150 predictively generates a 3D model of the facial expression of the user (subject) 10 to be processed, as well as a rendering image using that 3D model.

This predictive generation processing data is output as a predictive facial expression 3D model 70 and a predictive facial expression rendering image 68.

The predictive facial expression 3D model 70 is output to the facial expression 3D model generation unit 170.

The predictive facial expression rendering image 68 is output to the facial expression fidelity verification unit 160.

As will be described later, when shooting facial expressions for the second and subsequent times aside from the first time, an already-output data-applied predictive facial expression 3D model 71 and an already-output data-applied predictive facial expression rendering image 69, which are data already generated on the basis of past shot data, are also output to the facial expression 3D model generation unit 170 and the facial expression fidelity verification unit 160, respectively.

Note that the standard 3D model 51a is information obtained in the same instance of shooting as the standard attitude information 51b, and are assumed to be synchronized.

Additionally, the facial expression fidelity verification unit 160 compares (p1) the predictive facial expression rendering image 68 input from the facial expression 3D model prediction unit 150 or (p2) the already-output data-applied predictive facial expression rendering image 69 with (q) facial image data from an actual image of the user (subject) 10, included in the facial expression capture signal for processing 66 input from the input data selection unit 140, and executes facial expression similarity determination processing to determine how similar the facial expressions are.

On the basis of a result of this facial expression similarity determination, the facial expression fidelity verification unit 160 outputs a facial expression substitution determination flag 73 indicating whether or not one of the predictive facial expression 3D model 70 and the already-output data-applied predictive facial expression 3D model 71 can be substituted as an output of the facial expression 3D model generation unit 170 in a later stage.

An actual person facial expression fidelity level 74 calculated as a similarity determination index is output as well.

The facial expression substitution determination flag 73 is output to the facial expression 3D model generation unit 170 and the reprocessing priority facial expression list generation unit 180.

The actual person facial expression fidelity level 74 is output to the reprocessing priority facial expression list generation unit 180.

The facial expression 3D model generation unit 170 executes one of the following types of processing in accordance with the facial expression substitution determination flag 73 input from the facial expression fidelity verification unit 160.

(a) Facial expression 3D model generation processing is performed using the facial expression feature information for processing 65 and the facial expression capture signal for processing 66 input from the input data generation unit 140, and the facial expression 3D model 52 is ultimately output.

(b) The stated facial expression 3D model generation processing is skipped, and the predictive facial expression 3D model 70 from the facial expression 3D model prediction unit 150 or the already-output data-applied predictive facial expression 3D model 71 is output as a substitute facial expression 3D model 52.

The processing in (b) above is processing for outputting the predictive facial expression 3D model 70 or the already-output data-applied predictive facial expression 3D model 71 as-is as the 3D model. 3D model generation processing using actual captured images would result in a high processing load, and this processing is therefore performed to reduce the processing load.

The facial expression 3D model 52 generated or substituted in the processing of (a) and (b) above are output from the image processing device 100 and stored in the storage unit 50, for example.

This data stored in the storage unit corresponds to the facial expression 3D model 52 in the storage unit 50 illustrated in FIG. 1.

If, after the processing of generating one facial expression 3D model, there is already a 3D model which has been generated on the basis of a shot image, the generated facial expression 3D model 52 can be input to the facial expression 3D model prediction unit 150, and the 3D model which has already been generated can be used to generate the already-output data-applied predictive facial expression 3D model 71.

The reprocessing priority facial expression list generation unit 180 inputs the facial expression substitution determination flag 73 and the actual person facial expression fidelity level 74 from the facial expression fidelity verification unit 160.

On the basis of this input data, the reprocessing priority facial expression list generation unit 180 generates a reprocessing priority facial expression list 67 including the facial expression identification numbers identifying the facial expressions of the user 10 being shot, in order of the lowest actual person facial expression fidelity level 74, and outputs the list to the input data selection unit 140.

Note that aside from a normal mode, the image processing device 100 can perform processing in a reprocessing mode.

The reprocessing mode is a mode in which the facial expression 3D model 52 output from the facial expression 3D model generation unit 170 is regenerated. This is executed, for example, when the user determines that a 3D model having the ideal facial expression could not be generated.

In the reprocessing mode, new image shooting is not performed, i.e., the capture signal 21 is not reobtained, and instead, a shot image (capture signal) which has already been obtained is reused.

Which mode the processing is to be executed in is determined by, for example, a reprocessing flag 41, which is a user input from the input unit 40. The processing is performed in the normal mode when the reprocessing flag 41 is 0, and in the reprocessing mode when the reprocessing flag 41 is 1.

When performing the processing in the reprocessing mode, on the basis of the information in the reprocessing priority facial expression list 67 input from the reprocessing priority facial expression list generation unit 180, the input data selection unit 140 reobtains a shot image (capture signal) which has already been obtained and for which 3D model reprocessing is to be performed, and outputs that image as the facial expression feature information for processing 65 and the facial expression capture signal for processing 66.

The facial expression 3D model generation unit 170 in the later stage does not substitute the predictive 3D model, but performs highly-accurate facial expression 3D model generation processing and outputs the facial expression 3D model 52.

The overall configuration of the image processing device 100 illustrated in FIG. 2, and an overview of the processing performed thereby, have been described thus far. The specific configuration of and processing performed by each processing block constituting the image processing device 100 illustrated in FIG. 2 will be described hereinafter with reference to FIG. 3 and on.

2-1. Details of Configuration of, and Processing Executed by, Facial Feature Information Detection Unit Details of the configuration of, and processing executed by, the facial feature information detection unit 110 will be described first.

Figure 3:
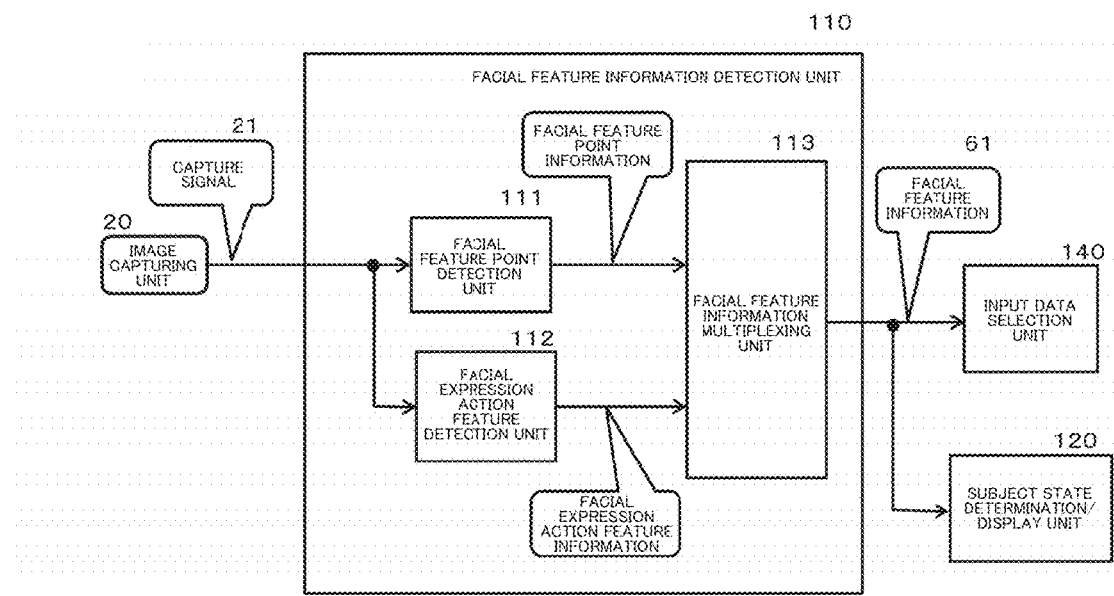
FIG. 3 is a diagram illustrating the configuration of, and processing executed by, a facial feature information detection unit.

FIG. 3 is a diagram illustrating, in detail, an example of the configuration of the facial feature information detection unit 110.

As illustrated in FIG. 3, the facial feature information detection unit 110 includes a facial feature point detection unit 111, a facial expression action feature detection unit 112, and a facial feature information multiplexing unit 113.

The facial feature point detection unit 111 analyzes the image contained in the capture signal 21 input from the image capturing unit 20 to obtain feature points of the face parts (the eyes, nose, mouth, and so on), and outputs position information and a detection reliability (e.g., low reliability to high reliability=a normalized value of 0.0 to 1.0) to the facial feature information multiplexing unit 113 as facial feature point information.

Figure 4:
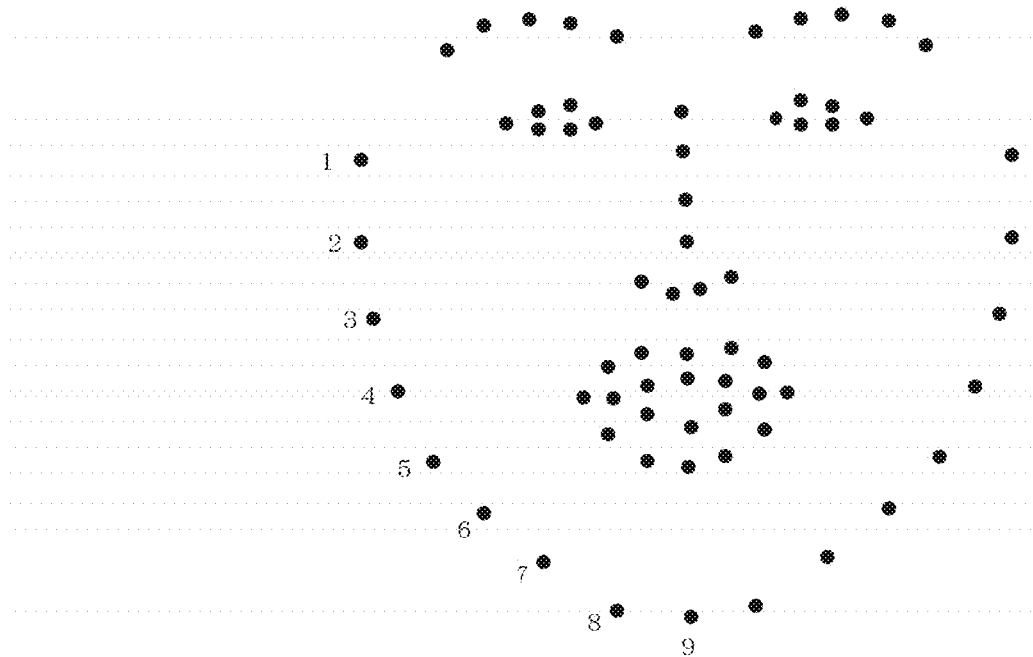
FIG. 4 is a diagram illustrating feature point detection processing executed by the facial feature information detection unit.

An example of feature point detection will be described with reference to FIG. 4. FIG. 4 is a diagram illustrating an example of the feature point detection executed by the facial feature point detection unit 111.

For example, the example illustrated in FIG. 4 is an example of detecting the eyes, nose, mouth, eyebrows, face contours, and a plurality of feature points from each of these parts. Although feature point identifiers from 1 to 9 are indicated in the drawing, identifiers are also set for all the remaining feature points. Furthermore, a detection reliability is set for each feature point.

The detection reliability has, for example, a highest reliability of 1.0 and a lowest reliability of 0.0, and is set to a range of 0.0 to 1.0.

Note that a technique disclosed in, for example, NPL 3, "'One Millisecond Face Alignment with an Ensemble of Regression Trees', by Vahid Kazemi and Josephine Sullivan, CVPR 2014", can be used for detection of feature points of face parts.

On the other hand, the facial expression action feature detection unit 112 uses data defining basic actions of a face, called an action unit (AU), which is defined on the basis of an analysis tool called Facial Action Coding System (FACS) that measures facial movement, to calculate which action unit (AU) the user's facial expression resembles as a strength for each AU (e.g., a normalized value from 0.0 to 1.0), and outputs the calculated value to the facial feature information multiplexing unit 113 as facial expression action feature information.

Figure 5:
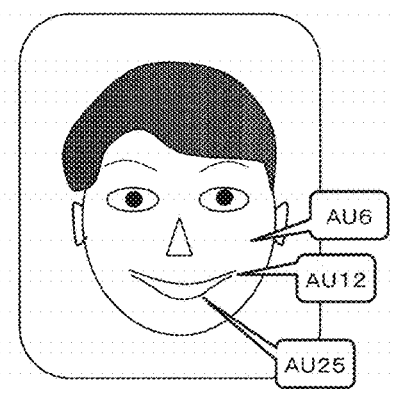
FIG. 5 is a diagram illustrating facial expression action feature detection processing executed by the facial feature information detection unit.

FIG. 5 illustrates an example of the definition data for an action unit (AU).

As illustrated in FIG. 5, action units are defined as 46 different types of units, i.e., AU=1 to 46, and various facial expressions are associated with the respective AUs. The facial expression action feature detection unit 112 analyzes the facial image of the user 10 input from the image capturing unit 20, determines which action unit the facial expression resembles, and sets a high strength value for AUs having a high similarity and a low strength value for AUs having a low similarity.

For example, in the smiling facial expression illustrated on the right side of FIG. 5, the values of the three types of action units (AU) AU6, AU12, and AU25 follow an increasing trend.

The facial expression action feature detection unit 112 calculates which action unit (AU) the user's facial expression resembles as the strength of each AU (e.g., a normalized value from 0.0 to 1.0), and outputs the calculated value to the facial feature information multiplexing unit 113 as facial expression action feature information.

Note that the processing by the facial expression action feature detection unit 112 can be executed using, for example, the technique described in NPL 4, "'OpenFace 2.0: Facial Behavior Analysis Toolkit', by Tadas Baltrusaitis (IEEE International Conference on Automatic Face and Gesture Recognition, 2018)".

The facial feature information multiplexing unit 113 multiplexes (a) the facial feature point information constituted by the position information and detection reliability information of each feature point, input from the facial feature point detection unit 111, and (b) the facial expression action feature information input from the facial expression action feature detection unit 112, and outputs the result as the facial feature information 61.

The output destinations of the facial feature information 61 generated by the facial feature information multiplexing unit 113 are the input data selection unit 140 and the subject state determination/display unit 120.

2-2. Details of Configuration of, and Processing Executed by, Subject State Determination/Display Unit Details of the configuration of, and the processing executed by, the subject state determination/display unit 120 will be described next.

Figure 6:
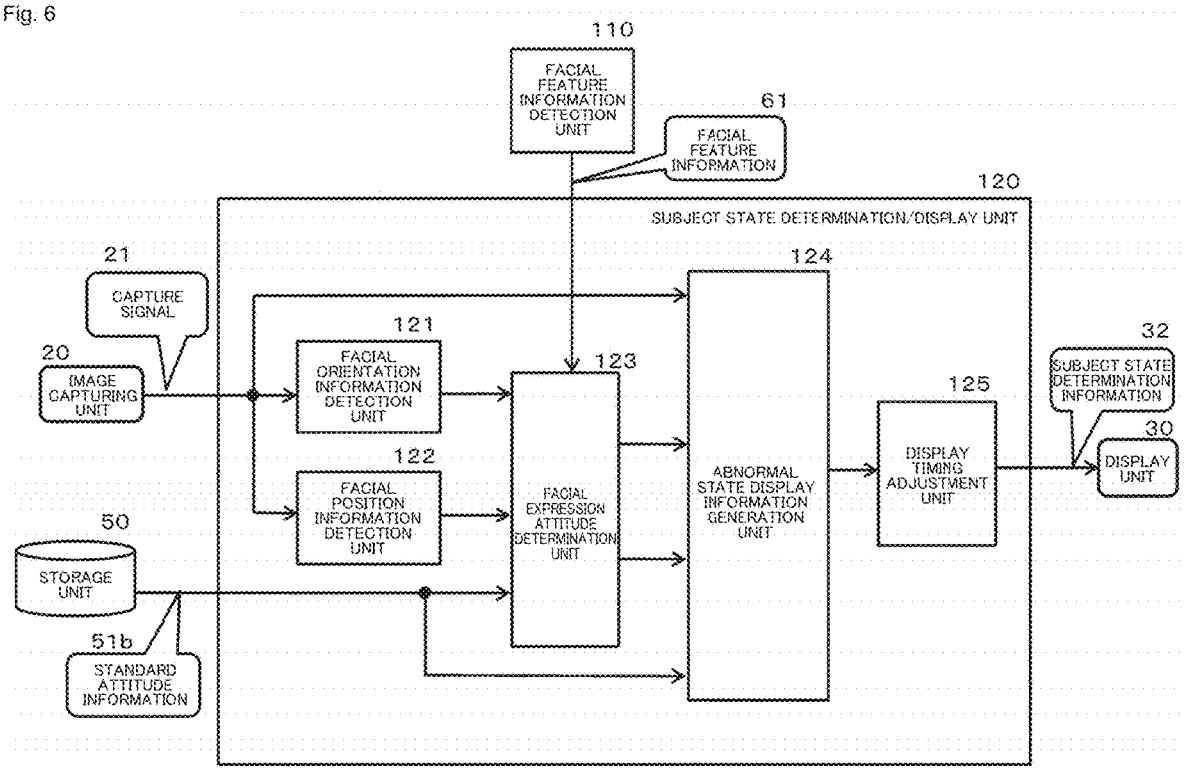
FIG. 6 is a diagram illustrating the configuration of, and processing executed by, a subject state determination/display unit.

FIG. 6 is a diagram illustrating, in detail, an example of the configuration of the subject state determination/display unit 120.

As illustrated in FIG. 6, the subject state determination/display unit 120 includes a facial orientation information detection unit 121, a facial position information detection unit 122, a facial expression attitude determination unit 123, an abnormal state display information generation unit 124, and a display timing adjustment unit 125.

The subject state determination/display unit 120 analyzes the facial image of the user 10 contained in the capture signal 21 input from the image capturing unit 20. The facial orientation information detection unit 121 analyzes the orientation of the face of the user 10.

Figure 7A:
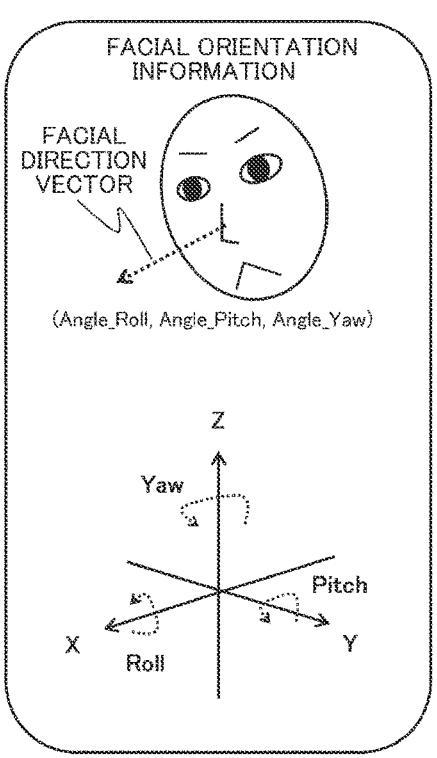
FIG. 7 is a diagram illustrating facial orientation and facial position detection processing.

Specifically, as illustrated in FIG. 7A, a rotation angle with respect to each axis (x, y, z) of a three-dimensional space is detected for a face direction vector indicating the orientation of the face of the user 10.

In other words, the following rotation angles of the face direction vector are detected.

Rotation angle with respect to the x axis: roll angle (Angle_Roll)

Rotation angle with respect to the y axis: pitch angle (Angle_Pitch)

Rotation angle with respect to the z axis: yaw angle (Angle_Yaw)

Facial orientation information constituted by these rotation angles is generated.

On the other hand, the facial position information detection unit 122 analyzes the position of the facial image of the user 10 contained in the capture signal 21 input from the image capturing unit 20.

Figure 7B:
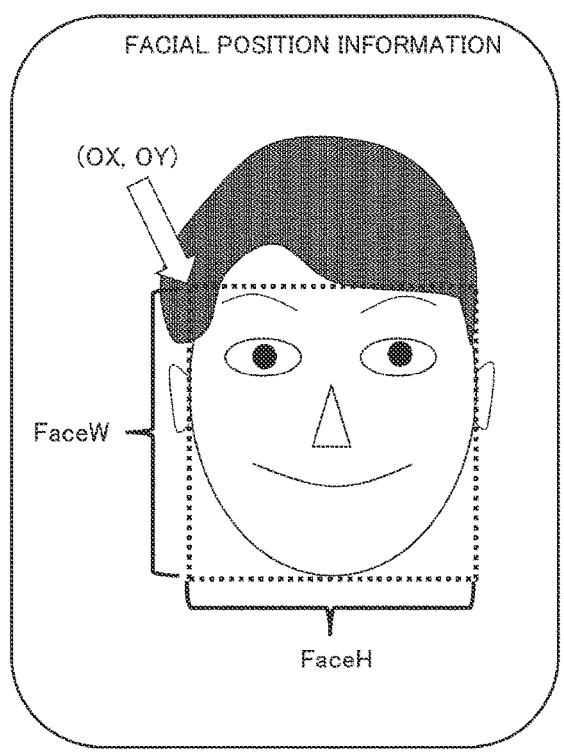

Specifically, as illustrated in FIG. 7B, for example, a rectangular region constituted by the width of the face (the distance between the bases of the ears) and the height of the face (the height from the top end of the eyebrows to the bottom end of the chin) is detected, and facial position information constituted by the parameters of the upper-left coordinate of the rectangle (OX, OY), the width of the rectangle FaceW, and the height of the rectangle FaceH is generated.

The facial orientation information generated by the facial orientation information detection unit 121 and the facial position information generated by the facial position information detection unit 122 are input to the facial expression attitude determination unit 123.

The facial expression attitude determination unit 123 inputs the facial orientation information generated by the facial orientation information detection unit 121 and the facial position information generated by the facial position information detection unit 122, and furthermore inputs the standard attitude information 51b, which is stored in the storage unit 50 in advance.

In other words, the facial expression attitude determination unit 123 inputs the standard attitude information 51b, which is attitude data included in the standard data 51 stored in the storage unit 50 in advance, i.e., the standard data 51 constituted by the 3D model generated in advance by shooting the user 10 in an expressionless state and the attitude data thereof. The facial expression attitude determination unit 123 compares the standard attitude information 51b, the facial orientation information generated by the facial orientation information detection unit 121, and the facial position information generated by the facial position information detection unit 122.

As a result of this comparison, the degree to which the current facial position and facial orientation of the user 10 deviates from the facial position and orientation in the standard data is analyzed, and abnormality degree information indicating the amount of deviation, i.e., a facial orientation abnormality degree and a facial position abnormality degree, is generated and output to the abnormal state display information generation unit 124.

The internal processing of the facial expression attitude determination unit 123 will be described in detail with reference to FIG. 8.

Figure 8:
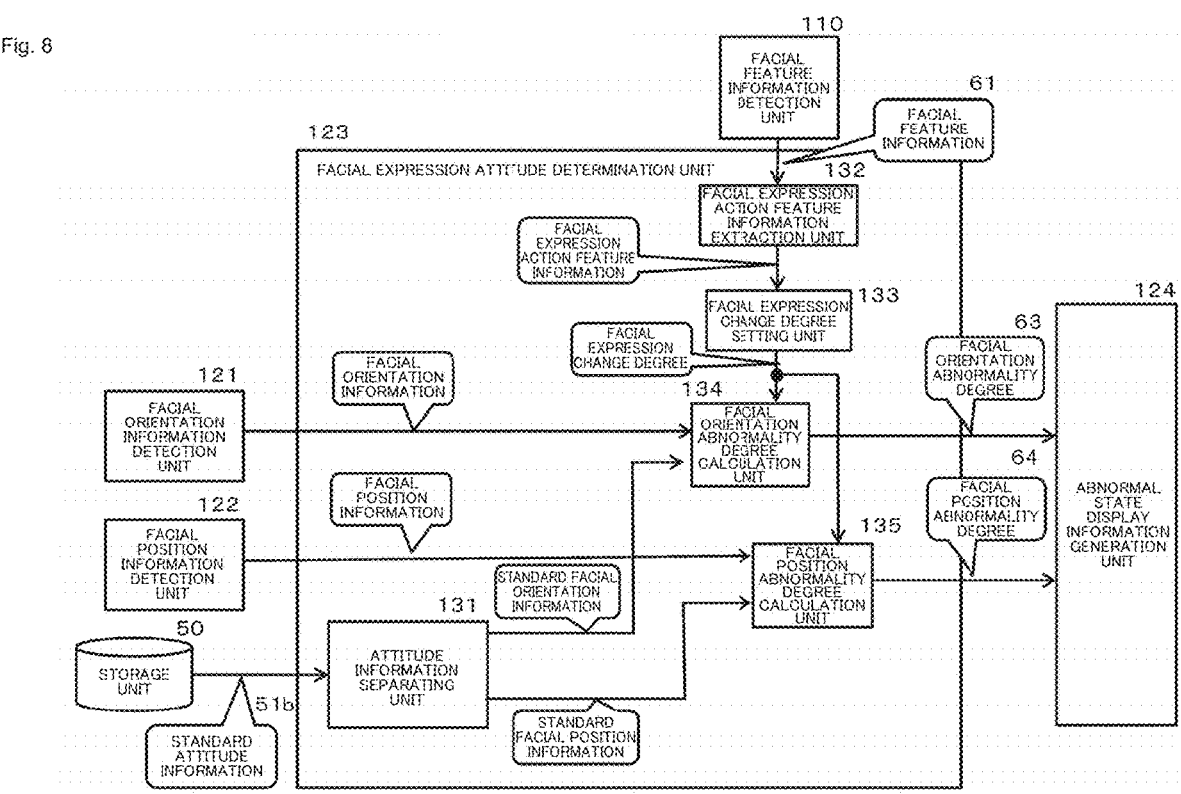
FIG. 8 is a diagram illustrating the configuration of, and processing executed by, a facial expression attitude determination unit.

As illustrated in FIG. 8, the facial expression attitude determination unit 123 includes an attitude information separating unit 131, a facial expression action feature information extraction unit 132, a facial expression change degree setting unit 133, a facial orientation abnormality degree calculation unit 134, and a facial position abnormality degree calculation unit 135.

The facial feature information 61 generated by the facial feature information detection unit 110, i.e., the facial feature information 61 indicating the positions of the parts of the face of the user (subject) 10 (the eyes, nose, mouth, and the like) and the features of the facial expression, is input to the facial expression action feature information extraction unit 132.

The facial expression action feature information extraction unit 132 extracts the facial expression action feature information from the facial feature information 61 generated by the facial feature information detection unit 110 and inputs the extracted information to the facial expression change degree setting unit 133.

The facial expression change degree setting unit 133 generates, from a distribution of the facial expression action feature information, a facial expression change degree indicating how far the facial expression of the user (subject) 10 is from the standard data (in this example, a 3D model in an expressionless state), and outputs the facial expression change degree to the facial orientation abnormality degree calculation unit 134 and the facial position abnormality degree calculation unit 135.

Note that the facial expression change degree is defined, for example, by an inter-vector distance between a vector whose elements are the values of the action units (AUs) corresponding to the facial expression action feature information in an expressionless state serving as the standard data, and a vector whose elements are the values of the action units (AUs) corresponding to the facial expression action feature information in the shot image included in the capture signal, input from the image capturing unit 20, that is currently being processed.

As the inter-vector distance increases, so too does the facial expression change degree of the facial expression in the facial image currently being processed from the facial expression in the standard data (expressionless), whereas as the inter-vector distance decreases, so too does the facial expression change degree.

On the other hand, the standard attitude information 51b is input to the attitude information separating unit 131, and in the attitude information separating unit 131, the standard attitude information 51b is separated into standard facial orientation information and standard facial position information.

The standard facial orientation information extracted from the standard data (the attitude information in an expressionless state) is constituted by the following types of rotation angle data of the face direction vectors indicating the facial orientation in the standard data (the attitude information in an expressionless state).

Rotation angle with respect to the x axis: roll angle (Angle_Roll)
Rotation angle with respect to the y axis: pitch angle (Angle_Pitch)
Rotation angle with respect to the z axis: yaw angle (Angle_Yaw)
The standard facial orientation information constituted by this data is input to the facial orientation abnormality degree calculation unit 134.

Likewise, the standard facial position information extracted from the standard data (the attitude information in an expressionless state) is constituted by the parameters of the upper-left coordinate of the rectangle (OX, OY), the width of the rectangle FaceW, and the height of the rectangle FaceH of the rectangular region constituted by the width of the face (the distance between the bases of the ears) and the height of the face (the height from the top end of the eyebrows to the bottom end of the chin), described above with reference to FIG. 7B.

The standard facial value information constituted by this data is input to the facial position abnormality degree calculation unit 135.

The facial orientation abnormality degree calculation unit 134 executes processing for comparing the facial orientation information corresponding to the image to be processed with the standard facial orientation information corresponding to the standard data.

Specifically, an absolute difference value is found for each of the roll angle, the pitch angle, and the yaw angle included in each piece of information (Abs_Diff_Roll, Abs_Diff_Pitch, Abs_Diff_Yaw).

The calculated absolute difference values are further compared with predefined threshold values, and a normalcy for each element (normalized to 0.0 to 1.0) is found.

An example of the normalcy calculation processing will be described with reference to FIG. 9.

Figure 9:
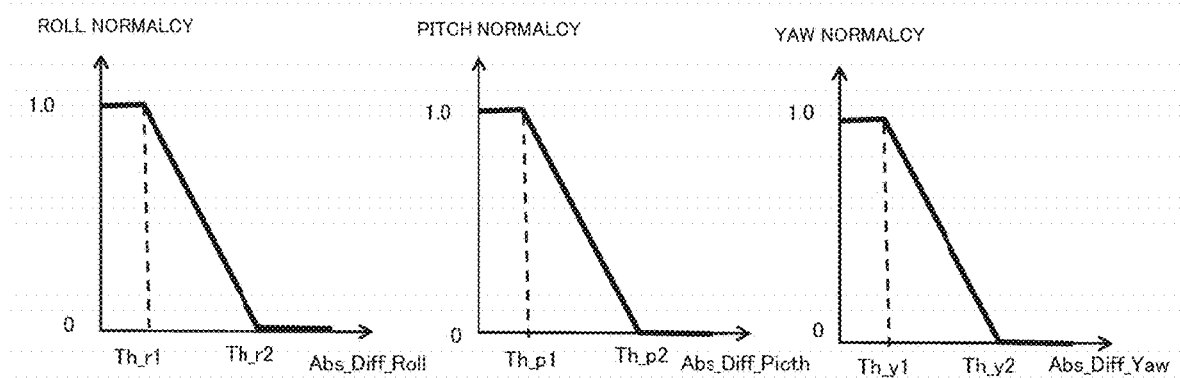
FIG. 9 is a diagram illustrating processing executed by the subject state determination/display unit.

FIG. 9 illustrates a graph of correspondence relationships between the absolute difference values of the roll angle, the pitch angle, and the yaw angle (Abs_Diff_Roll, Abs_Diff_Pitch, Abs_Diff_Yaw) included in the standard facial orientation information corresponding to the standard data and the facial orientation information corresponding to the image to be processed, and the normalcy.

Two thresholds are set for each, and if the absolute difference values between the roll angle, the pitch angle, and the yaw angle included in the facial orientation information corresponding to the image to be processed and the standard facial orientation information corresponding to the standard data are less than or equal to a first threshold (Th_r1, Th_p1, Th_y1), then the roll angle (Roll) normalcy, the pitch angle (Pitsch) normalcy, and the yaw angle (Yaw) normalcy are calculated as 1.

On the other hand, if the absolute difference values between the roll angle, the pitch angle, and the yaw angle included in the facial orientation information corresponding to the image to be processed and the standard facial orientation information corresponding to the standard data are greater than or equal to a second threshold (Th_r2, Th_p2, Th_y2), then the roll angle (Roll) normalcy, the pitch angle (Pitsch) normalcy, and the yaw angle (Yaw) normalcy are calculated as 0.

If the absolute difference values between the roll angle, the pitch angle, and the yaw angle included in the facial orientation information corresponding to the image to be processed and the standard facial orientation information corresponding to the standard data are between the two thresholds, then the roll angle (Roll) normalcy, the pitch angle (Pitsch) normalcy, and the yaw angle (Yaw) normalcy are calculated as values between 0 and 1.

The facial orientation abnormality degree calculation unit 134 calculates these three normalcies, i.e., the roll angle (Roll) normalcy, the pitch angle (Pitsch) normalcy, and the yaw angle (Yaw) normalcy, and further calculates a product of the values of the three calculated normalcies.

The value of the calculated product is furthermore subtracted from 1.0.

This difference is used as the facial orientation abnormality degree. In other words, facial orientation abnormality degree=1.0−(product of three normalcies)

The facial orientation abnormality degree is calculated according to the above expression.

A facial orientation abnormality degree 63 calculated by the facial orientation abnormality degree calculation unit 134 is output to the abnormal state display information generation unit 124.

The threshold values used in the processing described in FIG. 9 are preferably set to use a predetermined threshold value according to the value of the facial expression change degree calculated by the facial expression change degree setting unit described earlier and the type of facial expression being shot. Making this setting reduces the influence of the type of facial expression. For example, the setting is such that a low threshold is used for a facial expression in which the eyes are simply closed, and a high threshold is used for a facial expression having a wide, open-mouthed smile.

On the other hand, the facial position abnormality degree calculation unit 135 performs processing for comparing a standard facial position in the standard attitude information 51*b* contained in the standard data 51 stored in the storage unit 50 and the facial position corresponding to the image to be processed.

The facial position information is constituted by, for example, the parameters of the upper-left coordinate of the rectangle (OX, OY), the width of the rectangle FaceW, and the height of the rectangle FaceH of the rectangular region constituted by the width of the face (the distance between the bases of the ears) and the height of the face (the height from the top end of the eyebrows to the bottom end of the chin), described above with reference to FIGS. 7A and 7B.

A specific example of the processing by the facial position abnormality degree calculation unit 135 for comparing a standard facial position in the standard attitude information 51*b* contained in the standard data 51 stored in the storage unit 50 and the facial position corresponding to the image to be processed will be described with reference to FIG. 10.

Figure 10:
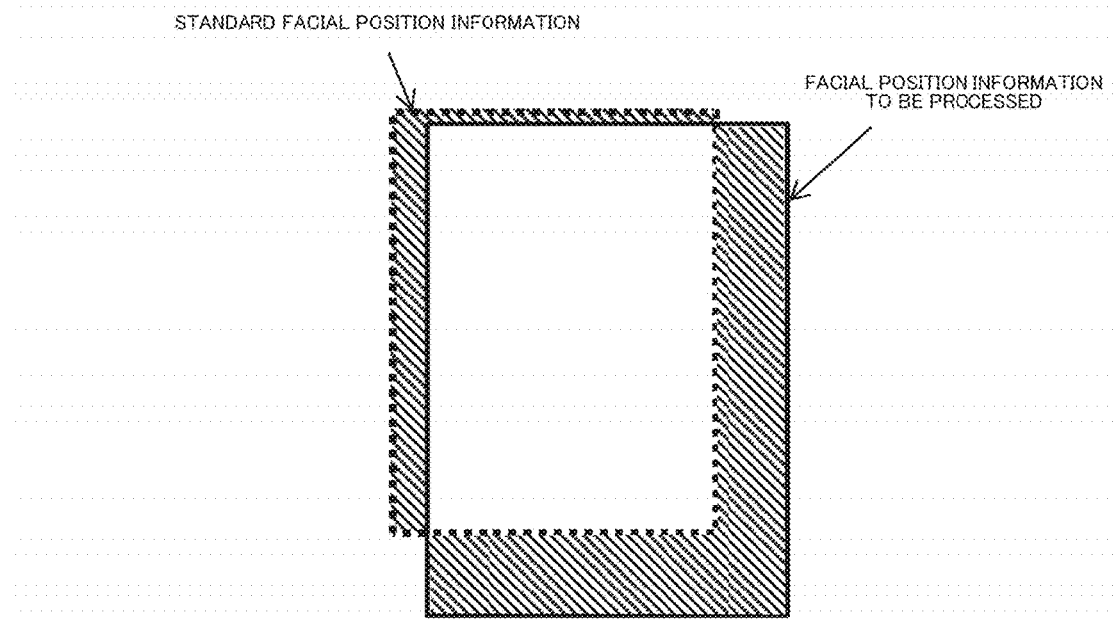
FIG. 10 is a diagram illustrating processing executed by the subject state determination/display unit.

Assume that the dotted line rectangle illustrated in FIG. 10 is standard facial position information in the standard attitude information 51*b* contained in the standard data 51 stored in the storage unit 50, and the solid line rectangle illustrated in FIG. 10 is the facial position information corresponding to the image to be processed.

First, the facial position abnormality degree calculation unit 135 calculates the areas of two regions, namely the area of a region where the two rectangular regions do not overlap (the hatched part), as a differential region (DiffArea), and the area of the rectangular region corresponding to the standard facial position information (the dotted line rectangle region), as a reference region (RefArea).

Next, the facial position abnormality degree (FacePosErr) is calculated according to the following (Equation 1).

FacePosErr=(DiffArea)/(RefArea)    (Equation 1)

Here, when FacePosErr>1.0, FacePosErr=1.0.

The facial position abnormality degree calculation unit 135 outputs the facial position abnormality degree calculated according to the foregoing (Equation 1) to the abnormal state display information generation unit 124.

On the basis of the values of the facial orientation abnormality degree and the facial position abnormality degree, the abnormal state display information generation unit 124 generates display information indicating an abnormal state in the display unit 30 that can be observed by the user 10, i.e., the subject state determination information 32.

A specific example of the subject state determination information 32 generated by the abnormal state display information generation unit 124 will be described below with reference to FIG. 11.

Figure 11:
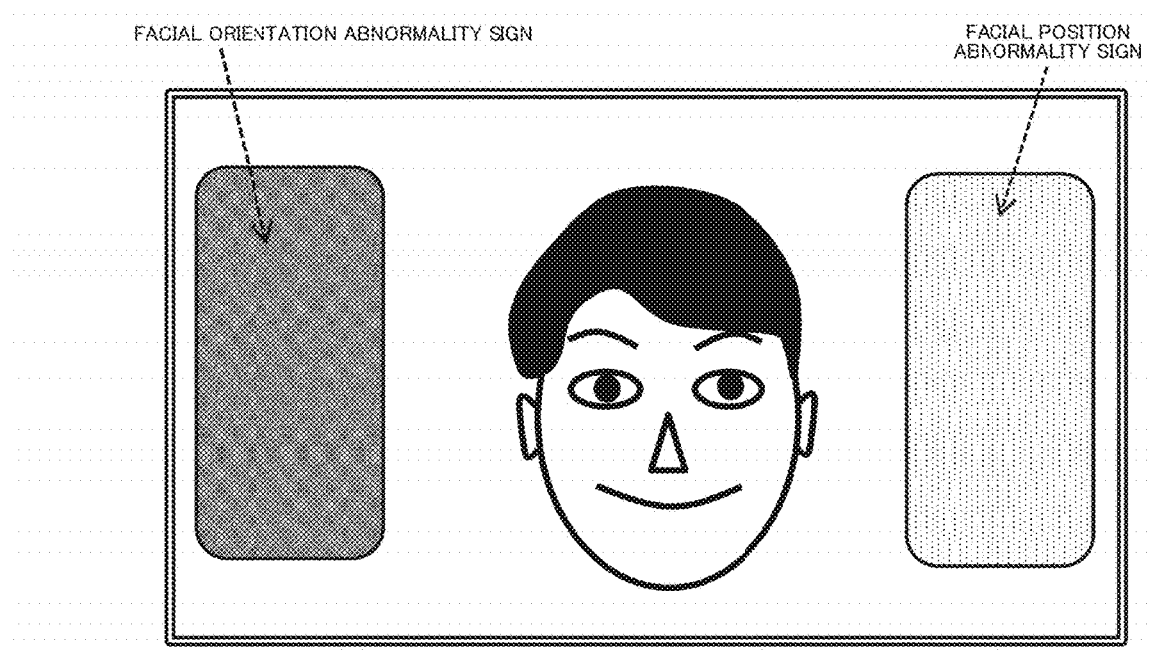
FIG. 11 is a diagram illustrating processing for displaying subject state determination information, executed by the subject state determination/display unit.

FIG. 11 is a diagram illustrating an example of the subject state determination information 32 generated by the abnormal state display information generation unit 124.

As illustrated in FIG. 11, a sign communicating an abnormal state is displayed in the periphery of a region where the face of the user (subject) 10 appears, in a form that can be easily perceived even in the peripheral vision. The example illustrated in FIG. 11 is an example of displaying information (a sign) indicating a degree of abnormality in the facial orientation on the left side of the region where the face of the user (subject) 10 appears, and information (a sign) indicating a degree of abnormality in the facial position on the right side.

Each of these signs is set as a display region having a prominent color, such as red or yellow, for example. As the degree of abnormality increases, the transparency of the output color is reduced to produce a vivid color output, and as the degree of abnormality decreases, the transparency of the output color is increased to produce an inconspicuous display.

Alternatively, each display region may be set to flash, and the speed of the flashing can be changed according to the degree of abnormality.

Figure 12:
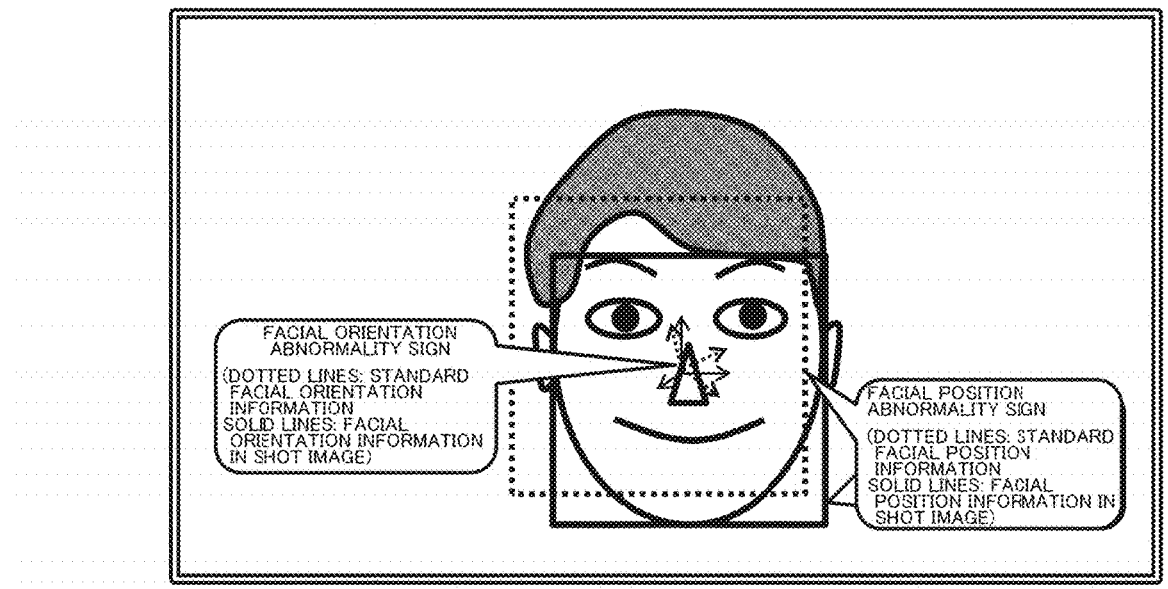
FIG. 12 is a diagram illustrating processing for displaying subject state determination information, executed by the subject state determination/display unit.

FIG. 12 is a diagram illustrating a different example of the subject state determination information 32 generated by the abnormal state display information generation unit 124.

The example illustrated in FIG. 12 is an example of a facial orientation abnormality sign indicating the facial orientation abnormality degree, with a dotted line and a solid line, or different colors, respectively, for a three-axis arrow indicating the standard facial orientation information and a three-axis arrow indicating the facial orientation information of the shot image.

A facial position abnormality sign, which indicates the facial position abnormality degree, is an example of a rectangle indicating the standard facial position information and three rectangles indicating the facial position information in the shot image, each displayed with a dotted line and a solid line, or with different colors.

Figure 13:
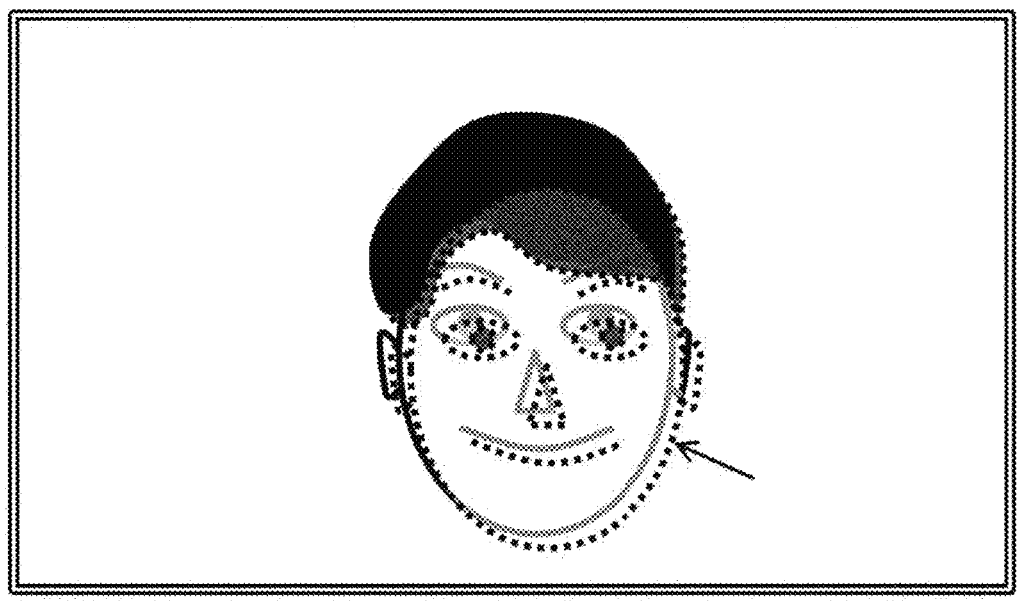
FIG. 13 is a diagram illustrating processing for displaying subject state determination information, executed by the subject state determination/display unit.

Furthermore, FIG. 13 illustrates an example of the display of different subject state determination information 32.

The example illustrated in FIG. 13 is an overlay display of the shot image shot when the standard data is generated and the current shot image to be processed. The user 10 can recognize the degree of abnormality from the way in which these two images overlap.

The abnormal state display information generation unit 124 displays the subject state determination information 32 in the display unit 30 in one of the states described with reference to FIGS. 11 to 13. Note that the configuration may be such that other display formats are used, alarms are output, or the like.

In this manner, by presenting the abnormal state to the user (subject) 10, the user (subject) 10 themselves can understand deviation from a normal state and correct the deviation immediately.

The display timing adjustment unit 125 adjusts the display timing of the subject state determination information 32 in the display unit 30.

For example, by deliberately delaying the display timing of the subject state determination information 32, when the user shifts their eyes from looking at the camera to looking at the display, they can check the status of their own face looking at the camera, which is displayed with a delay. In addition, facial expressions such as closing the eyes or shifting the gaze can be confirmed by the subject themselves in the same manner by delaying the display timing.

2-3. Details of Configuration of, and Processing Executed by, Input Data Selection Unit The configuration of, and the processing executed by, the input data selection unit 140 will be described in detail next.

Figure 14:
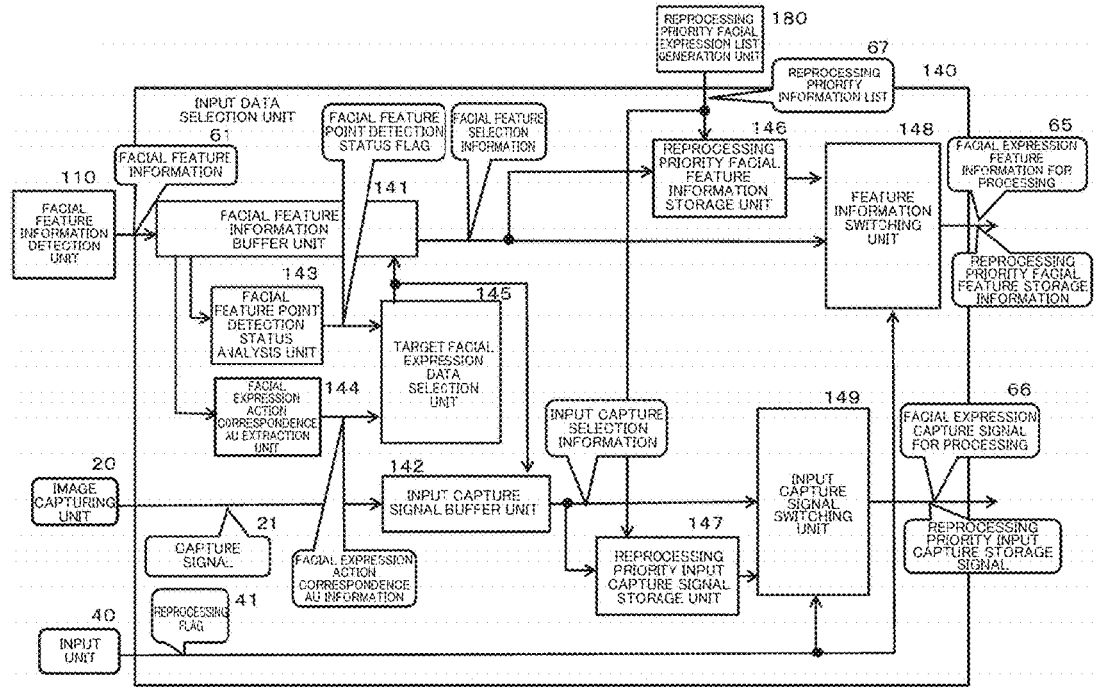
FIG. 14 is a diagram illustrating the configuration of, and processing executed by, an input data selection unit.

FIG. 14 is a diagram illustrating, in detail, an example of the configuration of the input data selection unit 140.

As illustrated in FIG. 14, the input data selection unit 140 includes a facial feature information buffer unit 141, an input capture signal buffer unit 142, a facial feature point detection status analysis unit 143, a facial expression action correspondence AU (action unit) extraction unit 144, a target facial expression data selection unit 145, a reprocessing priority facial feature information storage unit 146, a reprocessing priority input capture signal storage unit 147, a feature information switching unit 148, and an input capture signal switching unit 149.

The facial feature information buffer unit 141 is input with the facial feature information 61 detected by the facial feature information detection unit. Note that the facial feature information 61 includes the following data, as described earlier.

(a) the facial feature point information constituted by the position information and detection reliability information of each feature point, input from the facial feature point detection unit 111, and (b) the facial expression action feature information input from the facial expression action feature detection unit 112.

The facial feature information 61 is data in which each of the information (a) and (b) are multiplexed.

The facial feature information buffer unit 141 inputs the facial feature information 61 detected by the facial feature information detection unit, and temporarily saves the data of a plurality of instances of facial feature information in which the same type of facial expression is shot at different times.

Likewise, the input capture signal buffer unit 142 inputs the capture signal 21 input from the image capturing unit 20, and saves the data of a plurality of capture signals of the same type of facial expression at different times.

The purpose of the processing of the input data selection unit 140 is to select the preferred input data for 3D model generation. This data selection is executed according to the following two indicators.

(Selection index 1) The data in which the detection state of facial feature points has the most reliable facial expression is selected.

(Selection index 2) The data in which the facial expression to be processed has the greatest change from the expressionless state is selected to the greatest extent possible.

The above selection index 1 is executed using the analysis result from the facial feature point detection status analysis unit 143.

If the detection reliabilities of each facial feature point included in the facial feature information 61 (0.0 to 1.0, with higher values indicating a higher reliability) are all above a threshold (there are no erroneous detections in any of the facial feature points), the facial feature point detection status analysis unit 143 outputs a facial feature point detection status flag of 1 to the target facial expression data selection unit 145, and 0 when such is not the case.

On the other hand, the selection index 2 is executed using the analysis result from the facial expression action correspondence AU detection unit 144.

The facial expression action correspondence AU detection unit 144 extracts the strength of the action unit (AU) that responds to the facial expression to be shot for the facial expression action feature information included in the facial feature information 61. For example, if the image to be processed is the facial expression illustrated in FIGS. 15A, 15B and 15C, with the mouth wide open, AU 27 in the action unit classification described earlier with reference to FIG. 5 corresponds to the facial expression.

If a plurality of AUs respond to the facial expression in the image to be processed, the average value of those AUs is calculated and the calculated value is output to the target facial expression data selection unit 145 as facial expression action correspondence AU information.

The target facial expression data selection unit 145 selects the data, among the data buffered in the facial feature information buffer unit 141, for which the facial feature point detection status flag information is 1 and the strength of the action unit (AU) indicated by the facial expression action correspondence AU information is the highest.

The target facial expression data selection unit 145 outputs this selection result as input data selection information to the facial feature information buffer unit 141 and the input capture signal buffer unit 142, and outputs the data selected from each buffer unit as facial feature selection information and an input capture selection signal, respectively.

The reprocessing priority facial feature information storage unit 146 and the reprocessing priority input capture signal storage unit 147 store the data to be reprocessed from the facial feature selection information or the input capture selection signal on the basis of the reprocessing priority facial expression list 67 input from the reprocessing priority information list generation unit 180.

When the reprocessing flag 41 input from the input unit 40 is 1, the mode is a mode in which reprocessing is performed, and thus the feature information switching unit 148 and the input capture signal switching unit 149 output the signals output from the reprocessing priority facial feature information storage unit 146 and the reprocessing priority input capture signal storage unit 147 (reprocessing priority facial feature storage information and a reprocessing priority input capture storage signal) as the facial expression feature information for processing 65 and the facial expression capture signal for processing 66, respectively.

On the other hand, in normal processing where the reprocessing flag 41 input from the input unit 40 is 0, the feature information switching unit 148 and the input capture signal switching unit 149 output the facial feature selection information and the input capture selection signal to the facial expression feature information for processing 65 and the facial expression capture signal for processing 66, respectively.

In this manner, the input data selection unit 140 selects and stores data for generating a 3D model in accordance with the above-described selection indices 1 and 2. This process makes it possible for input data having large changes in facial expression, which has fewer erroneous detections for facial feature points, to be input to the facial expression 3D model generation unit 170 in a later stage.

A specific data selection example executed by the input data selection unit 140 will be described with reference to FIGS. 15A, 15B and 15C. FIGS. 15A, 15B and 15C illustrates three sets of data.

FIG. 15A shot data a=feature point error detected, corresponding facial expression AU strength=high FIG. 15B shot data b=no feature point error detected, corresponding facial expression AU strength=medium FIG. 15C shot data c=no feature point error detected, corresponding facial expression AU strength=high These instances of shot data are buffered, and when data to be applied to 3D model generation processing is selected from among these instances of data and output to the facial expression 3D model generation unit 170, the input data selection unit 140 selects the data for generating the 3D model according to the above-described selection indices 1 and 2.

The shot data c in FIG. 15C is selected as a result.

In this manner, by selecting the data for generating a 3D model according to the above-described selection indices 1 and 2, data having few erroneous detections for facial feature points and in which there is a large change from an expressionless state can be selected and passed to the facial expression 3D model generation unit 170 in a later stage. As a result, the facial expression 3D model generation unit 170 can generate an accurate target shape suited to a blendshape, for example.

2-4. Details of Configuration of, and Processing Executed by, Facial Expression 3D Model Prediction Unit The configuration of, and the processing executed by, the facial expression 3D model prediction unit 150 will be described in detail next.

Figure 16:
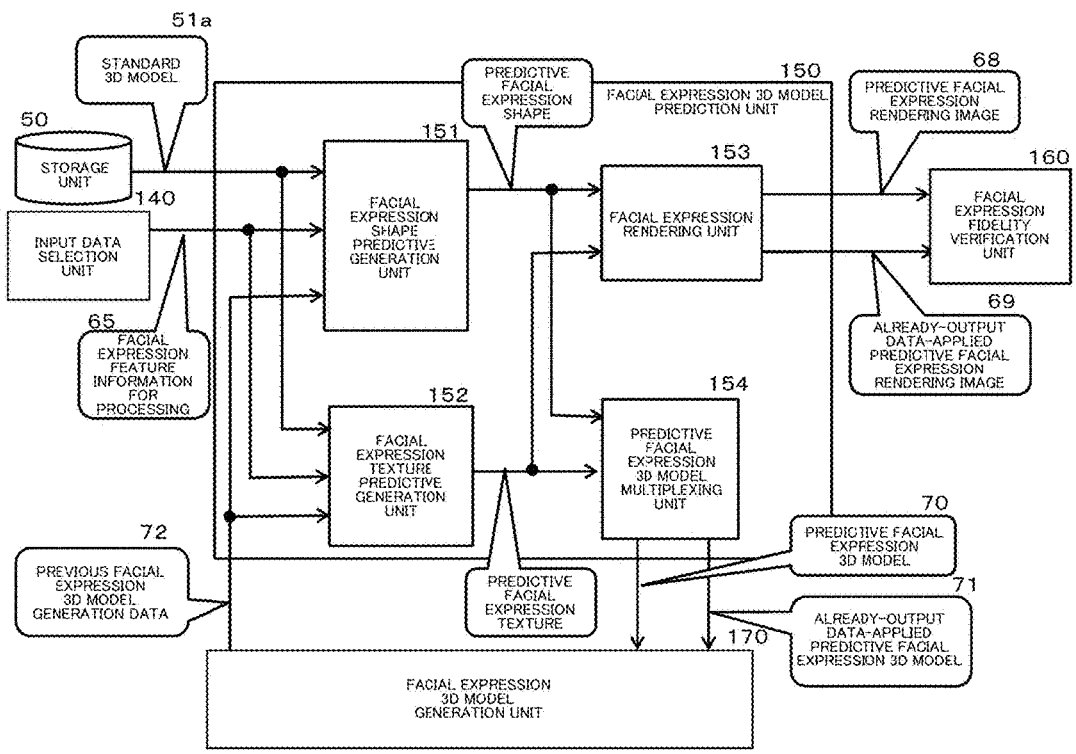
FIG. 16 is a diagram illustrating the configuration of, and processing executed by, a facial expression 3D model prediction unit.

FIG. 16 is a diagram illustrating, in detail, an example of the configuration of the facial expression 3D model prediction unit 150.

As illustrated in FIG. 16, the facial expression 3D model prediction unit 150 includes a facial expression shape predictive generation unit 151, a facial expression texture predictive generation unit 152, a facial expression rendering unit 153, and a predictive facial expression 3D model multiplexing unit 154.

The facial expression shape predictive generation unit 151 inputs the standard 3D model 51*a* included in the standard data 51 generated previously and stored in the storage unit 50, and the facial expression feature information for processing 65 generated by the input data selection unit 140, generates a predictive facial expression shape on the basis of the input data, and outputs the predictive facial expression shape to the facial expression rendering unit 153 and the predictive facial expression 3D model multiplexing unit 154.

Note that the standard 3D model 51*a* is a standard 3D model including shape and texture information.

The facial expression shape predictive generation unit 151, for example, uses an average facial expression variation shape of each facial expression (a difference between an average face with no expression and the shape of the facial expression) generated from a large amount of 3D scan data of facial expressions, and performs weighted addition with the shape of the standard 3D model 51*a* to generate the predictive facial expression shape. Alternatively, learning techniques such as Deep Learning can be used to make predictions directly from an expressionless 3D model. Furthermore, weighting coefficients for each facial expression variation shape may be set from the facial expression action feature information (Action Unit) included in the facial expression feature information for processing 65.

The facial expression shape predictively generated by the facial expression shape predictive generation unit 151 is output to the facial expression rendering unit 153 and the predictive facial expression 3D model multiplexing unit 154 as facial expression predictive shape information.

On the other hand, the facial expression texture predictive generation unit 152 predictively generates texture information of the facial expression to be processed on the basis of the standard 3D model 51*a* and the facial expression feature information for processing 65 in the same manner, and outputs the texture information to the facial expression rendering unit 153 and the predictive facial expression 3D model multiplexing unit 154 as facial expression predictive texture information.

The texture prediction processing performed by the facial expression texture predictive generation unit 152 may, for example, use the texture information contained in the standard 3D model 51*a* as is, or use learning techniques such as Deep Learning to perform predictive generation with high accuracy.

The 3D model multiplexing unit 154 multiplexes the facial expression predictive shape information and the facial expression predictive texture information, and outputs the result to the facial expression 3D model generation unit 170 as the predictive facial expression 3D model 70.

On the basis of the facial expression predictive shape information and the facial expression predictive texture information, the facial expression rendering unit 153 generates an image by mapping the facial expression predictive texture information onto each mesh in the facial expression predictive shape information in a state where the facial orientations and sizes are aligned, indicated by the standard 3D model 51*a*, and outputs the image to the facial expression fidelity verification unit 160 as the predictive facial expression rendering image 68.

Note that using a learning technique such as Deep Learning, the processing for predicting shapes and textures from the standard 3D model 51*a*, the processing utilizing the facial expression action feature information (AU: Action Unit), and the like can use the methods disclosed in, for example, NPL 5, "'paGAN: Real-time Avatars Using Dynamic Textures', by KOKI NAGANO (SIGGRAPH ASIA 2018), ACM Transactions on Graphics, Vol. 37, No. 6, Article 258. Publication date: November 2018", NPL 6, "'GANimation: Anatomically-aware Facial Animation from a Single Image' by Albert Pumarola (ECCV2018)", and the like.

However, for the purpose of the present invention, it is desirable that the amount of processing be high enough to enable predictive generation at near real-time speed and online.

Note that the configuration may be such that when previous facial expression 3D model generation data generated by the facial expression 3D model generation unit 170 is present, as illustrated in FIG. 16, in the facial expression 3D model prediction processing by the facial expression 3D model prediction unit 150, the "previous facial expression 3D model 72" generated on the basis of the immediately-previous shot image is input to the facial expression shape predictive generation unit 151 and the facial expression texture predictive generation unit 152 from the facial expression 3D model generation unit 170, and on the basis of the "previous facial expression 3D model 72", separate and additional prediction processing for shapes and textures is performed, with the already-output data-applied predictive facial expression 3D model 71 and the already-output data-applied predictive facial expression rendering image 69 predicted using the previous facial expression 3D model generation data 72 being additionally output.

2-5. Details of Configuration of, and Processing Executed by, Facial Expression Fidelity Verification Unit The configuration of, and the processing executed by, the facial expression fidelity verification unit 160 will be described in detail next.

Figure 17:
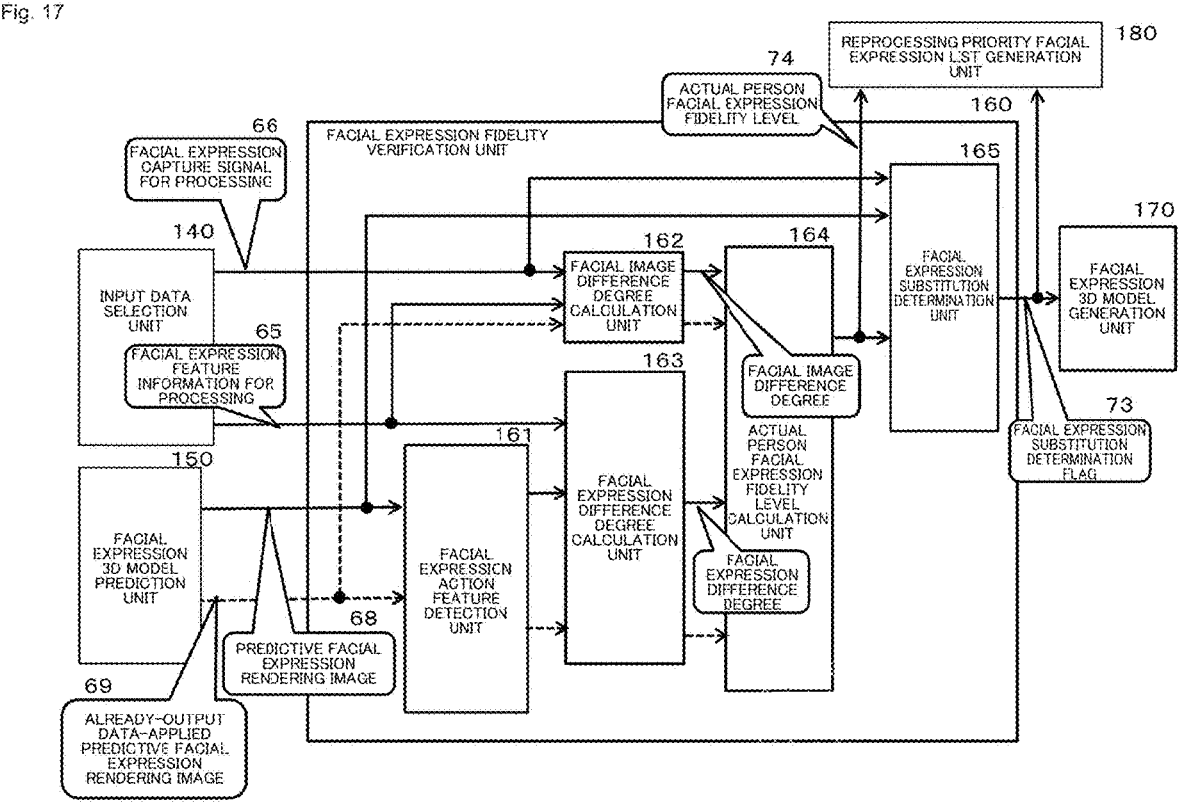
FIG. 17 is a diagram illustrating the configuration of, and processing executed by, a facial expression fidelity verification unit.

FIG. 17 is a diagram illustrating, in detail, an example of the configuration of the facial expression fidelity verification unit 160.

As illustrated in FIG. 17, the facial expression fidelity verification unit 160 includes a facial expression action feature detection unit 161, a facial image difference degree calculation unit 162, a facial expression difference degree calculation unit 163, an actual person facial expression fidelity level calculation unit 164, and a facial expression substitution determination unit 165.

The facial expression fidelity verification unit 160 inputs the facial expression capture signal for processing 66 and the facial expression feature information for processing 65 from the input data selection unit 140.

Furthermore, the predictive facial expression rendering image 68 and the already-output data-applied predictive facial expression rendering image 69 are input from the facial expression 3D model prediction unit 150.

On the basis of this input data, the facial expression fidelity verification unit 160 performs processing for verifying the degree to which the predictive facial expression rendering image 68, as well as the already-output data-applied predictive facial expression rendering image 69 when the already-output data-applied predictive facial expression rendering image 69 is present, resemble the facial image included in the facial expression capture signal for processing 66. Note that in FIG. 17, the flow of processing on the already-output data-applied predictive facial expression rendering image 69 is indicated by a dotted line.

First, the facial image difference degree calculation unit 162 calculates a facial image difference degree, which is an indicator expressing how different the predictive facial expression rendering image 68 is from the already-output data-applied predictive facial expression rendering image 69 and the image included in the facial expression capture signal for processing 66, and outputs the calculated facial image difference degree to the actual person facial expression fidelity level calculation unit 164. The indicator of the difference may be a MSE (Mean Square Error) for pixel values, or an SSIM (Structural Similarity), which is used as a codec image quality indicator and the like.

Figure 18A:
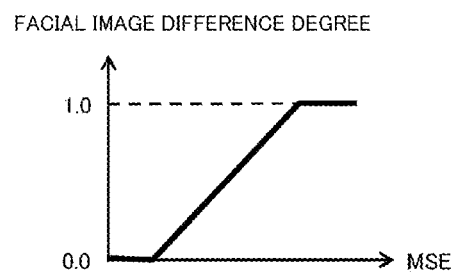
FIGS. 18A, 18B, 18C and 18D are diagrams illustrating processing executed by the facial expression fidelity verification unit.
Figure 18B:
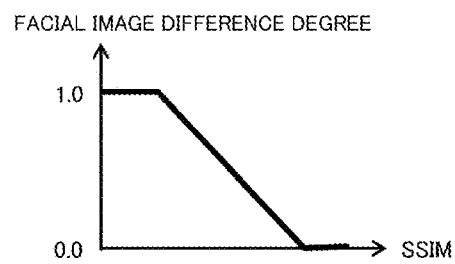

Using one of these indicators, a value which has been normalized in threshold processing such as that illustrated in FIG. 18A or 18B (0.0 to 1.0), or a weighted average of normalized values found for the two indicators, is used as the facial image difference degree.

On the other hand, the facial expression action feature detection unit 161 generates, and inputs to the facial expression difference degree calculation unit 163, predictive facial expression action feature information on the basis of the predictive facial expression rendering image 68 and the already-output data-applied predictive facial expression rendering image 69.

The processing of generating the predictive facial expression action feature information, executed by the facial expression action feature detection unit 161, is the same processing as the processing executed by the facial expression action feature detection unit 112 described earlier with reference to FIG. 3. In other words, which action unit (AU) the user's facial expression resembles is calculated as the strength of each AU (e.g., a normalized value from 0.0 to 1.0), and the calculated value is input to the facial expression difference degree calculation unit 163 as the predictive facial expression action feature information.

The predictive facial expression action feature information calculated by the facial expression action feature detection unit 161 for the predictive facial expression rendering image 68 and the already-output data-applied predictive facial expression rendering image 69 is input to the facial expression difference degree calculation unit 163 along with the facial expression action feature information for processing The facial expression difference degree calculation unit 163 calculates a facial expression difference degree on the basis of a distance between a vector that takes the value of each action unit (AU) indicated by the predictive facial expression action feature information as an element ("predictive facial expression AU vector" hereinafter) and a vector that takes the value of each action unit (AU) indicated by the facial expression action feature information for processing 65 as an element ("processing target facial expression AU vector" hereinafter), and outputs the facial expression difference degree to the actual person facial expression fidelity level calculation unit 164.

Figure 18C:
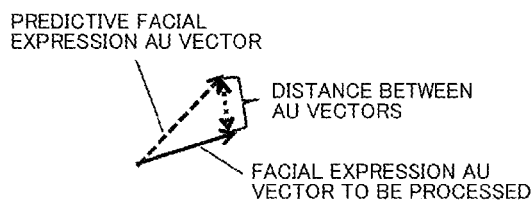
Figure 18D:
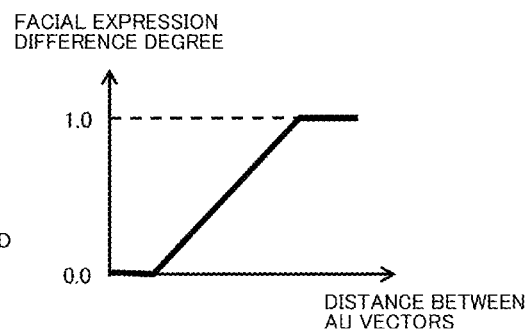

Specifically, as illustrated in FIGS. 18C and 18D, a value normalized (0.0-1.0) in threshold processing is set such that as the inter-vector distance increases, so too does the facial expression difference degree.

At the time of the first facial expression shooting, the actual person facial expression fidelity level calculation unit 164 calculates the product of the facial image difference degree and the facial expression difference degree, or a weighted average of the facial image difference degree and the facial expression difference degree, as the actual person facial expression fidelity level 74, and outputs the actual person facial expression fidelity level 74 to the facial expression substitution determination unit 165 and the reprocessing priority facial expression list generation unit 180.

The facial expression substitution determination unit 165 sets the facial expression substitution determination flag 73 to 1 when the actual person facial expression fidelity level 74 is greater than or equal to a given threshold, and to 0 when not. Alternatively, the user 10 or an operator may visually confirm the facial image actually contained in the facial expression capture signal for processing 66 and the predictive facial expression rendering image 68, and set the facial expression substitution determination flag 73 to 1 when the two are similar and to 0 when not.

Note that in the second and subsequent facial expression shooting, the predictive generation processing is performed in the facial expression 3D model prediction unit 150 using the previous facial expression 3D model generation data 111, and the already-output data-applied predictive facial expression rendering image 69 is output from the facial expression 3D model prediction unit 150, and as such, the above-described processing is also performed on the already-output data-applied predictive facial expression rendering image 69 according to the dotted line route illustrated in FIG. 17.

In this case, the higher of the two types of actual person facial expression fidelity levels which have been calculated is set as the final actual person facial expression fidelity level 74.

At this time, if the actual person facial expression fidelity level using the already-output data-applied predictive facial expression rendering image 69 is higher, the facial expression substitution determination flag 73 is output as 2.

When the value of the facial expression substitution determination flag 73 is 1, the facial expression 3D model generation unit 170 does not generate a new 3D model based on the shot image, and outputs the predictive facial expression 3D model 70 input from the facial 3D model prediction unit 150 as-is as the facial expression 3D model 52.

When the value of the facial expression substitution determination flag 73 is 2 too, the facial expression 3D model generation unit 170 does not generate a new 3D model based on the shot image, and outputs the already-output data-applied predictive facial expression 3D model 71 input from the facial 3D model prediction unit 150 as-is as the facial expression 3D model 52.

Only when the value of the facial expression substitution determination flag 73 is 0, the facial expression 3D model generation unit 170 generates a new 3D model based on the shot image.

When the 3D model obtained by the prediction processing can be used in this manner, omitting the processing of the facial expression 3D model generation unit 170 enables more efficient processing.

2-6. Details of Configuration of, and Processing Executed by, Facial Expression 3D Model Generation Unit The configuration of, and the processing executed by, the facial expression 3D model generation unit 170 will be described in detail next.

Figure 19:
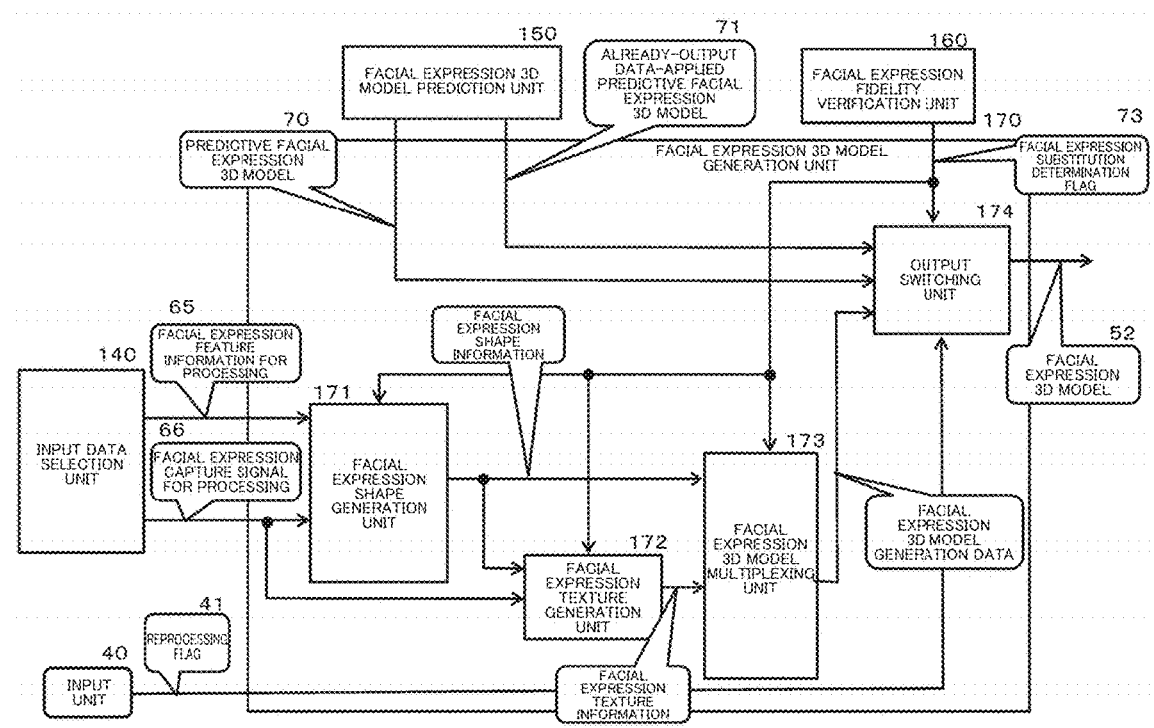
FIG. 19 is a diagram illustrating the configuration of, and processing executed by, a facial expression 3D model generation unit.

FIG. 19 is a diagram illustrating, in detail, an example of the configuration of the facial expression 3D model generation unit 170.

As illustrated in FIG. 19, the facial expression 3D model generation unit 170 includes a facial expression shape generation unit 171, a facial expression texture generation unit 172, a facial expression 3D model multiplexing unit 173, and an output switching unit 174.

The facial expression shape generation unit 171 inputs the facial expression feature information for processing 65 and the facial expression capture signal for processing 66 from the input data selection unit 140.

The facial expression shape generation unit 171 generates facial expression shape information from the RGB face image and depth signal included in the facial expression capture signal for processing 66, using the position of each part of the face and facial expression feature amounts included in the facial expression feature information for processing 65, and outputs the facial expression shape information to the facial expression texture generation unit 172 and the facial expression 3D model multiplexing unit 173.

The facial expression texture generation unit 172 inputs the facial expression capture signal for processing 66 from the input data selection unit 140, and furthermore inputs the facial expression shape information generated by the input facial expression shape generation unit 171.

The facial expression texture generation unit 172 generates texture data that is mapped to each mesh of the facial expression shape information as facial expression texture information from the RGB face images included in the facial expression capture signal for processing 66, and outputs the texture data to the facial expression 3D model multiplexing unit 173.

The facial expression 3D model multiplexing unit 173 multiplexes the facial expression shape information and the facial expression texture information, and outputs the result to the output switching unit 174 as facial expression 3D model generation data.

Note that the processing described in the following documents, for example, can be applied as the processing executed by the facial expression shape generation unit 171 and the facial expression texture generation unit 172.

When using RGB images and depth signals for the facial expression capture signal for processing 66, the method described in NPL 2, "'Rapid Photorealistic Blendshape Modeling from RGB-D Sensors', by Dan Casas (CASA 2016) May 23-25, 2016", and NPL 7 "'Real-time Expression Transfer for Facial Reenactment', by Justus Thies (ACM Transactions on Graphics 2015)", can be used.

If only RGB images are used, the method described in NPL 8 "'A Multiresolution 3D Morphable Face Model and Fitting', by Patric Huber (VISAPP2016)", and NPL 9 "'Real-time Facial Animation with Image-based Dynamic Avatars', by Chen Cao (SIGGRAPH 2016)", can be used.

Note that in the facial expression 3D model generation unit 170, if, for example, the facial expression substitution determination flag 73 input from the facial expression fidelity verification unit 160 is 1, the processing of the facial expression shape generation unit 171, the facial expression texture generation unit 172, and the facial expression 3D model multiplexing unit 173 is stopped, and the predictive facial expression 3D model 70 input from the facial expression 3D model prediction unit 150 is output as-is as the facial expression 3D model 52 by the output switching unit 174.

Similarly, if the facial expression substitution determination flag 73 is 2, the processing of the facial expression shape generation unit 171, the facial expression texture generation unit 172, and the facial expression 3D model multiplexing unit 173 is stopped, and the already-output data-applied predictive facial expression 3D model 71 input from the facial expression 3D model prediction unit 150 is output as-is as the facial expression 3D model 52 by the output switching unit 174.

If the facial expression substitution determination flag 73 is 0, the processing of the facial expression shape generation unit 171, the facial expression texture generation unit 172, and the facial expression 3D model multiplexing unit 173 is performed, and the facial expression 3D model generation data output by the facial expression 3D model multiplexing unit 173 is output as the facial expression 3D model 52.

As described earlier, when the 3D model obtained by the prediction processing can be used in this manner, omitting the processing of the facial expression 3D model generation unit 170 enables more efficient processing.

2-7, Details of Configuration of, and Processing Executed by, Reprocessing Priority Facial Expression List Generation Unit The configuration of, and the processing executed by, the reprocessing priority facial expression list generation unit 180 will be described in detail next.

Figure 20:
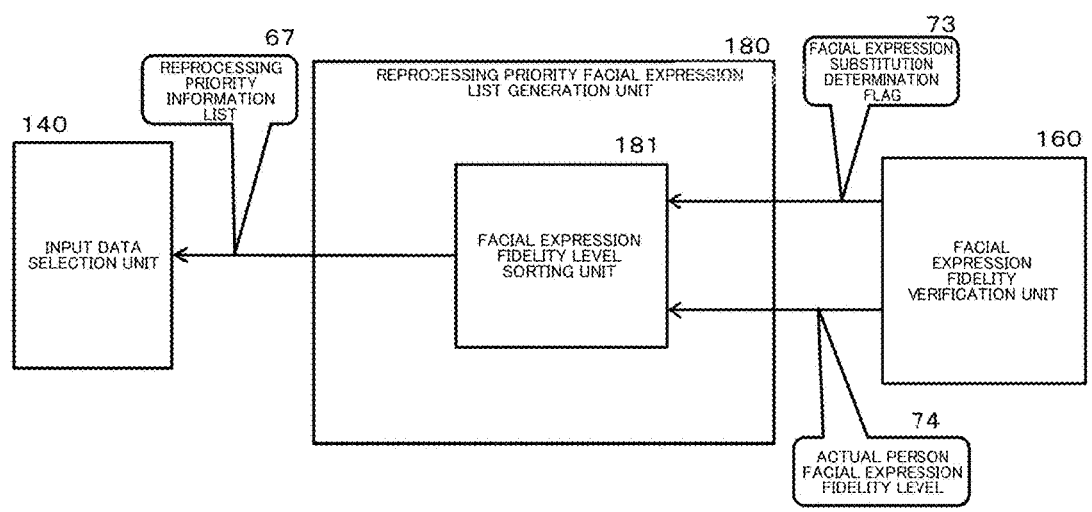
FIG. 20 is a diagram illustrating the configuration of, and processing executed by, a reprocessing priority facial expression list generation unit.

FIG. 20 is a diagram illustrating, in detail, an example of the configuration of the reprocessing priority facial expression list generation unit 180.

As illustrated in FIG. 20, the reprocessing priority facial expression list generation unit 180 includes a facial expression fidelity level sorting unit 181.

The facial expression fidelity level sorting unit 181 inputs the facial expression substitution determination flag 73 and the actual person facial expression fidelity level 74 from the facial expression fidelity verification unit 160.

The facial expression fidelity level sorting unit 181 generates the reprocessing priority facial expression list 67 that includes the facial expression identification number identifying the facial expression to be shot such that the actual person facial expression fidelity level 74 is lower in the order for facial expressions for which the facial expression substitution determination flag 73 is non-zero, and outputs the list to the input data selection unit 140.

The foregoing has described, in detail, the configurations and processing performed by each constituent element of the image processing device 100 illustrated in FIG. 2. The processing described above makes it possible to efficiently generate 3D models of facial expressions by prioritizing the shooting and processing of facial expressions that show the individuality of the user (subject) 10, which is difficult to predict, for the generation of "target shapes" necessary to realize photorealistic facial animation, and by generating a list of priorities of facial expressions to be reprocessed during the shooting processing if there is extra time. In addition, by analyzing the shooting state in real time and confirming the results of the analysis while shooting facial expressions, it is possible to reduce the number of shooting errors, improve the stability of the processing, and shorten the shooting time.

3. (Second Embodiment) Configuration and Processing of Image Processing Device of Second Embodiment of Present Disclosure The configuration of and processing by a second embodiment of the image processing device of the present disclosure will be described next.

Figure 21:
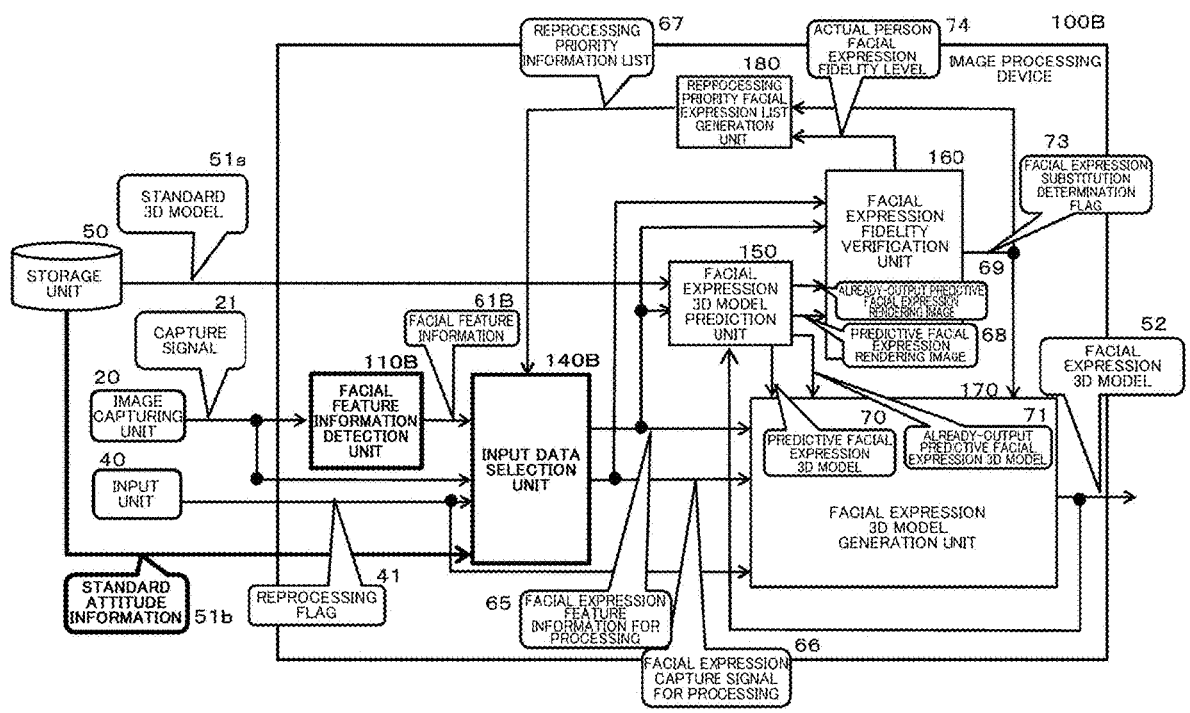
FIG. 21 is a diagram illustrating an example of the configuration of an image processing device of a second embodiment of the present disclosure.

FIG. 21 is a block diagram illustrating an example of the configuration of an image processing device 100B of the second embodiment of the present disclosure.

As illustrated in FIG. 21, the image processing device 100B includes a facial feature information detection unit 110B, an input data selection unit 140B, the facial expression 3D model prediction unit 150, the facial expression fidelity verification unit 160, the facial expression 3D model generation unit 170, and the reprocessing priority facial expression list generation unit 180.

The differences from the image processing device 100 of the first embodiment described earlier with reference to FIG. 2 and on are as follows:
the subject state determination/display unit 120 of the image processing device 100 of the first embodiment has been removed; and
the processing executed by the facial feature information detection unit 110B and the input data selection unit 140B is different.

These configurations are different.

The other configurations and processing are the same as in the first embodiment described earlier, and thus descriptions thereof will be omitted, and the points that differ from the first embodiment will be described below.

The facial feature information detection unit 110 in the first embodiment analyzed the capture signal 21 and outputted facial feature information 61 that indicates the position of each part of the face (the eyes, nose, mouth, and so on) of the user (subject) 10, features of the facial expression, and the like.

In the present second embodiment, the facial feature information detection unit 110B analyzes the capture signal 21 and analyzes the position of each part of the face (the eyes, nose, mouth, and so on) of the user (subject) 10, the features of the facial expression, as well as the facial orientation and the facial position, and outputs facial feature information 61B including the facial orientation and position information.

Figure 22:
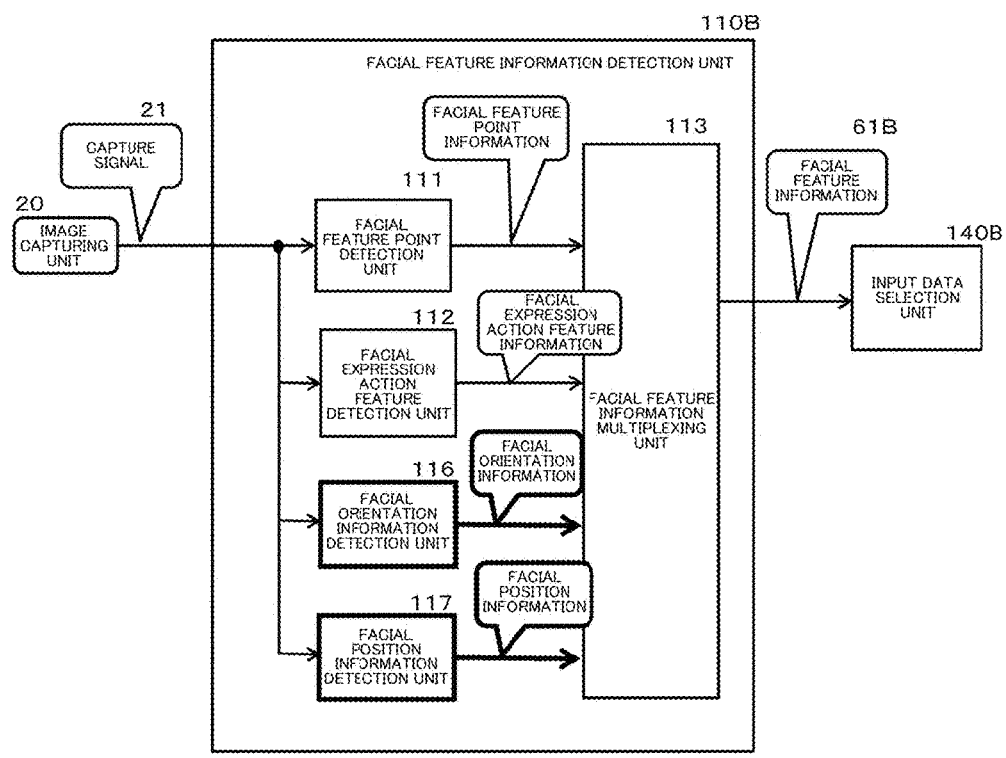
FIG. 22 is a diagram illustrating the configuration of, and processing executed by, a facial feature information detection unit of the second embodiment.

The internal structure of the facial feature information detection unit 110B is illustrated in FIG. 22.

As illustrated in FIG. 22, the facial feature information detection unit 110B includes the facial feature point detection unit 111, the facial expression action feature detection unit 112, and the facial feature information multiplexing unit 113, which are the same as in the first embodiment described earlier with reference to FIG. 3. In the present second embodiment, a facial orientation information detection unit 116 and a facial position information detection unit 117 are further added to the configuration.

The facial orientation information detection unit 116 and the facial position information detection unit 117 perform the same processing as the facial orientation information detection unit 121 and the facial position information detection unit 122 of the subject state determination unit 120 described earlier in the first embodiment with reference to FIG. 6.

The facial orientation information detection unit 116 and the facial position information detection unit 117 detect the orientation and position of the user's face on the basis of the capture signal 21 and output the detection information to the facial feature information multiplexing unit 113.

The facial orientation information detection unit 116 detects the rotation angles of the face direction vector, which indicates the orientation of the face of the user 10, with respect to each axis (x, y, z) of the three-dimensional space, as described with reference to FIG. 7A, generates the facial orientation information including the rotation angle information, and outputs the facial orientation information to the facial feature information multiplexing unit 113.

On the other hand, the facial position information detection unit 117 analyzes the position of the facial image of the user 10 contained in the capture signal 21 input from the image capturing unit 20.

Specifically, as described earlier with reference to FIG. 7B, for example, a rectangular region constituted by the width of the face (the distance between the bases of the ears) and the height of the face (the height from the top end of the eyebrows to the bottom end of the chin) is detected, and facial position information constituted by the parameters of the upper-left coordinate of the rectangle (OX, OY), the width of the rectangle FaceW, and the height of the rectangle FaceH is generated and output to the facial feature information multiplexing unit 113.

The facial feature information multiplexing unit 113 multiplexes
(a) the facial feature point information constituted by the position information and detection reliability information of each feature point, input from the facial feature point detection unit 111, and
(b) the facial expression action feature information input from the facial expression action feature detection unit 112, and furthermore,
(c) the facial orientation information and
(d) the facial position information,
and outputs the result as the facial feature information 61B.

The output destination of the facial feature information 61B generated by the facial feature information multiplexing unit 113 is the input data selection unit 140B.

Like the input data selection unit 140 in the first embodiment, the capture signal 21 from the image capturing unit 20, the facial feature information 61B from the facial feature information detection unit 110B, a reprocessing flag from the input unit 40, and the reprocessing priority list 67 from the reprocessing priority facial expression list generation unit 180 are input to the input data selection unit 140B.

In addition to this input information, the input data selection unit 140B of the present second embodiment further inputs the standard attitude information 51b contained in the standard data 51 stored in the storage unit 50.

Figure 23:
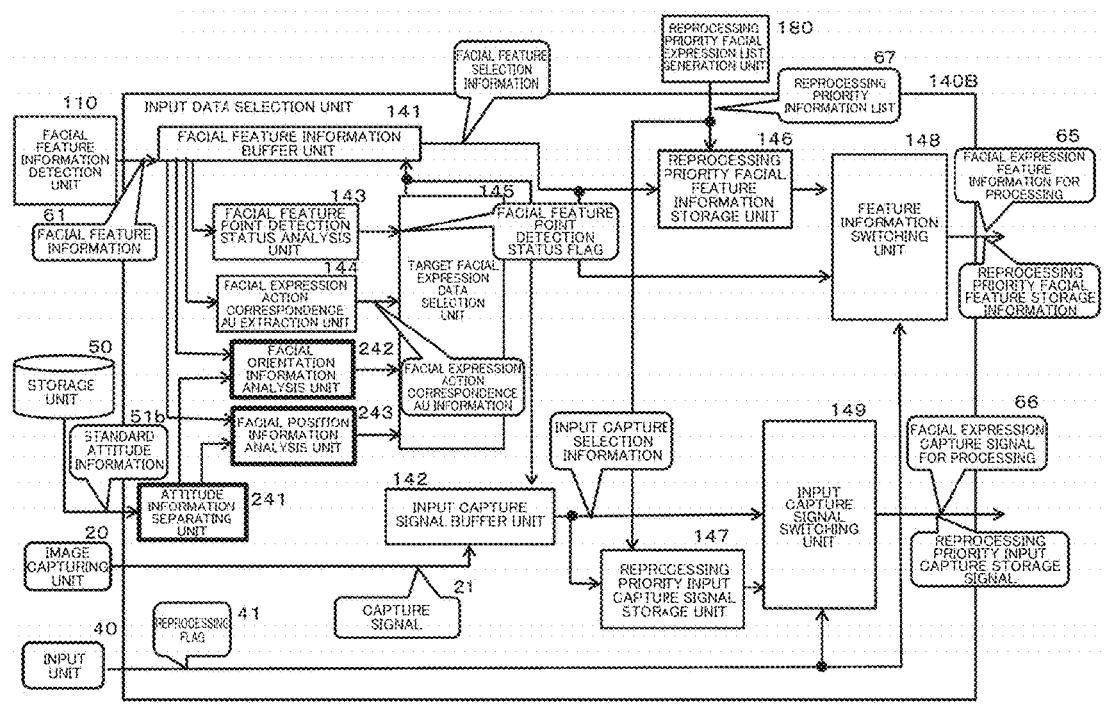
FIG. 23 is a diagram illustrating the configuration of, and processing executed by, an input data selection unit of the second embodiment.

The internal structure of the input data selection unit 140B is illustrated in FIG. 23. FIG. 23 is a diagram illustrating, in detail, an example of the configuration of the input data selection unit 140B.

As illustrated in FIG. 23, like the input data selection unit 140 of the first embodiment described earlier with reference to FIG. 14, the input data selection unit 140B includes the facial feature information buffer unit 141, the input capture signal buffer unit 142, the facial feature point detection status analysis unit 143, the facial expression action correspondence AU (action unit) extraction unit 144, the target facial expression data selection unit 145, the reprocessing priority facial feature information storage unit 146, the reprocessing priority input capture signal storage unit 147, the feature information switching unit 148, and the input capture signal switching unit 149.

In addition to the above configuration, the input data selection unit 140B of the present second embodiment further includes an attitude information separating unit 241, a facial orientation information analysis unit 242, and a facial position information analysis unit 243.

The attitude information separating unit 241 inputs the standard attitude information 51b included in the standard data 51 stored in the storage unit 50. The attitude information separating unit 241 executes the same processing as the attitude information separating unit 131 of the facial expression attitude determination unit 123 in the subject state determination/display unit 120 of the first embodiment described earlier with reference to FIG. 8.

In other words, the attitude information separating unit 241 separates the standard facial orientation information and the standard facial position information included in the standard attitude information 51b.

The standard facial orientation information extracted from the standard data (the attitude information in an expressionless state) is constituted by the following types of rotation angle data of the face direction vectors indicating the facial orientation in the standard data (the attitude information in an expressionless state).

Rotation angle with respect to the x axis: roll angle (Angle_Roll)
Rotation angle with respect to the y axis: pitch angle (Angle_Pitch)
Rotation angle with respect to the z axis: yaw angle (Angle_Yaw)
The standard facial orientation information constituted by this data is input to the facial orientation information analysis unit 242.

Likewise, the standard facial position information extracted from the standard data (the attitude information in an expressionless state) is constituted by the parameters of the upper-left coordinate of the rectangle (OX, OY), the width of the rectangle FaceW, and the height of the rectangle FaceH of the rectangular region constituted by the width of the face (the distance between the bases of the ears) and the height of the face (the height from the top end of the eyebrows to the bottom end of the chin), described above with reference to FIG. 7B.

The standard facial position information constituted by this data is input to the facial position information analysis unit 243.

The facial orientation information analysis unit 242 compares the facial orientation in the standard data with the facial orientation in the image to be processed. This processing is the same as the processing described earlier with reference to FIG. 9. The facial orientation information analysis unit 242 finds the absolute difference values (Abs_Diff_Roll, Abs_Diff_Pitch, and Abs_Diff_Yaw) of each of the roll angles, pitch angles, and yaw angles included in the information on the facial orientation in the standard data and the facial orientation in the image to be processed.

The calculated absolute difference values are further compared with predefined threshold values, and a normalcy for each element (normalized to 0.0 to 1.0) is found.

The facial orientation information analysis unit 242 generates and outputs, to the target facial expression data selection unit 145, facial orientation detection status flag information that is set to 1 only when the normalcies of the rotation angles are all set to 1, and that is 0 otherwise.

Additionally, the facial position information analysis unit 243 performs processing for comparing a standard facial position in the standard attitude information 51b contained in the standard data 51 stored in the storage unit 50 and the facial position corresponding to the image to be processed.

Specifically, the same processing as that described in the foregoing first embodiment with reference to FIG. 10 is executed.

In other words, the area of a region where the two rectangular regions corresponding to the standard facial position in the standard attitude information 51b and the facial position corresponding to the image to be processed do not overlap (the hatched part) is calculated as the differential region (DiffArea), and the area of the rectangular region corresponding to the standard facial position information (the dotted line rectangle region) is calculated as a reference region (RefArea).

These two region areas are calculated.

Next, the facial position abnormality degree (FacePosErr) is calculated according to the following (Equation 1).

$$\text{FacePosErr} = (\text{DiffArea})/(\text{RefArea}) \qquad \text{(Equation 1)}$$

Here, when FacePosErr>1.0, FacePosErr=1.0.

The facial position information analysis unit 243 generates facial position detection status flag information set to 1 when the facial position abnormality degree (FacePosErr) is less than or equal to a predetermined threshold and set to 0 otherwise, and outputs the facial position detection status flag information to the target facial expression data selection unit 145.

The target facial expression data selection unit 145 selects the data, among the data buffered in the facial feature information buffer unit 141, for which the facial feature point detection status flag information, the facial orientation detection status flag information, and the facial position detection status flag information are all 1 and the strength of the action unit (AU) indicated by the facial expression action correspondence AU information is the highest.

The target facial expression data selection unit 145 outputs this selection result as input data selection information to the facial feature information buffer unit 141 and the input capture signal buffer unit 142, and outputs the data selected from each buffer unit as facial feature selection information and an input capture selection signal, respectively.

The processing following this processing is the same as in the first embodiment, and will therefore not be described.

In the present second embodiment, for the image signal included in the capture signal 21, a state that does not deviate from the facial orientation and facial position in the standard data is automatically determined, and the capture signal 21 that satisfies this state is used as a selection candidate for generating the 3d model, and the user (subject) 10 can therefore automatically shoot a picture of a facial expression in a state that is substantially aligned with the 3D model in the standard data, without needing to focus on the attitude of their own face.

4. (Third Embodiment) Configuration and Processing of Image Processing Device of Third Embodiment of Present Disclosure The configuration of and processing by a third embodiment of the image processing device of the present disclosure will be described next.

Figure 24:
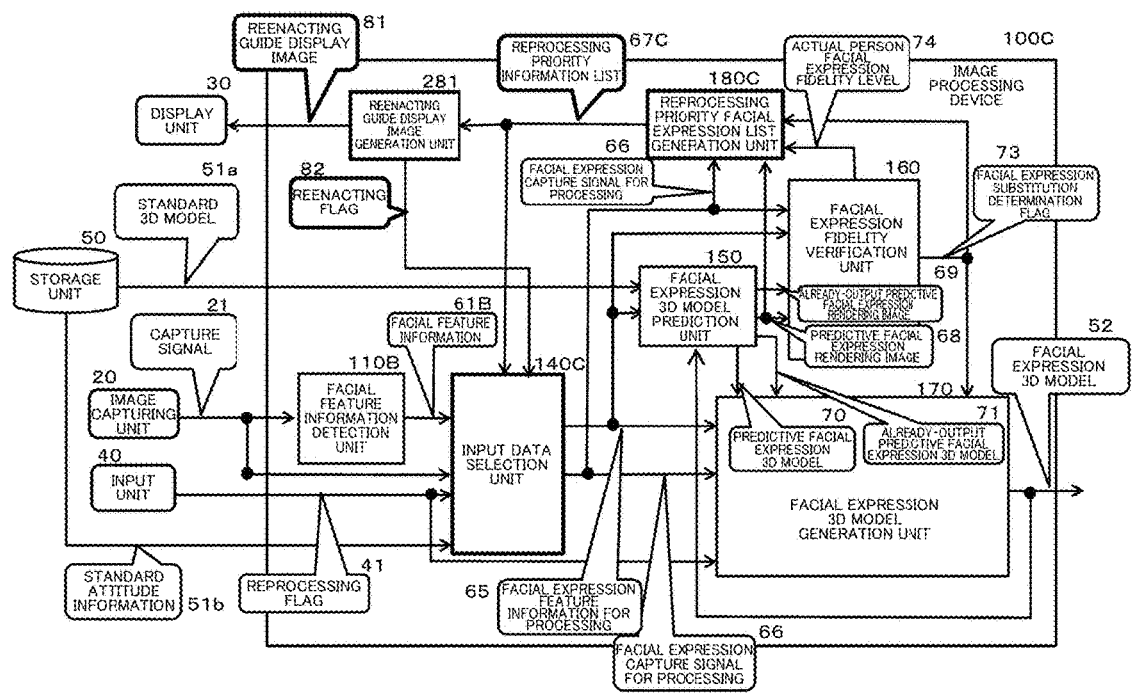
FIG. 24 is a diagram illustrating an example of the configuration of an image processing device of a third embodiment of the present disclosure.

FIG. 24 is a block diagram illustrating an example of the configuration of an image processing device 100C of the third embodiment of the present disclosure.

As illustrated in FIG. 24, the image processing device 100C includes the facial feature information detection unit 110B, the input data selection unit 140B, the facial expression 3D model prediction unit 150, the facial expression fidelity verification unit 160, the facial expression 3D model generation unit 170, the reprocessing priority facial expression list generation unit 180, and a reenacting guide display image generation unit 281.

The configuration of the image processing device 100C of this third embodiment corresponds to the configuration of the image processing device 100B of the second embodiment described with reference to FIG. 21, with the addition of the reenacting guide display image generation unit 281, and changes to the processing of a reprocessing priority facial expression list generation unit 180C and an input data selection unit 140C.

The reprocessing priority facial expression list generation unit 180C inputs the facial expression substitution determination flag 73 and the actual person facial expression fidelity level 74 from the facial expression fidelity verification unit 160. On the basis of this input data, the reprocessing priority facial expression list generation unit 180C generates a reprocessing priority facial expression list 67 including the facial expression identification numbers identifying the facial expressions of the user 10 being shot, in order of the lowest actual person facial expression fidelity level 74, and outputs the list to the input data selection unit 140C.

This processing is the same as the processing described earlier with reference to the first embodiment.

The value of the facial expression substitution determination flag 73 output from the facial expression fidelity verification unit 160 is set to 0, 1, and 2.

As described earlier, when the value of the facial expression substitution determination flag 73 facial expression is 1, the facial expression 3D model generation unit 170 does not generate a new 3D model based on the shot image, and outputs the predictive facial expression 3D model 70 input from the facial 3D model prediction unit 150 as-is as the facial expression 3D model 52.

When the value of the facial expression substitution determination flag 73 facial expression is 2 too, the facial expression 3D model generation unit 170 does not generate a new 3D model based on the shot image, and outputs the already-output data-applied predictive facial expression 3D model 71 input from the facial 3D model prediction unit 150 as-is as the facial expression 3D model 52.

Only when the value of the facial expression substitution determination flag 73 facial expression is 0, the facial expression 3D model generation unit 170 generates a new 3D model based on the shot image.

When the 3D model obtained by the prediction processing can be used in this manner, omitting the processing of the facial expression 3D model generation unit 170 enables more efficient processing.

As described above, when the value of the facial expression substitution determination flag 73 is 2, the already-output data-applied predictive facial expression 3D model 71 input from the facial 3D model prediction unit 150 is used as the facial expression 3D model 52, but if there is not much change in each expression due to the skill of the user (subject) 10 in terms of acting out facial expressions, the actual person facial expression fidelity level 74 may be determined to be high, and the facial expression substitution determination flag 73 may be continuously set to 2.

In this case, there is a problem in that the facial expression of the user (subject) 10 is not properly acted out. The present third embodiment is designed to address this issue.

The reprocessing priority facial expression list generation unit 180 of the first embodiment described earlier inputs the facial expression substitution determination flag 73 and the actual person facial expression fidelity level 74 from the facial expression fidelity verification unit 160, as described earlier with reference to FIG. 20.

As described earlier with reference to FIG. 20, the reprocessing priority facial expression list generation unit 180 of the first embodiment generates the reprocessing priority facial expression list 67 that includes the facial expression identification number identifying the facial expression to be shot such that the actual person facial expression fidelity level 74 is lower in the order for facial expressions for which the facial expression substitution determination flag 73 is non-zero, and outputs the list to the input data selection unit 140.

Figure 25:
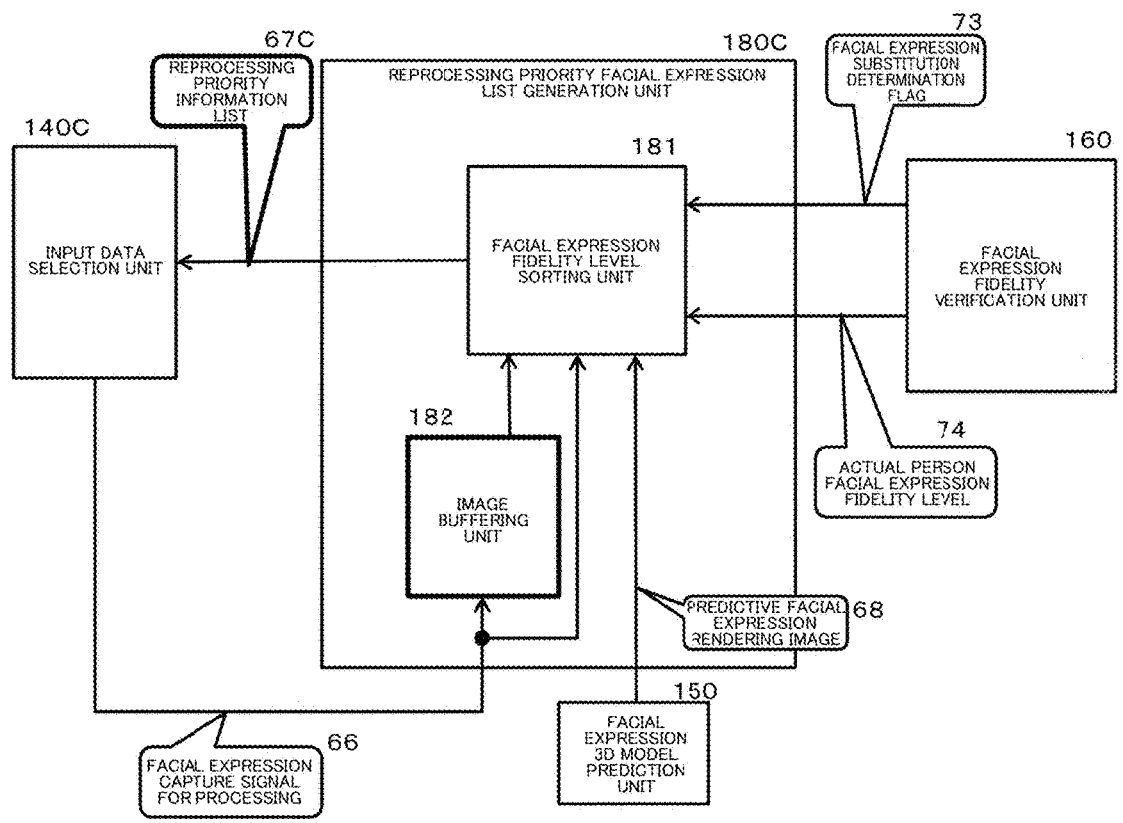
FIG. 25 is a diagram illustrating the configuration of, and processing executed by, a reprocessing priority facial expression list generation unit of the third embodiment of the present disclosure.

As illustrated in FIG. 25, the reprocessing priority facial expression list generation unit 180C of the present third embodiment inputs the facial expression substitution determination flag 73 and the actual person facial expression fidelity level 74 from the facial expression fidelity verification unit 160, and furthermore inputs the facial expression capture signal for processing 66 from the input data selection unit 140C and the predictive facial expression rendering image 68 from the non-facial expression 3D model prediction unit 150.

The reprocessing priority facial expression list generation unit 180C of the present third embodiment generates a reprocessing priority facial expression list 67C that includes the information of the corresponding facial expression substitution determination flag 73, the facial image extracted from the newly-input facial expression capture signal for processing 66, and the predictive facial expression rendering image 68, in addition to the facial expression identification number identifying the facial expression to be shot such that the actual person facial expression fidelity level 74 is lower in the order.

The reprocessing priority facial expression list 67C generated by the reprocessing priority facial expression list generation unit 180C is output to the input data selection unit 140C and the reenacting guide display image generation unit 281.

As illustrated in FIG. 25, the reprocessing priority facial expression list generation unit 180C includes an image buffering unit 182, and one image's worth of the facial image extracted from the facial expression capture signal for processing 66 is buffered in the image buffering unit 182.

When the facial expression substitution determination flag 73 input to the reprocessing priority facial expression list generation unit 180C is 2, the facial expression fidelity level sorting unit 181 of the reprocessing priority facial expression list generation unit 180C generates and outputs the reprocessing priority facial expression list 67C, which includes the facial image extracted from the newest facial expression capture signal for processing 66 input from the input data selection unit 140C at that point in time and the facial image extracted from the previous capture signal which has been buffered.

The reenacting guide display image generation unit 281 generates a guide image for making it easier for the user (subject) 10 to reenact a facial expression.

Specifically, the reenacting guide display image generation unit 281 first inputs the reprocessing priority facial expression list 67C including the various types of information from the reprocessing priority facial expression list generation unit 180C. When the facial expression substitution determination flag included in the reprocessing priority facial expression list 67C is 2, the reenacting guide display image generation unit 281 generates a display image such as that illustrated in FIGS. 26A, 26B and 26C, for example, and displays the image in the display unit 30.

Figure 26:
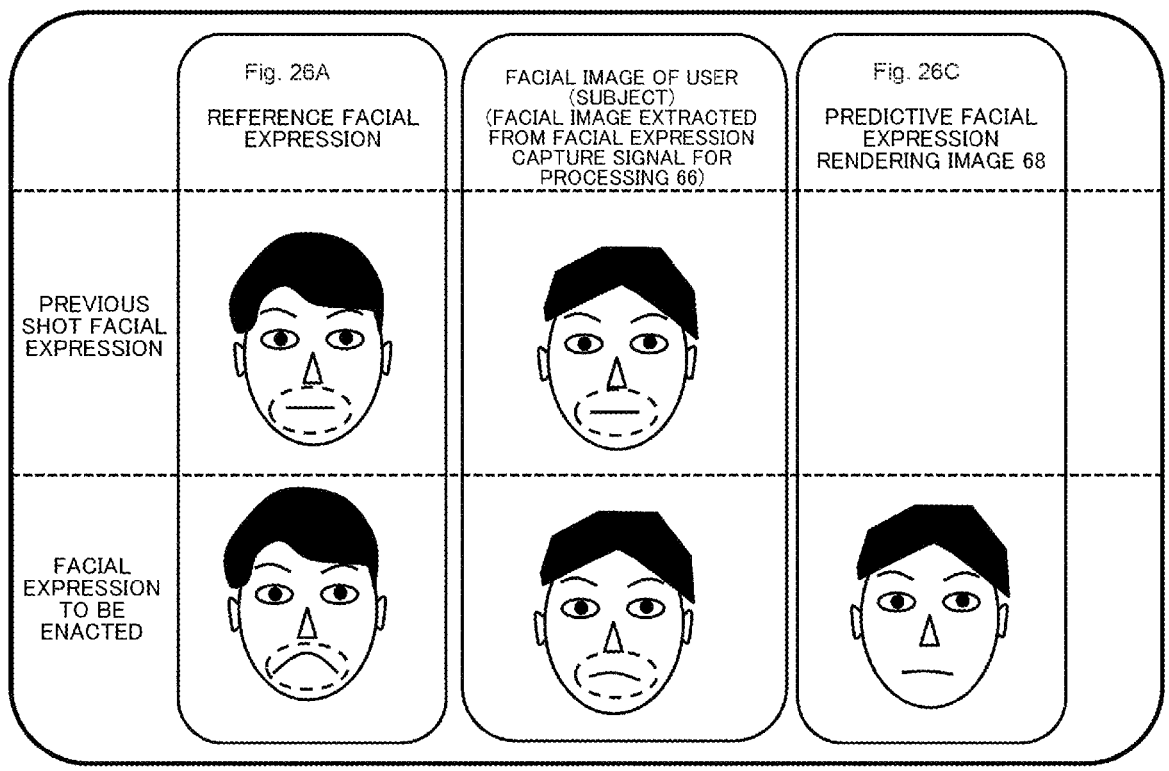
FIGS. 26A, 26B and 26C are diagrams illustrating processing executed by the reprocessing priority facial expression list generation unit of the third embodiment of the present disclosure.

As illustrated in FIGS. 26A, 26B and 26C, each of the following images is arranged and displayed for the facial expression to be re-enacted.

FIG. 26A A pre-stored reference facial expression image (a facial image of a person other than the user (subject) 10 that serves as a model for the acting);

FIG. 26B a facial image of the user (subject) 10 (the facial image extracted from the facial expression capture signal for processing 66); and FIG. 26C the predictive facial expression rendering image 68.

These FIGS. 26A, 26B and 26C (A) to (C) are displayed side-by-side.

For the FIG. 26A reference facial expression image and FIG. 26B the facial image of the user (subject) 10, the image of the facial expression shot previously is displayed for the purpose of comparison. The display method may be side-by-side, or may be switched to a certain time unit at the same position so that changes can be seen with ease. The guide display may also be performed such that the parts that change the most in the facial expression acting are easier to see.

In this manner, the reenacting guide display image generation unit 281 generates a display image, and outputs the display image to the display unit 30 as a reenacting guide display image 81 to be confirmed by the user (subject) 10.

Figure 27:
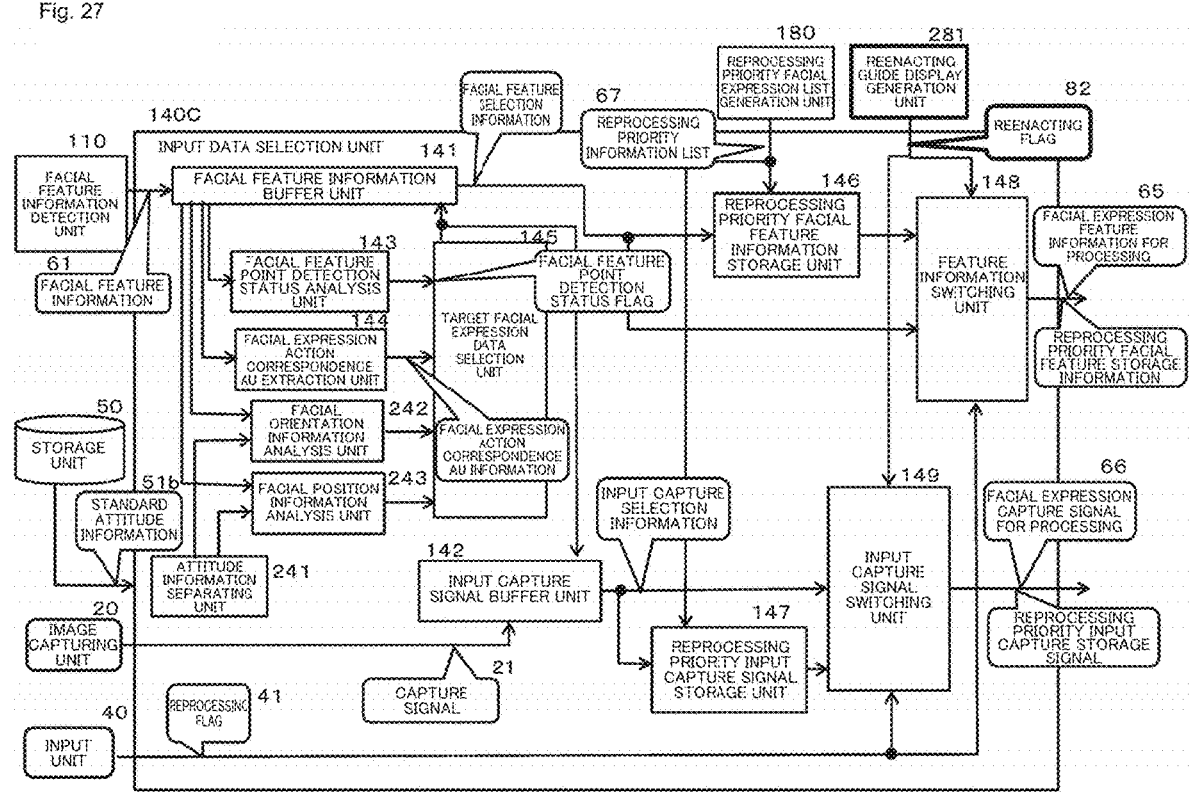
FIG. 27 is a diagram illustrating the configuration of, and processing executed by, an input data selection unit of the third embodiment.

As illustrated in FIG. 27, the reenacting guide display image generation unit 281 inputs a reenacting flag 82 to the feature information switching unit 148 and the input capture signal switching unit 149 of the input data selection unit 140C.

When the reenacting flag 82 is 1, the feature information switching unit 148 outputs the facial feature selection information input from the facial feature information buffer unit 141 as the facial expression feature information for processing 65, and the input capture signal switching unit 149 outputs input capture selection information input from the image capturing unit 20 via the input capture signal buffer unit 142 as the facial expression capture signal for processing As described above, with the configuration of the present third embodiment, when the facial expression acting skill of the user (subject) 10 causes little change in each facial expression and reenacting and reshooting is required, a comparison image of the previously-acted facial expression image and the reference facial expression image is presented to the user 10. According to this configuration, the user (subject) 10 can be notified of acting tips for facial expressions in an easy-to-understand manner, and a 3D model having an appropriate facial expression can be generated.

The configuration of and processing by the image processing device of the present disclosure has been described thus far.

The image processing device of the present disclosure can perform processing efficiently by using low-cost photographic equipment to generate the "target shape" necessary to realize photorealistic facial animation and preferentially shooting facial expressions that show the individuality of the user (subject) 10, which is difficult to predict.

Furthermore, when reprocessing for facial expressions that have been lowered in priority, efficient processing can be executed, and even when the acting of a facial expression fails and has to be re-shot, the performer can perform the facial expression appropriately by having a guide displayed. In addition, by analyzing the shooting state in real time and confirming the results of the analysis while shooting facial expressions, it is possible to reduce the number of shooting errors, improve the stability of the processing, and shorten the shooting time.

5. (Fourth Embodiment) Configuration and Processing of Image Processing Device of Fourth Embodiment of Present Disclosure The configuration of and processing by a fourth embodiment of the image processing device of the present disclosure will be described next.

Figure 28:
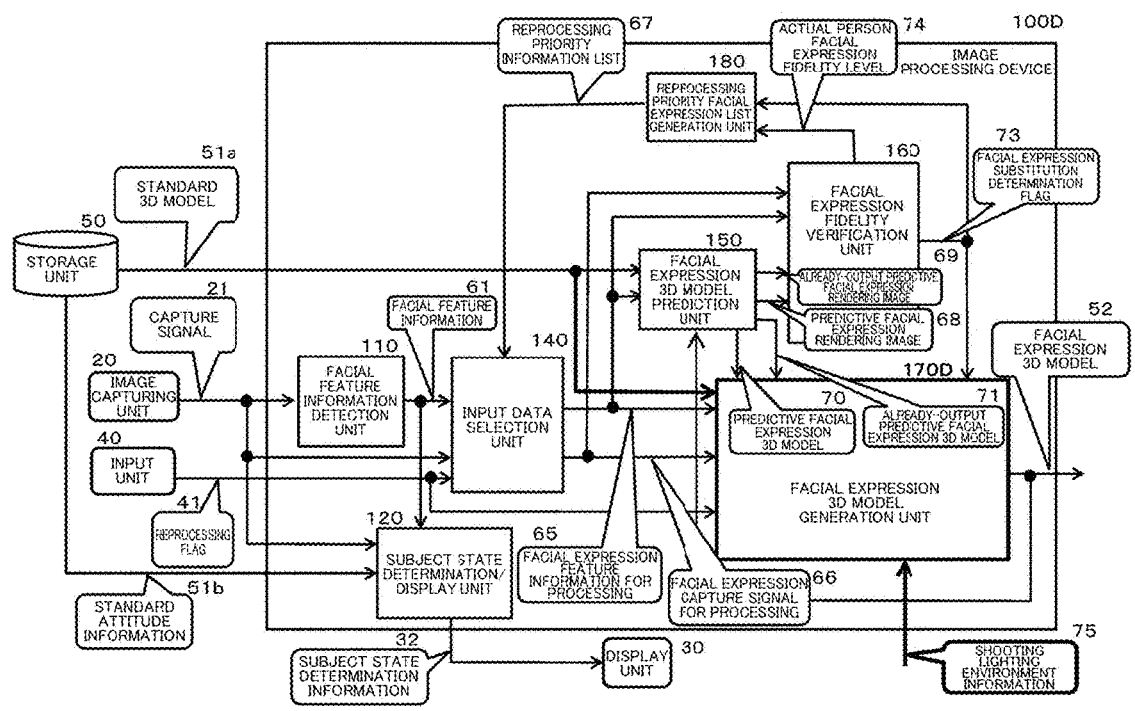
FIG. 28 is a diagram illustrating an example of the configuration of an image processing device of a fourth embodiment of the present disclosure.

FIG. 28 is a block diagram illustrating an example of the configuration of an image processing device 100D of the fourth embodiment of the present disclosure.

As illustrated in FIG. 28, the image processing device 100D includes the facial feature information detection unit 110, the input data selection unit 140, the facial expression 3D model prediction unit 150, the facial expression fidelity verification unit 160, a facial expression 3D model generation unit 170D, and the reprocessing priority facial expression list generation unit 180.

The difference from the image processing device 100 of the first embodiment described earlier with reference to FIG. 2 and on is the configuration of and processing performed by the facial expression 3D model generation unit 170D. Shooting lighting environment information 75, which indicates the number, type, and position of lighting, the direction of the light source, and the like at the time when the facial expression is shot, is input to the facial expression 3D model generation unit 170D along with the standard 3D model 51a.

The other configurations and processing are the same as in the first embodiment described earlier, and thus descriptions thereof will be omitted, and the points that differ from the first embodiment will be described below.

The facial expression 3D model generation unit 170 in the first embodiment described earlier with reference to FIG. 19 switches the facial expression 3D model 52 output as follows in accordance with the value of the facial expression substitution determination flag 73 input from the facial expression fidelity verification unit 160.

If the facial expression substitution determination flag 73 is 1, the processing of the facial expression shape generation unit 171, the facial expression texture generation unit 172, and the facial expression 3D model multiplexing unit 173 is stopped, and the predictive facial expression 3D model 70 input from the facial expression 3D model prediction unit 150 is output as-is as the facial expression 3D model 52 by the output switching unit 174.

Similarly, if the facial expression substitution determination flag 73 is 2, the processing of the facial expression shape generation unit 171, the facial expression texture generation unit 172, and the facial expression 3D model multiplexing unit 173 is stopped, and the already-output data-applied predictive facial expression 3D model 71 input from the facial expression 3D model prediction unit 150 is output as-is as the facial expression 3D model 52 by the output switching unit 174.

If the facial expression substitution determination flag 73 is 0, the processing of the facial expression shape generation unit 171, the facial expression texture generation unit 172, and the facial expression 3D model multiplexing unit 173 is performed, and the facial expression 3D model generation data output by the facial expression 3D model multiplexing unit 173 is output as the facial expression 3D model 52.

In the present fourth embodiment, the facial expression 3D model generation unit 170D performs the same processing as in the first embodiment when the value of the facial expression substitution determination flag 73 input from the facial expression fidelity verification unit 160 is 1 or 2, but performs different processing when the value of the facial expression substitution determination flag 73 is 0.

Figure 29:
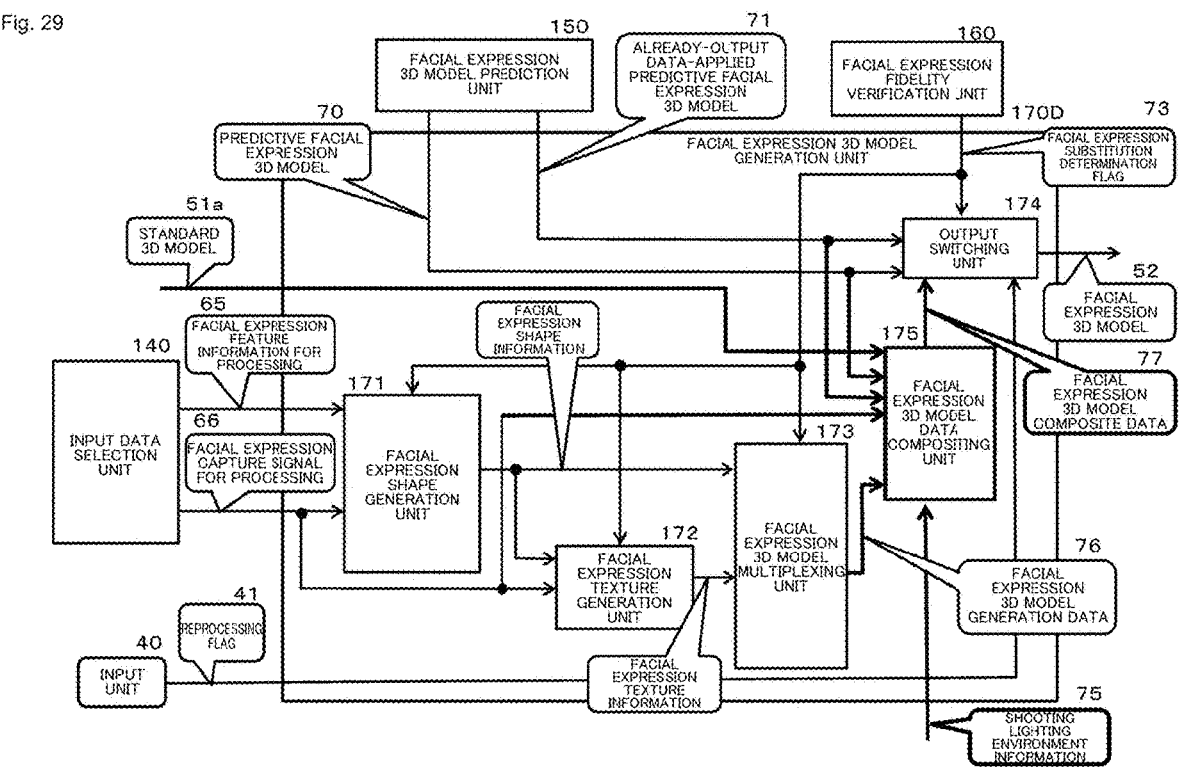
FIG. 29 is a diagram illustrating the configuration of, and processing executed by, a facial expression 3D model generation unit of the fourth embodiment.

FIG. 29 illustrates the configuration of the facial expression 3D model generation unit 170D in the present fourth embodiment.

As illustrated in FIG. 29, the facial expression 3D model generation unit 170D of the present fourth embodiment includes a facial expression 3D model data compositing unit 175, which is not in the first embodiment.

If the value of the facial expression substitution determination flag 73 is 0, the facial expression 3D model data compositing unit 175 executes processing for reducing artifacts present in facial expression 3D model generation data 76 generated by the facial expression 3D model multiplexing unit 173, and generates and outputs, to the output switching unit 174, new facial expression 3D model composite data 77 in which artifacts have been reduced.

If the value of the facial expression substitution determination flag 73 is 0, the facial expression 3D model data compositing unit 175 outputs the facial expression 3D model composite data 77 in which artifacts are reduced as the facial expression 3D model 52.

Using the predictive facial expression 3D model 70 output from the facial expression 3D model prediction unit 150 and the data of the already-output data-applied predictive facial expression 3D model 71, the facial expression 3D model data compositing unit 175 executes processing for reducing artifacts present in the facial expression 3D model generation data 76 generated by the facial expression 3D model multiplexing unit 173, and generates the facial expression 3D model composite data 77.

The facial expression 3D model composite data 77 output from the facial expression 3D model data compositing unit 175 is input to the output switching unit 174.

The internal configuration of, and processing performed by, the facial expression 3D model data compositing unit 175 will be described with reference to FIG. 30.

Figure 30:
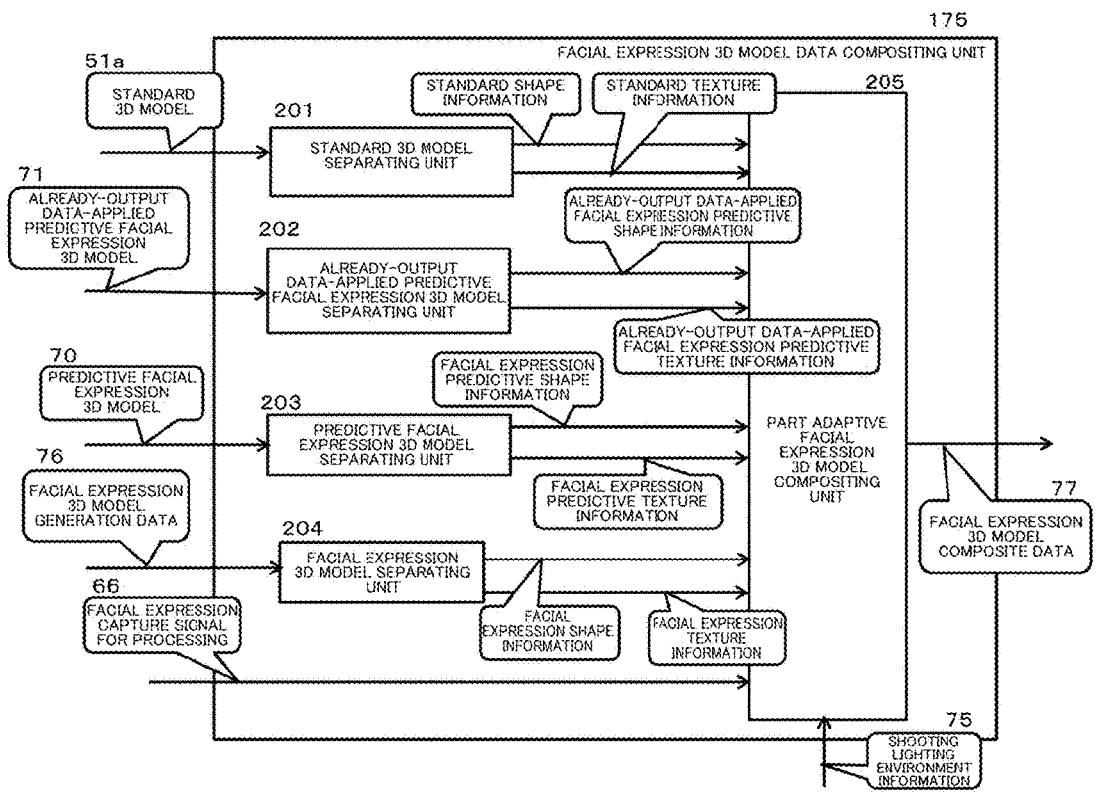
FIG. 30 is a diagram illustrating the configuration of, and processing executed by, a facial expression 3D model data compositing unit of the fourth embodiment.

As illustrated in FIG. 30, the facial expression 3D model data compositing unit 175 includes a standard 3D model separating unit 201, an already-output data-applied predictive facial expression 3D model separating unit 202, a predictive facial expression 3D model separating unit 203, a facial expression 3D model separating unit 204, and a part adaptive facial expression 3D model compositing unit 205.

The standard 3D model separating unit 201 separates the standard 3D model 51a input from the storage unit 50 into standard shape information and standard texture information.

The already-output data-applied predictive facial expression 3D model separating unit 202 separates the already-output data-applied predictive facial expression 3D model 71 input from the facial expression 3D model prediction unit 150 into already-output data-applied facial expression predictive shape information and already-output data-applied facial expression predictive texture information.

The predictive facial expression 3D model separating unit 203 separates the predictive facial expression 3D model 70 input from the facial expression 3D model prediction unit 150 into facial expression predictive shape information and facial expression predictive texture information.

The facial expression 3D model separating unit 204 separates the facial expression 3D model generation data 76 input from the facial expression 3D model multiplexing unit 173 into the facial expression shape information and the facial expression texture information.

The information separated into four types of shape and texture information in this manner is input to the part adaptive facial expression 3D model compositing unit 205 along with the shooting lighting environment information 75.

The configuration of, and processing performed by, the part adaptive facial expression 3D model compositing unit 205 will be described with reference to FIG. 31.

Figure 31:
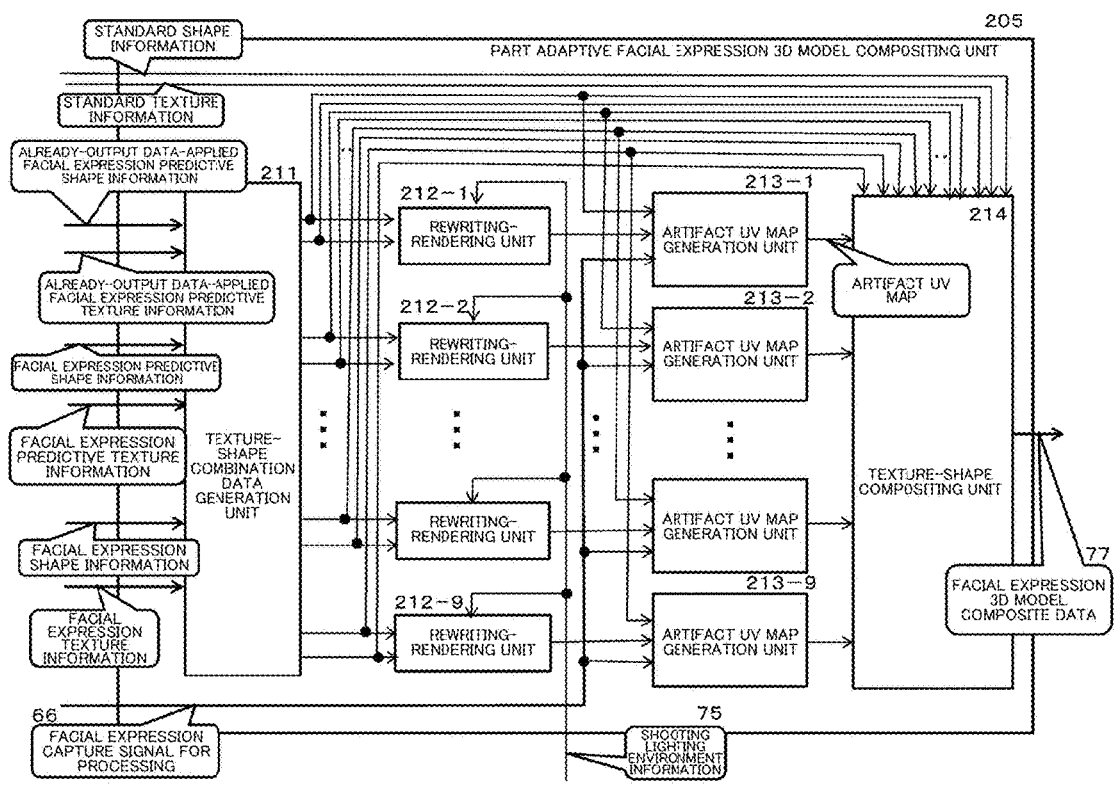
FIG. 31 is a diagram illustrating the configuration of, and processing executed by, a part adaptive facial expression 3D model compositing unit of the fourth embodiment.

As illustrated in FIG. 31, the part adaptive facial expression 3D model compositing unit 205 includes a texture-shape combination data generation unit 211, a plurality of rewriting-rendering units 212-1 to 9, a plurality of artifact UV map generation units 213-1 to 9, and a texture-shape compositing unit 214.

The standard shape information and the standard texture information, generated by the standard 3D model separating unit 201 on the basis of the standard 3D model 51a input from the storage unit 50, is input to the texture-shape compositing unit 214.

The other shape information and texture information are input to the texture-shape combination data generation unit 211.

The following shape information and texture information are input to the texture-shape combination data generation unit 211.

(a) The already-output data-applied facial expression predictive shape information and the already-output data-applied facial expression predictive texture information generated by the already-output data-applied predictive facial expression 3D model separating unit 202 on the basis of the already-output data-applied predictive facial expression 3D model 71 input from the facial expression 3D model prediction unit 150.

(b) The facial expression predictive shape information and the facial expression predictive texture information generated by the predictive facial expression 3D model separating unit 203 on the basis of the predictive facial expression 3D model 70 input from the facial expression 3D model prediction unit 150.

(c) The facial expression shape information and the facial expression texture information generated by the facial expression 3D model separating unit 204 on the basis of the facial expression 3D model generation data 76 input from the facial expression 3D model multiplexing unit 173.

The texture-shape combination data generation unit 211 inputs the three types of shape information (the already-output data-applied facial expression predictive shape information, the facial expression predictive shape information, and the facial expression shape information) and the three types of texture information (the already-output data-applied facial expression predictive texture information, the facial expression predictive texture information, and the facial expression texture information) in the above (a) to (c).

The texture-shape combination data generation unit 211 generates 3×3=9 types of texture-shape combination data, which are all combinations of textures and shapes in the three types of shape information and the three types of texture information, and inputs the nine generated types of texture-shape combination data to the nine rewriting-rendering units 212-1 to 212-9, respectively, along with the shooting lighting environment information 75.

Each of the nine rewriting-rendering units 212-1 to 212-9 inputs one set of the texture-shape combination data among the nine types of combination data of the texture information and the shape information, and performs regeneration processing of the 3D model based on the input texture-shape combination data, i.e., 3D model rewriting processing.

Note that it is preferable that the nine rewriting-rendering units 212-1 to 212-9 perform processing by setting various camera parameters for rendering so as to achieve the same appearance (perspective) as the face image in the facial expression capture signal for processing 66. Furthermore, it is preferable that the rewriting processing be performed assuming that the number, type, position, and direction of light sources are set to match the input shooting lighting environment information 75 as much as possible.

Rewriting-rendering images generated by the nine rewriting-rendering units 212-1 to 212-9 on the basis of mutually-different combinations of texture information and shape information are output to the artifact UV map generation units 213-1 to 9, respectively, in later stages.

The rewriting-rendering images generated by the rewriting-rendering units 212-1 to 9 may have artifacts based on the shooting conditions. "Artifacts" are a phenomenon in which lines or noise not present in the image observed by the naked eye are output.

FIGS. 32A and 32B illustrates an example of artifacts arising in the rewriting-rendering images.

FIG. 32A is an example of the rewriting-rendering image generated by the rewriting-rendering units 212-1 to 9.

FIG. 32B is a facial image in the facial expression capture signal to be processed. The rewriting-rendering image illustrated in FIG. 32A has lines and shadows that are not present in FIG. 32B the facial image of the facial expression capture signal to be processed. These are artifacts.

An artifact a is a shadow artifact that appears as a black line in the whites of the eyes. This line corresponds to the border between the eyelid and the eye in the shape.

An artifact b is an artifact at the edge of the nose, and is an artifact produced by a shift between shadows in the texture and shadows produced by the shape generated in the rewriting processing.

An artifact c is an artifact that occurs as unnatural horizontal shadows between the bottom of the nose and the upper lip.

The rewriting-rendering images generated by the rewriting-rendering units 212-1 to 9 are input, one rendering image at a time, to the artifact UV map generation units 213-1 to 9 in later stages.

Each of the artifact UV map generation units 213-1 to 9 generates an artifact UV map for detecting artifacts from the rewriting-rendering images generated by the rewriting-rendering units 212-1 to 9.

Note that the UV map is coordinate information required for texture mapping, which attaches textures to mesh data.

Figure 33:
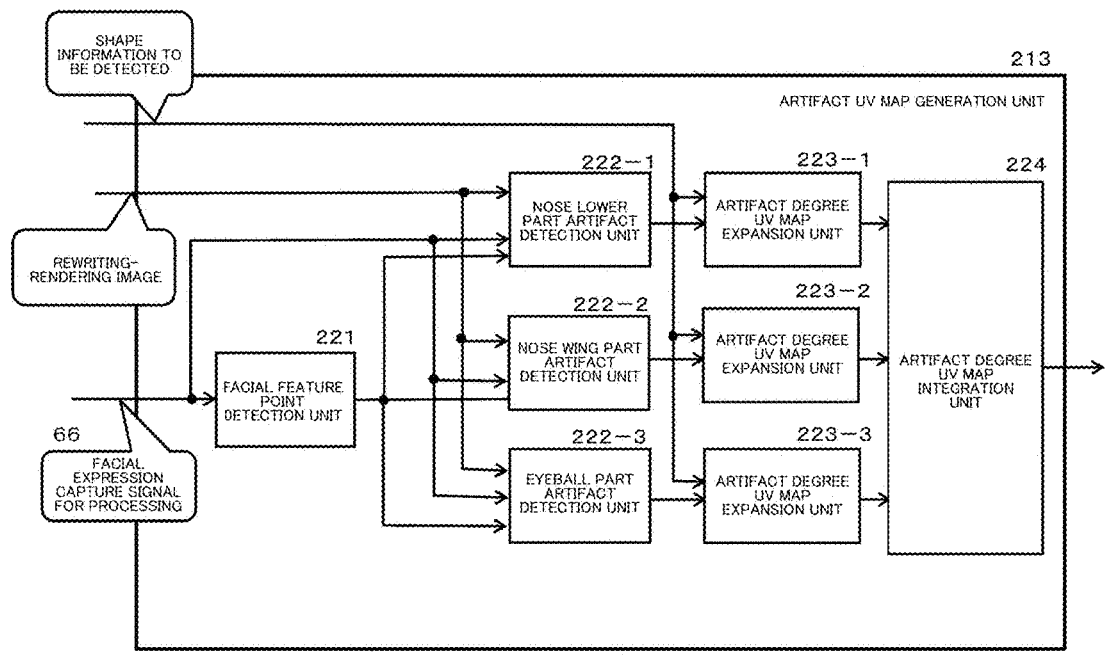
FIG. 33 is a diagram illustrating the configuration of, and processing executed by, an artifact UV map generation unit of the fourth embodiment.

FIG. 33 illustrates an example of the configuration of each of the artifact UV map generation units 213-1 to 9.

The artifact UV map generation unit 213 includes a facial feature point detection unit 221, a nose lower part artifact detection unit 222-1, a nose wing part artifact detection unit 222-2, an eyeball part artifact detection unit 222-3, three artifact degree UV map expansion units 223-1 to 3, and an artifact degree UV map integration unit 224. The specific processing of each block will be described hereinafter.

Figure 34:
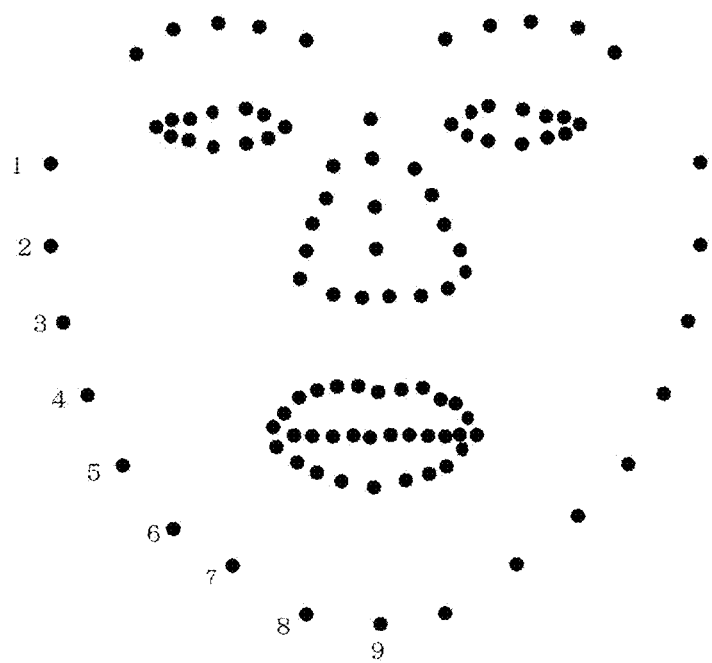
FIG. 34 is a diagram illustrating an example of setting feature points.

First, the facial image in the facial expression capture signal for processing 66 is input to the facial feature point detection unit 221. The facial feature point detection unit 221 of the present fourth embodiment detects the same feature points as those described earlier with reference to FIG. 4. Alternatively, as illustrated in FIG. 34, the configuration may be such that to facilitate the identification of regions with a high possibility of artifacts arising, such as, for example, the edge of the nose, a large number of feature points from those regions are detected.

The nose lower part artifact detection unit 222-1 first sets an artifact detection region between the bottom of the nose and the upper lip, as indicated by artifact c in FIGS. 32A and 32B, on the basis of the coordinate information of each facial feature point.

Furthermore, in

FIG. 32A the facial image in the facial expression capture signal for processing 66 input from the input data selection unit 140 and FIG. 32B the rewriting-rendering image input from the rewriting-rendering unit 212 in the previous stage, feature vectors are set in the artifact detection regions between the bottom of the nose and the upper lip in the two facial images, respectively.

A feature vector uses, for example, a vector that can be defined by descriptors which indicate the statistical information of the directional components of edges, such as a Histogram of Oriented Gradients (HOG), which indicates a luminance gradient in an image.

A feature vector constituted by the directional components of the edge, such as a luminance gradient, is set in the same artifact detection region in each of the two images in (1) and (2) above, i.e., the same artifact detection region between the bottom of the nose and the upper lip.

If the difference between the two images in (1) and (2) above is small, the feature vectors of the two images will be almost equal. If the difference between the two images is large, there will be differences in the feature vectors of the two images. In other words, the distance between the two feature vectors increases.

Figure 35A:
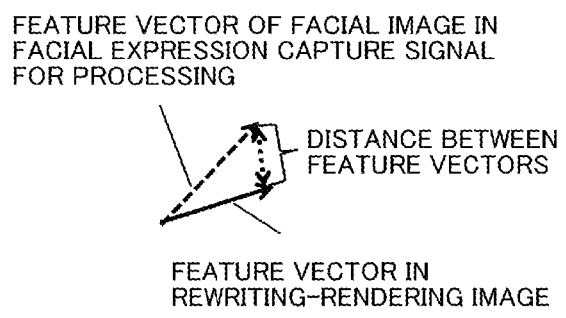
FIGS. 35A and 35B are diagrams illustrating processing executed by the artifact UV map generation unit.
Figure 35B:
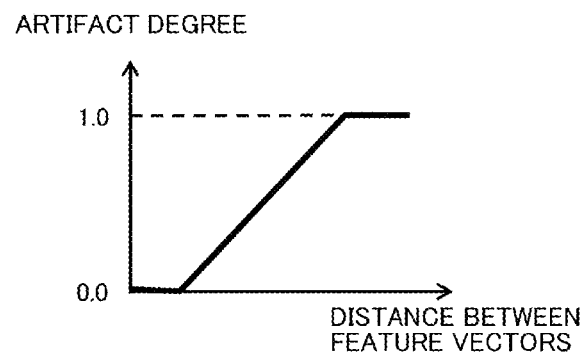

FIG. 35A shows an example of the feature vectors of the two images in FIGS. 35A and 35B above and the distance between feature vectors corresponding to the difference therebetween.

The greater the distance between feature vectors is, the larger the artifacts can be determined to be.

In other words, it can be determined that the amount of artifacts present in the detection region of the rewriting-rendering image input from the rewriting-rendering unit 212 in the previous stage is higher the higher the distance between feature vectors is.

An index value of the amount of artifacts present in the detection region of the rewriting-rendering image input from the rewriting-rendering unit 212 in the previous stage is called an artifact degree. The artifact degree has a range of, for example, 0 to 1.0.

An artifact degree of 0 means that the amount of artifacts present in the detection region of the rewriting-rendering image is a minimum value, and an artifact degree of 1 means that the amount of artifacts present in the detection region of the rewriting-rendering image is a maximum value.

The graph in FIG. 35B is a graph indicating, for

FIG. 35A the facial image in the facial expression capture signal for processing 66 input from the input data selection unit 140 and FIG. 35B the rewriting-rendering image input from the rewriting-rendering unit 212 in the previous stage, a correspondence relationship between the distance between feature vectors of the feature vectors set in the artifact detection regions of these two facial images, and the artifact degree The nose lower part artifact detection unit 222-1 calculates the artifact degree, which is the index value of the amount of artifacts present in the detection region (the area below the nose) of the rewriting-rendering image input from the rewriting-rendering unit 212-1 (0 to 1.0).

Likewise, the nose wing part artifact detection unit 222-2 first sets an artifact detection region near the end of the wings of the nose, as indicated by artifact b in FIGS. 32A and 32B, on the basis of the coordinate information of each facial feature point.

Furthermore, for

FIG. 32A the facial image in the facial expression capture signal for processing 66 input from the input data selection unit 140 and FIG. 32B the rewriting-rendering image input from the rewriting-rendering unit 212 in the previous stage, feature vectors are set in the artifact detection regions near the ends of the wings of the nose in the two facial images, respectively.

As in the nose lower part artifact detection unit 222-1, the feature vector can be a descriptor which indicates the statistical information of the directional components of edges, such as HOG.

Furthermore, the nose wing part artifact detection unit 222-2 calculates the artifact degree, which is the index value of the amount of artifacts present in the detection region (near the ends of the wings of the nose) of the rewriting-rendering image input from the rewriting-rendering unit 212-2 (0 to 1.0).

As illustrated in FIGS. 36A, 36B and 36C, for the artifacts in the nose wing area, the region can be limited to an extent by the facial feature points of the nose, and furthermore, the artifact pattern may be distinctive and able to be modeled.

For example, the nose wing part artifact detection unit 222-2 may perform processing for determining the artifact degree to be high when the artifacts in the nose wing area of the rewriting-rendering image input from the rewriting-rendering unit 212 in the previous stage are artifacts having a Haar Like pattern, illustrated in FIG. 36C, and have a high value of correlation with a Haar Like pattern.

Likewise, the eyeball part artifact detection unit 222-3 first sets an artifact detection region near the eyeball, as indicated by artifact a in FIGS. 32A and 32B, on the basis of the coordinate information of each facial feature point.

Furthermore, for

FIG. 32A the facial image in the facial expression capture signal for processing 66 input from the input data selection unit 140 and FIG. 32B the rewriting-rendering image input from the rewriting-rendering unit 212 in the previous stage, feature vectors are set in the artifact detection regions near the eyeball in the two facial images, respectively.

Furthermore, the eyeball part artifact detection unit 222-3 calculates the artifact degree, which is the index value of the amount of artifacts present in the detection region (near the eyeball) of the rewriting-rendering image input from the rewriting-rendering unit 212-2 (0 to 1.0).

The eyeball part artifact detection unit 222-3 may calculate the artifact degree according to the clarity of a black horizontal edge of the eye white region (determined by general edge detection plus the color of the edge).

An example in which three types of artifact detection units 222-1 to 3 are provided has been described in the example illustrated in FIG. 33, but because the form in which artifacts are produced differs depending on the algorithm used by the facial expression 3D model prediction unit 150, the facial expression shape generation unit 171 and the facial expression texture generation unit 172 of the facial expression 3D model generation unit 170D, and the like, it is preferable to provide artifact detection units that match the characteristics thereof.

In this case, for example, if image data having artifacts can be prepared in advance, a method in which an artifact detector is configured using deep learning or the like may be used. As another form, the facial image in the facial expression capture signal for processing 66 and the rewriting-rendering image may be displayed in a display, and the user may visually determine the regions where artifacts stand out and manually set the artifact degree, which indicates the degree of prominence, using a user-operable mouse or other UI operation.

The data output from each artifact detection unit 222-1 to 3 illustrated in FIG. 33 is a 2D map (e.g., shown as an 8-bit grayscale image) in which an artifact degree that indicates the prominence of the artifact corresponding to the rewriting-rendering image input from the rewriting-rendering unit 212 in the previous stage is set.

In other words, this is a 2D map of a grayscale image in which the artifact degree of 0 to 1.0 is expressed as 8-bit values from 0 to 255, for example.

This 2D map in which the artifact degree is set is input to the artifact degree UV map expansion units 223-1 to 3.

The artifact degree UV map expansion units 223-1 to 3 use externally-input shape information to be detected (vertex information that constitutes the mesh), e.g., the UV map expansion diagram illustrated in FIG. 37A, to expand the 2D map in which the artifact degree is set on a UV map, and output the result to the artifact degree UV map integration unit 224. The UV map expansion diagram illustrated in FIG. 37A is an example of the UV map expansion diagram described in NPL 10, "http://www.ee.surrey.ac.uk/CVSSP/Publications/papers/Huber-VISAPP-2016.pdf".

The artifact degree UV map integration unit 224 generates an artifact degree UV map such as that illustrated in FIG. 37B by integrating the 2D maps in which the artifact degrees are set, input from the artifact degree UV map expansion units 223-1 to 3.

The artifact degree UV map illustrated in FIG. 37B is a UV map in which an artifact occurrence region is set to the white region (close to the highest value (255) in the 8-bit 2D map having values from 0 to 255). It can be seen that artifacts occur in the eyeball area of the eyes, the lower part of the nose, and the nose wings, and that the pixel values in the artifact UV map for these areas are high (white).

The artifact UV map generated by the artifact degree UV map integration unit 224 is output to the texture-shape compositing unit 214 illustrated in FIG. 31.

The artifact degree UV map integration unit 224 integrates the 2D maps in which the artifact degrees are set, input from the artifact degree UV map expansion units 223-1 to 3 in the previous stage, and this integration method can be realized by, for example, (additive processing+clipping processing) for various types of artifact degree UV maps.

The artifact UV map generated by the artifact degree UV map integration unit 224 is, for example, a 2D map in which the artifact degree, which indicates the prominence of artifacts, is set (e.g., an 8-bit grayscale image).

The texture-shape compositing unit 214 of the part adaptive facial expression 3D model compositing unit 205 illustrated in FIG. 31 inputs the nine types of artifact UV maps from the artifact UV map generation units 213-1 to 9 in the previous stage.

The texture-shape compositing unit 214 further inputs a total of nine types of the texture-shape combination data, which are all combinations of textures and shapes in the following three types of shape information and three types of texture information, from the texture-shape combination data generation unit 211.

(a) The already-output data-applied facial expression predictive shape information and the already-output data-applied facial expression predictive texture information generated by the already-output data-applied predictive facial expression 3D model separating unit 202 on the basis of the already-output data-applied predictive facial expression 3D model 71 input from the facial expression 3D model prediction unit 150.

(b) The facial expression predictive shape information and the facial expression predictive texture information generated by the predictive facial expression 3D model separating unit 203 on the basis of the predictive facial expression 3D model 70 input from the facial expression 3D model prediction unit 150.

(c) The facial expression shape information and the facial expression texture information generated by the facial expression 3D model separating unit 204 on the basis of the facial expression 3D model generation data 76 input from the facial expression 3D model multiplexing unit 173.

As described above, the rewriting-rendering units 212-1 to 9 generate the rewriting-rendering images on the basis of the total of nine types of texture-shape combination data, which are all combinations of the three types of shape information and the three types of texture information in the above (a) to (c).

The artifact UV map generation units 213-1 to 9 generate nine types of artifact UV maps corresponding to the nine types of rewriting-rendering images generated on the basis of the total of nine types of texture-shape combination data, which are all combinations of the three types of shape information and the three types of texture information in the above (a) to (c).

As a result, the texture-shape compositing unit 214 of the part adaptive facial expression 3D model compositing unit 205 illustrated in FIG. 31 inputs each of the following information.

(1) The total of nine types of texture-shape combination data, which are all combinations of the three types of shape information and the three types of texture information in the above (a) to (c).

(2) The nine types of artifact UV maps corresponding to the nine types of rewriting-rendering images generated on the basis of the total of nine types of texture-shape combination data, which are all combinations of the three types of shape information and the three types of texture information in the above (a) to (c). These pieces of information are input.

Using this input information, the texture-shape compositing unit 214 generates the facial expression 3D model composite data 77 in which artifacts are reduced, and outputs the data to the output switching unit 174, as illustrated in FIG. 29.

The processing configuration for generating the facial expression 3D model composite data 77 in which artifacts are reduced, performed by the texture-shape compositing unit 214, will be described with reference to FIG. 38.

Figure 38:
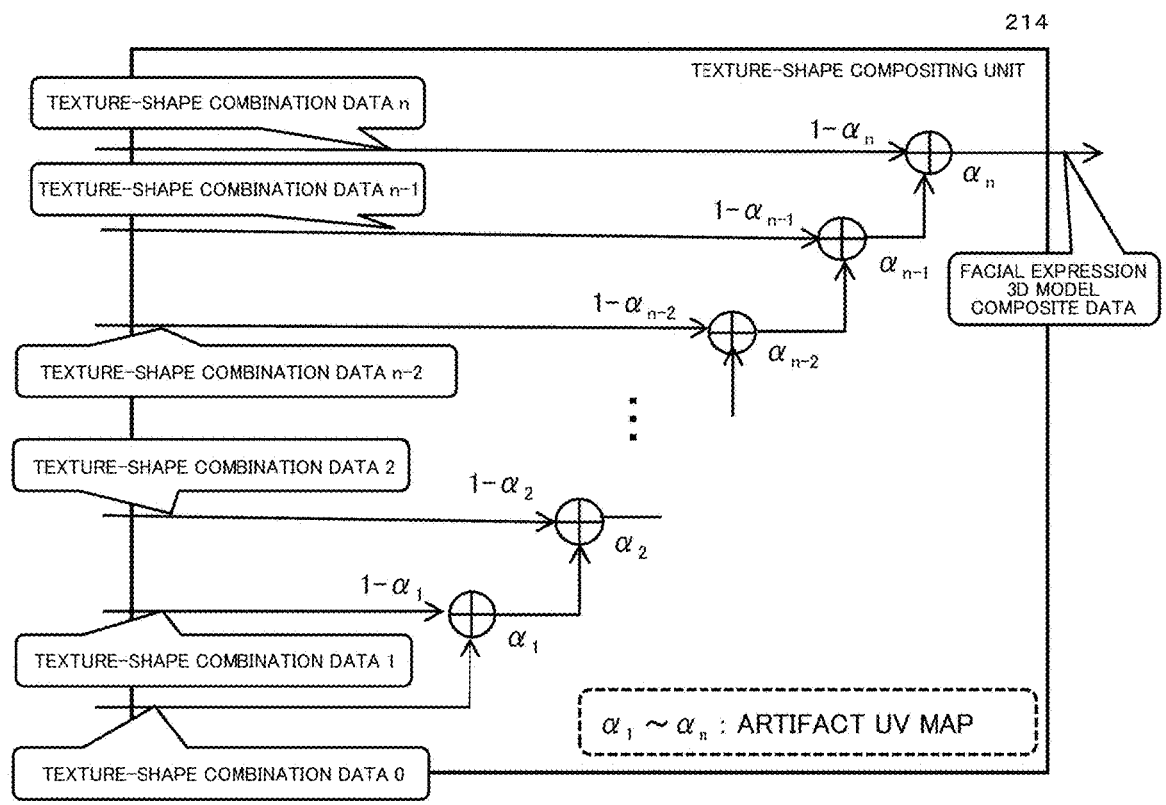
FIG. 38 is a diagram illustrating the configuration of, and processing executed by, a texture shape compositing unit of the fourth embodiment.

FIG. 38 is a diagram illustrating an example of the configuration of the texture-shape compositing unit 214.

The n types of texture-shape combination data generated by the texture-shape combination data generation unit 211 are input to the texture-shape compositing unit 214. In the present embodiment, n=9. Settings aside from inputting all nine types can also be made, and it is also possible to generate and input more than nine types of the texture-shape combination data, and thus the number of pieces of texture-shape combination data to be input to the texture-shape compositing unit 214 is indicated as n.

The n pieces of texture-shape combination data and the n artifact UV maps corresponding to the n pieces of texture-shape combination data are input to the texture-shape compositing unit 214.

In FIG. 38, the n artifact UV maps are indicated as a1 to an.

As described earlier, the artifact UV map is, for example, a 2D map in which the artifact degree, which indicates the prominence of artifacts, is set (e.g., an 8-bit grayscale image).

As illustrated in FIG. 38, the texture-shape compositing unit 214 performs weighted average processing on the n types of texture-shape combination data in a cascade configuration in a predetermined order, using the pixel values of each artifact UV map, indicated by a1 to an, as weighting coefficients.

This weighted average processing using a cascade configuration with the pixel values of the artifact UV map serving as weighting coefficients is a configuration that prioritizes and composites data with fewer artifacts from the n types of texture-shape combination data, and as a result, it is possible to generate and output the facial expression 3D model composite data 77 having reduced artifacts.

The facial expression 3D model composite data 77, which is the result of the weighted average processing in which the cascade configuration is applied, is input to the output switching unit 174 illustrated in FIG. 29.

FIG. 39 illustrates an example of the structure of the texture-shape combination data and the artifact UV map (when n=6). Basically, the configuration assumes that the higher the value of the texture-shape combination data index (0-6), the higher the accuracy of the 3D model of facial expressions will be.

By using this configuration, regions with high pixel values in the artifact UV map are determined to have noticeable artifacts, and a plurality of pieces of the texture-shape combination data can be composited to reduce artifacts, which makes it possible to output the facial expression 3D model composite data 77 having reduced artifacts as the output from the final stage.

This facial expression 3D model composite data 77 having reduced artifacts is input to the output switching unit 174 instead of the facial expression 3D model generation data output by the facial expression 3D model multiplexing unit 173 in the first embodiment.

In the first embodiment, when the facial expression substitution determination flag 73 is 0, the facial expression 3D model generation data output by the facial expression 3D model multiplexing unit 173 was output as the facial expression 3D model 52.

As opposed to this, in the present fourth embodiment, if the value of the facial expression substitution determination flag 73 is 0, the facial expression 3D model data compositing unit 175 outputs the facial expression 3D model composite data 77 in which artifacts are reduced as the facial expression 3D model 52.

As described thus far, in the present fourth embodiment, by composing texture and shape data in consideration of artifacts that occur in various types of 3D models, it is possible to generate 3D model data of faces having various facial expressions with fewer breakdowns.

6. (Fifth Embodiment) Configuration and Processing of Image Processing Device of Fifth Embodiment of Present Disclosure The configuration of and processing by a fifth embodiment of the image processing device of the present disclosure will be described next.

Figure 40:
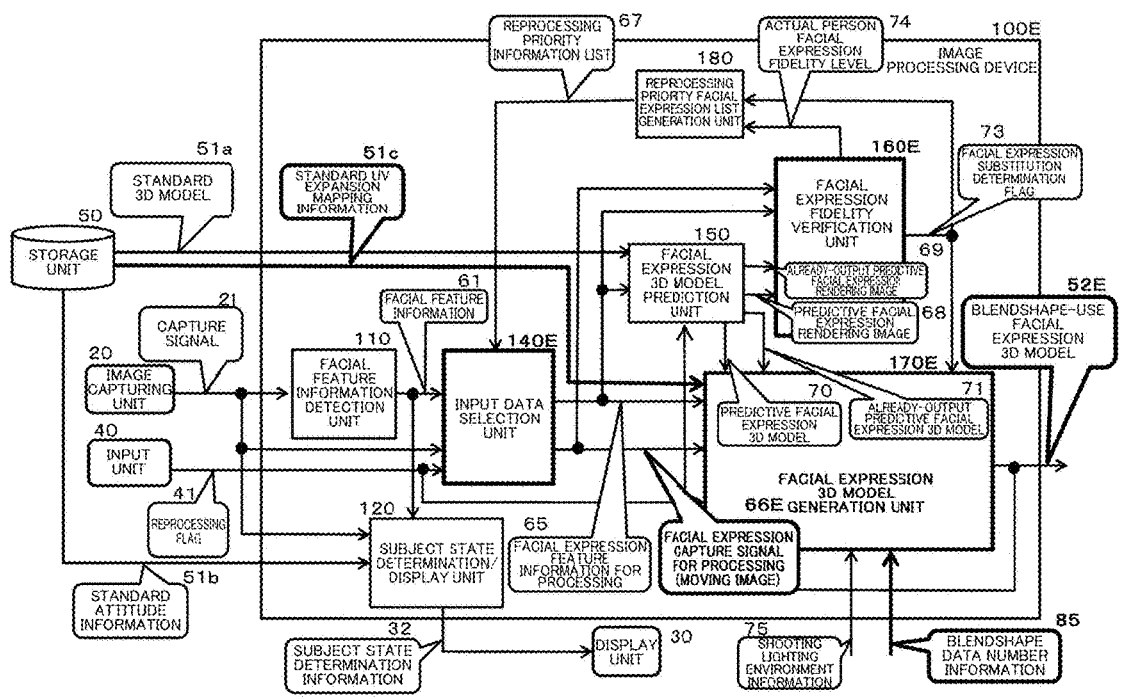
FIG. 40 is a diagram illustrating an example of the configuration of an image processing device of a fifth embodiment of the present disclosure.

FIG. 40 is a block diagram illustrating an example of the configuration of an image processing device 100E of the fifth embodiment of the present disclosure.

As illustrated in FIG. 40, the image processing device 100E includes the facial feature information detection unit 110, an input data selection unit 140E, the facial expression 3D model prediction unit 150, a facial expression fidelity verification unit 160E, a facial expression 3D model generation unit 170E, and the reprocessing priority facial expression list generation unit 180.

The image processing device 100E of the present fifth embodiment is based on the image processing device 100D of the fourth embodiment described earlier.

The differences from the image processing device 100D of the fourth embodiment are as follows.

In the image processing device 100E of the present fifth embodiment, for example, when the image capturing unit 20 captures the facial expression of the user 10 illustrated in FIG. 1, the user 10 is first made to perform the same attitude and facial expression (e.g., expressionless) as the standard data 51, and then the facial expression is gradually changed to take on the target facial expression. The image capturing unit 20 captures time-series data (a moving image) as the face changes in this manner.

In other words, the data input to the image processing device 100E is continuous time-series data (moving image data).

Furthermore, in the present fifth embodiment, the processing executed by the input data selection unit 140E, the facial expression fidelity verification unit 160E, and the facial expression 3D model generation unit 170E, as well as standard UV expansion mapping information 51c and blendshape data number information 85 being newly input to the image processing device 100E from the storage unit 50, differ from the fourth embodiment.

The blendshape data number information 85 is set in advance and stored in the storage unit 50.

Furthermore, in the present fifth embodiment, the setting of the weighting coefficients to be applied to the compositing processing for the plurality of pieces of texture-shape combination data, which was executed by the facial expression 3D model generation unit 170D of the fourth embodiment described earlier, differs from the configuration described in the fourth embodiment with reference to FIG. 38.

Additionally, the image processing device 100E of the present fifth embodiment outputs a plurality of pieces of facial expression 3D model data corresponding to each of weighting coefficient ratios (assuming discretization) during the calculations of the compositing processing as a blendshape-use facial expression 3D model 52E. The blendshape-use facial expression 3D model 52E is a plurality of facial expression 3D models having slightly different facial expressions, and by blending these models, it is possible to easily generate a facial expression 3D model.

The other configurations and processing are the same as in the fourth embodiment described earlier, and thus descriptions thereof will be omitted, and the points that differ from the fourth embodiment will be described below.

Figure 41:
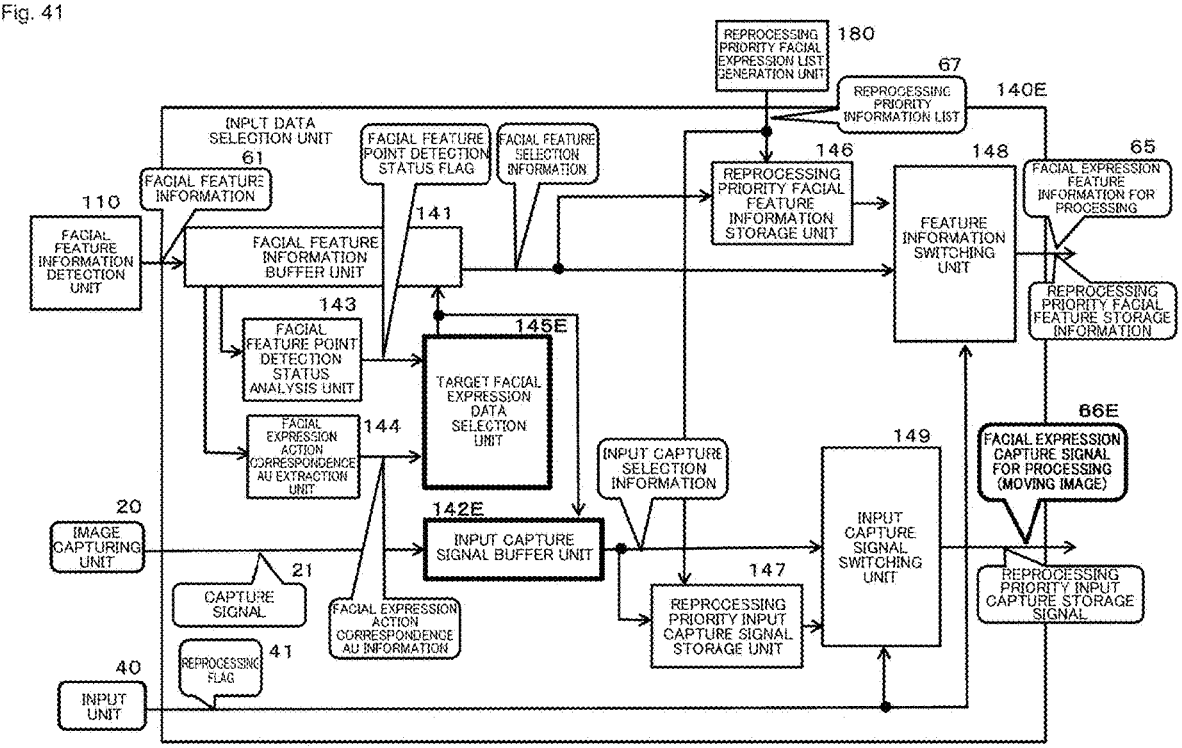
FIG. 41 is a diagram illustrating the configuration of, and processing executed by, an input data selection unit of the fifth embodiment.

The internal structure of the input data selection unit 140E in the present fifth embodiment is illustrated in FIG. 41. The difference between the input data selection unit 140E and the input data selection unit 140 of the fourth embodiment is the processing executed by a target facial expression data selection unit 145E and an input capture signal buffer unit 142E.

The target facial expression data selection unit 145E selects the data, among the data buffered in the facial feature information buffer unit 141, for which the facial feature point detection status flag information is 1 and the strength of the action unit (AU) indicated by the facial expression action correspondence AU information is the highest, and outputs the selection result as the input data selection information to the facial feature information buffer unit 141 and the input capture signal buffer unit 142E. This is the same as in the first embodiment, the fourth embodiment, and so on described earlier.

The input capture signal buffer unit 142E of the present fifth embodiment handles, as the selected data (the input capture selection signal), not only one image of a frame in which the strength of the facial expression indicated by the facial expression action correspondence AU information is the highest, but also moving image data of a plurality of frames going back to the start frame of the facial expression change when that frame is the final frame, i.e., the expressionless frame, and ultimately outputs that data as a facial expression capture signal to be processed (moving image) 66E from the input data selection unit 140E.

In this manner, the facial expression capture signal to be processed (moving image) 66E contains time-series moving image data of facial expression changes.

The facial expression capture signal to be processed (moving image) 66E is input to the facial expression fidelity verification unit 160E and the facial expression 3D model generation unit 170E.

Figure 42:
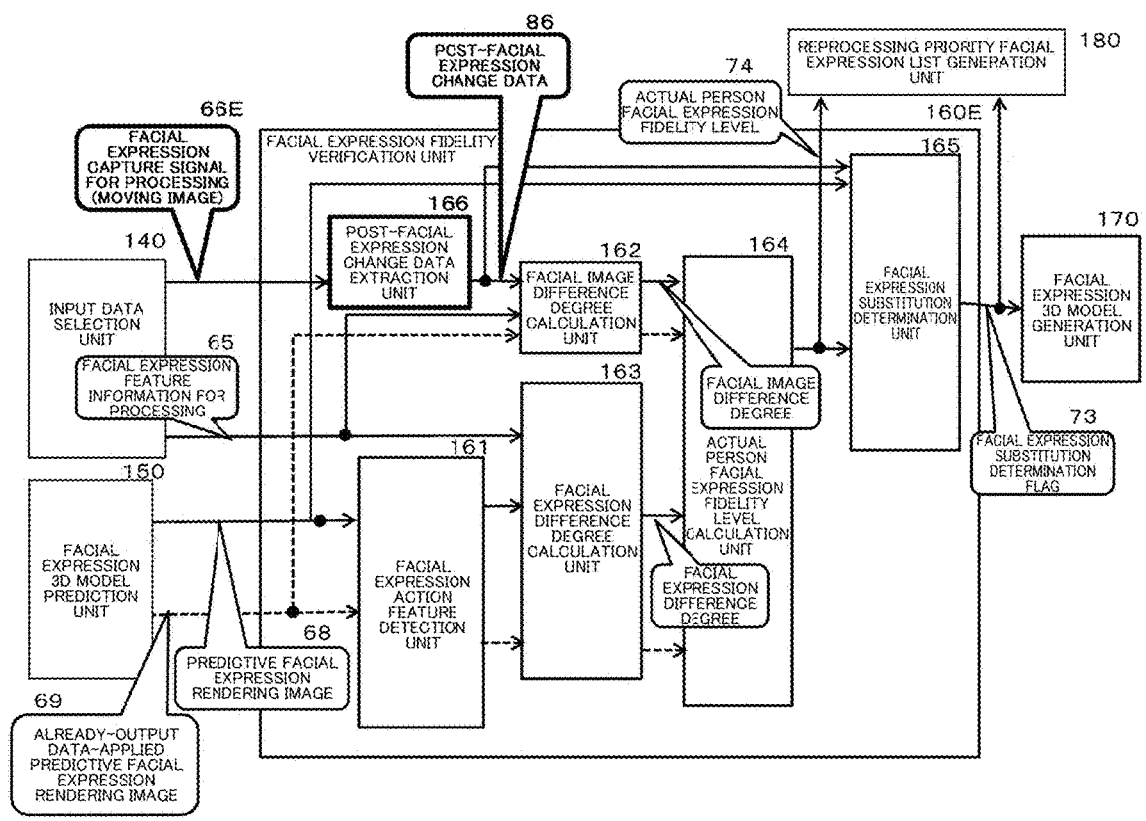
FIG. 42 is a diagram illustrating the configuration of, and processing executed by, a facial expression fidelity verification unit of the fifth embodiment.
Figure 43:
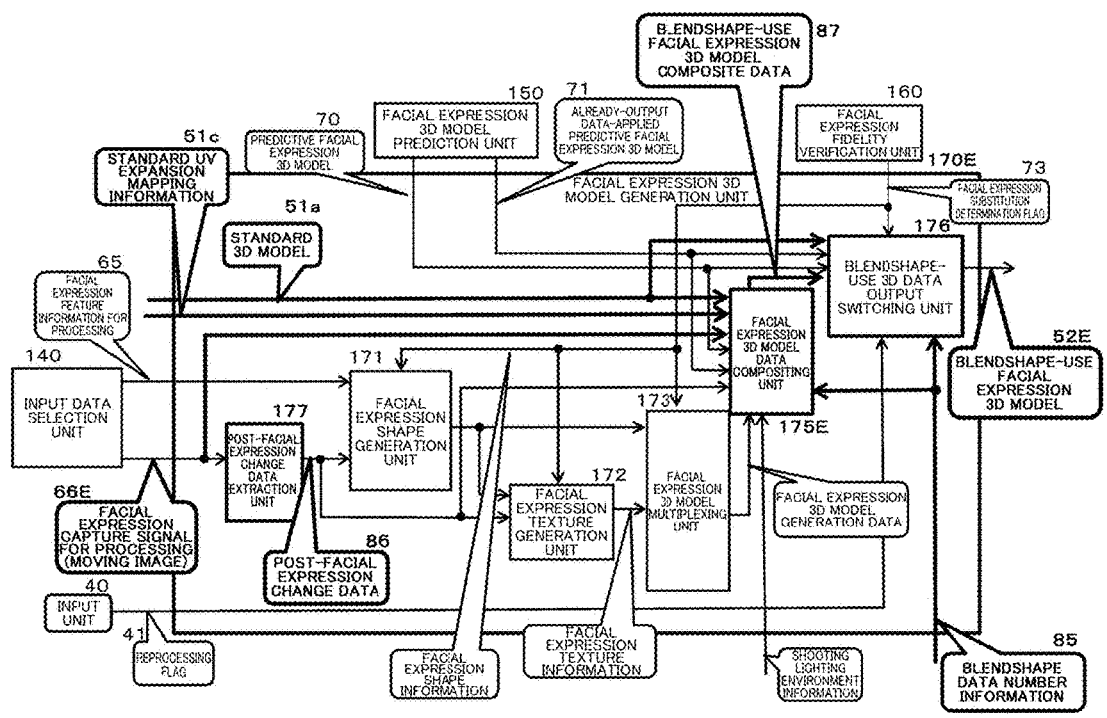
FIG. 43 is a diagram illustrating the configuration of, and processing executed by, a facial expression 3D model generation unit of the fifth embodiment.

The facial expression fidelity verification unit 160E and the facial expression 3D model generation unit 170E include post-facial expression change data extraction units 166 and 177, respectively, that execute processing on the facial expression capture signal to be processed (moving image) 66E input to each processing unit, as illustrated in the respective block diagrams of the facial expression fidelity verification unit 160E and the facial expression 3D model generation unit 170E, illustrated in FIG. 42 and FIG. 43, respectively.

The post-facial expression change data extraction units 166 and 177 extract only the data of the final frame after the facial expression has changed from the facial expression capture signal to be processed (moving image) 66E, and output the extracted data as post-facial expression change data 86.

In the facial expression 3D model generation unit 170E illustrated in FIG. 43, the facial expression capture signal to be processed (moving image) 66E, which contains the time-series moving image data of facial expression changes, is also input to a facial expression 3D model data compositing unit 175E.

The facial expression 3D model generation unit 170E of the present fifth embodiment illustrated in FIG. 43 differs from the facial expression 3D model generation unit 170D of the fourth embodiment, described earlier with reference to FIG. 29, in the following ways:

(1) the processing details of the facial expression 3D model data compositing unit 175E;
(2) the output switching unit 174 in the facial expression 3D model generation unit 170D described in the fourth embodiment with reference to FIG. 29 is replaced with a blendshape-use 3D data output switching unit 176 in the facial expression 3D model generation unit 170E of the present fifth embodiment illustrated in FIG. 43; and furthermore,
(3) the blendshape data number information 85 is input to the facial expression 3D model data compositing unit 175E and the blendshape-use 3D data output switching unit 176.

These points are different.

Figure 44:
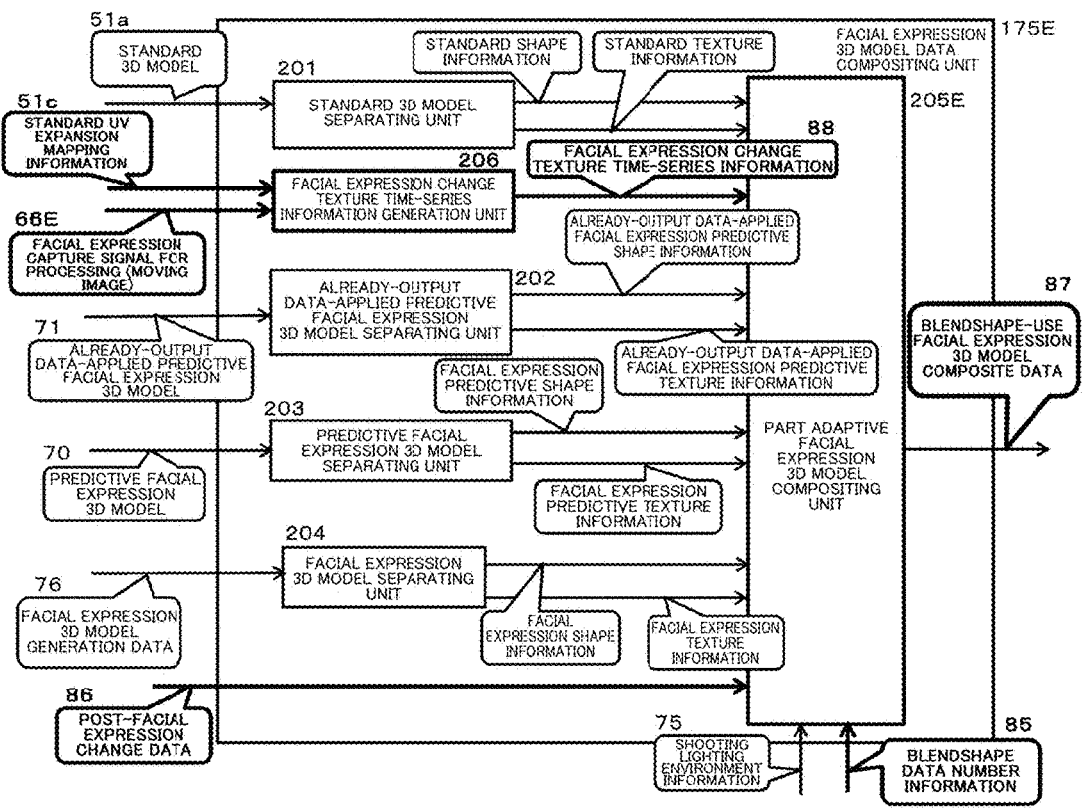
FIG. 44 is a diagram illustrating the configuration of, and processing executed by, a facial expression 3D model data compositing unit of the fifth embodiment.

The facial expression 3D model data compositing unit 175E configured within the facial expression 3D model generation unit 170E of the present fifth embodiment illustrated in FIG. 43 has the configuration illustrated in FIG. 44.

The difference between the facial expression 3D model data compositing unit 175E of the present fifth embodiment illustrated in FIG. 44 and the facial expression 3D model data compositing unit 175D of the fourth embodiment described earlier with reference to FIG. 30 is that a facial expression change texture time-series information generation unit 206 has been added.

The facial expression change texture time-series information generation unit 206 added to the facial expression 3D model data compositing unit 175E of the present fifth embodiment illustrated in FIG. 44 inputs the standard UV expansion mapping information 51c and the facial expression capture signal to be processed (moving image) 66E, generates facial expression change texture time-series information 88, and outputs that information to a part adaptive facial expression 3D model compositing unit 205E.

Figure 45:
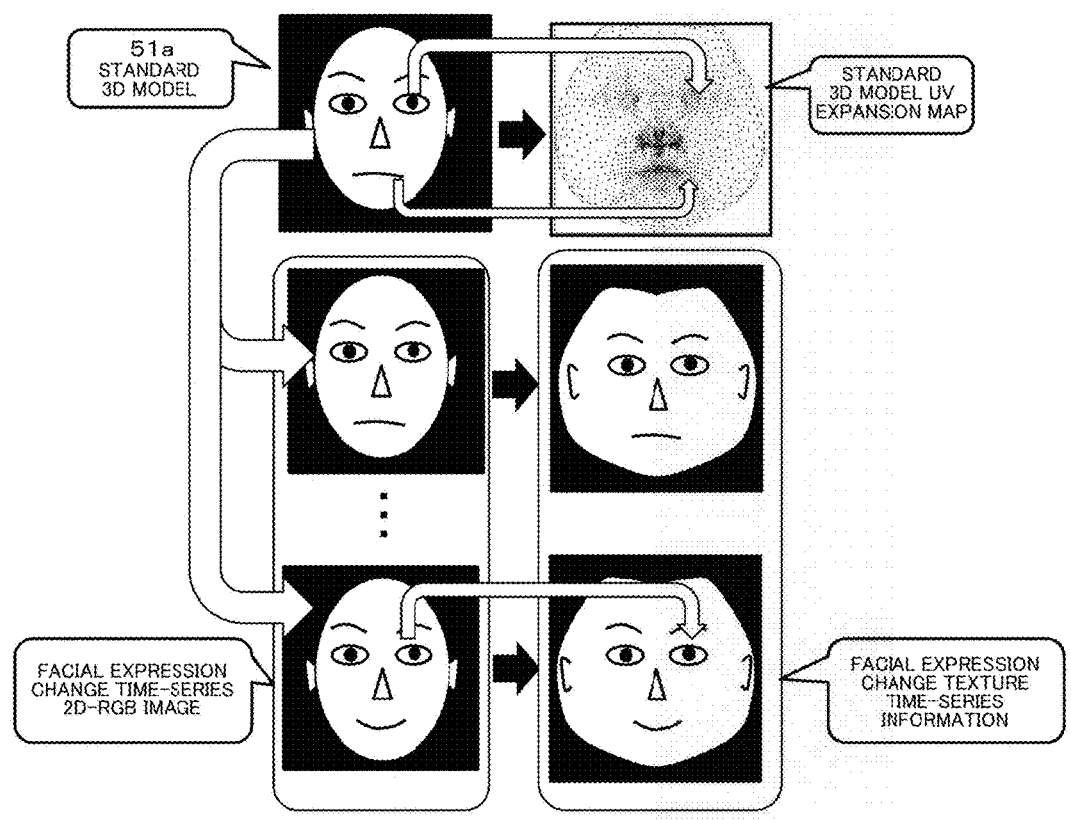
FIG. 45 is a diagram illustrating processing executed by the facial expression 3D model data compositing unit of the fifth embodiment.

When the mesh of the standard shape information contained in the standard 3D model 51a is adapted to a standard expressionless 2D RGB image as illustrated in the upper-left of FIG. 45, the facial expression change texture time-series information generation unit 206 performs processing of mapping the texture of the expressionless face onto the UV expansion map illustrated in the upper-right of FIG. 45 for the plurality of images, in which the facial expression changes in time series, contained in the facial expression capture signal to be processed (moving image) 66E (a facial expression change time-series 2D-RGB image in the lower-left frame of FIG. 45).

As a result, a plurality of images mapped to the UV expansion map are generated as facial expression change texture time-series information (inside the lower-right frame in FIG. 45) and output to the part adaptive facial expression 3D model compositing unit 205E in FIG. 44.

FIG. 46 illustrates an example of the data input to the part adaptive facial expression 3D model compositing unit 205E of the facial expression 3D model data compositing unit 175E of the present fifth embodiment illustrated in FIG. 44.

FIG. 46 illustrates an example of the structure of the same data as in FIG. 39, described earlier in the fourth embodiment, i.e., the texture-shape combination data and the artifact UV map input the part adaptive facial expression 3D model compositing unit 205E of the facial expression 3D model data compositing unit 175E of the present fifth embodiment illustrated in FIG. 44 (when n=6).

The difference between the present fifth embodiment and the texture-shape combination data described previously in the fourth embodiment with reference to FIG. 39 is that the texture information for index 0 has been changed from "standard texture" to "facial expression change texture time-series information".

In the fourth embodiment, the expressionless 3D model data of "standard shape—standard texture" is applied in the regions where artifacts occur in all of the texture-shape combination data indexes 1 to 6, which results in a static display even if the facial expression is in motion.

As opposed to this, in the present fifth embodiment, for regions where artifacts occur in any of the texture-shape combination data indexes 1 to 6, the standard shape is applied in a fixed manner, but the facial expression change texture time-series information can be used for the texture. As a result, it is possible to present facial expressions with motion.

The configuration of the part adaptive facial expression 3D model compositing unit 205E of the present fifth embodiment illustrated in FIG. 47 and the part adaptive facial expression 3D model compositing unit 205 described in the fourth embodiment with reference to FIG. 31 differ in the following ways:

(1) the facial expression change texture time-series information 88 is newly added as an input;
(2) the "facial expression capture signal for processing 66", which is one piece of input information for the part adaptive facial expression 3D model compositing unit 205 of the fourth embodiment illustrated in FIG. 31, has been changed to the "post-facial expression change data 86" for the part adaptive facial expression 3D model compositing unit 205E of the fifth embodiment illustrated in FIG. 47; and
(3) the texture-shape compositing unit 214 of the fourth embodiment illustrated in FIG. 31 has been replaced with a blendshape-use texture-shape compositing unit 215 of the fifth embodiment illustrated in FIG. 47.

These points are different.

Figure 47:
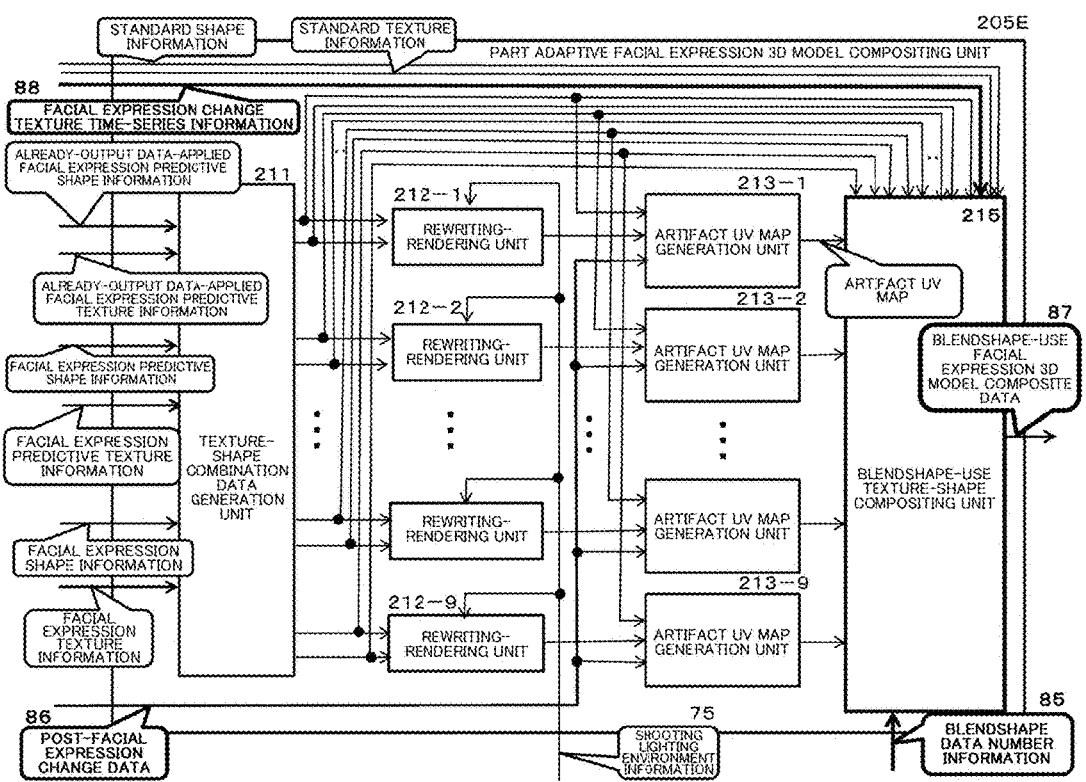
FIG. 47 is a diagram illustrating the configuration of, and processing executed by, a part adaptive facial expression 3D model compositing unit of the fifth embodiment.

The blendshape data number information 85 is input to the blendshape-use texture-shape compositing unit 215 of the fifth embodiment illustrated in FIG. 47, and blendshape-use facial expression 3D model composite data 87 corresponding to the weighting coefficient ratios (assuming discretization) during the calculations of the blendshape is output.

Note that as illustrated in FIG. 47, the same processing blocks as in the texture-shape compositing unit 214 described in the fourth embodiment with reference to FIG. 31 (the texture-shape combination data generation unit 211, the rewriting-rendering units 212-1 to n, and the artifact UV map generation units 213-1 to n) are disposed in the stages before the blendshape-use texture-shape compositing unit 215 of the fifth embodiment.

Figure 48:
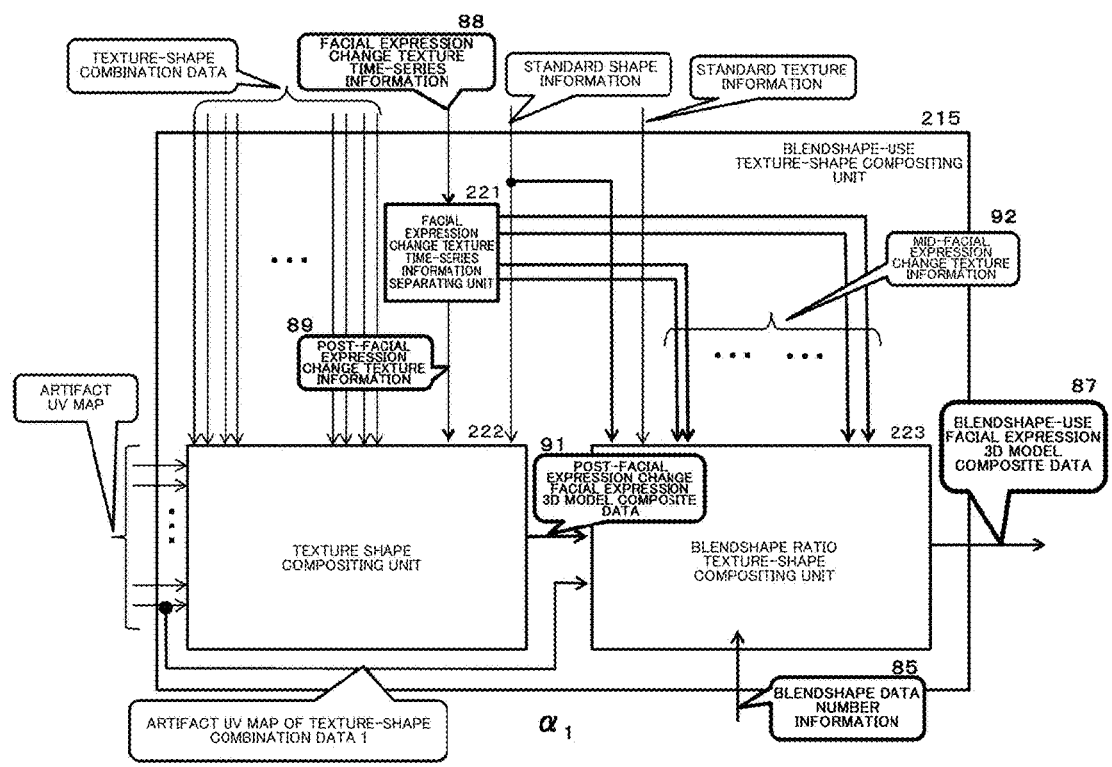
FIG. 48 is a diagram illustrating the configuration of, and processing executed by, a blendshape-use texture shape compositing unit of the fifth embodiment.

"Post-facial expression change texture time-series information 88" is input to the blendshape-use texture-shape compositing unit 215 of the fifth embodiment. FIG. 48 illustrates the internal configuration of the blendshape-use texture-shape compositing unit 215.

As illustrated in FIG. 48, the blendshape-use texture-shape compositing unit 215 includes a facial expression change texture time-series information separating unit 221, a texture shape compositing unit 222, and a blendshape ratio texture-shape compositing unit 223.

The facial expression change texture time-series information separating unit 221 inputs the post-facial expression change texture time-series information 88, obtains the texture of an image corresponding to the final frame of the facial expression change, and outputs that texture as post-facial expression change texture information 89 to the texture shape compositing unit 222.

The facial expression change texture time-series information separating unit 221 further generates mid-facial expression change texture information 92 from the post-facial expression change texture time-series information 88, and outputs the generated information to the blendshape ratio texture-shape compositing unit 223.

The texture shape compositing unit 222 performs the same processing as the texture-shape compositing unit 214 of the fourth embodiment described earlier with reference to FIG. 38, generates post-facial expression change facial expression 3D model composite data 91, and outputs the data to a blendshape ratio texture-shape compositing unit 223 in a later stage.

Figure 49:
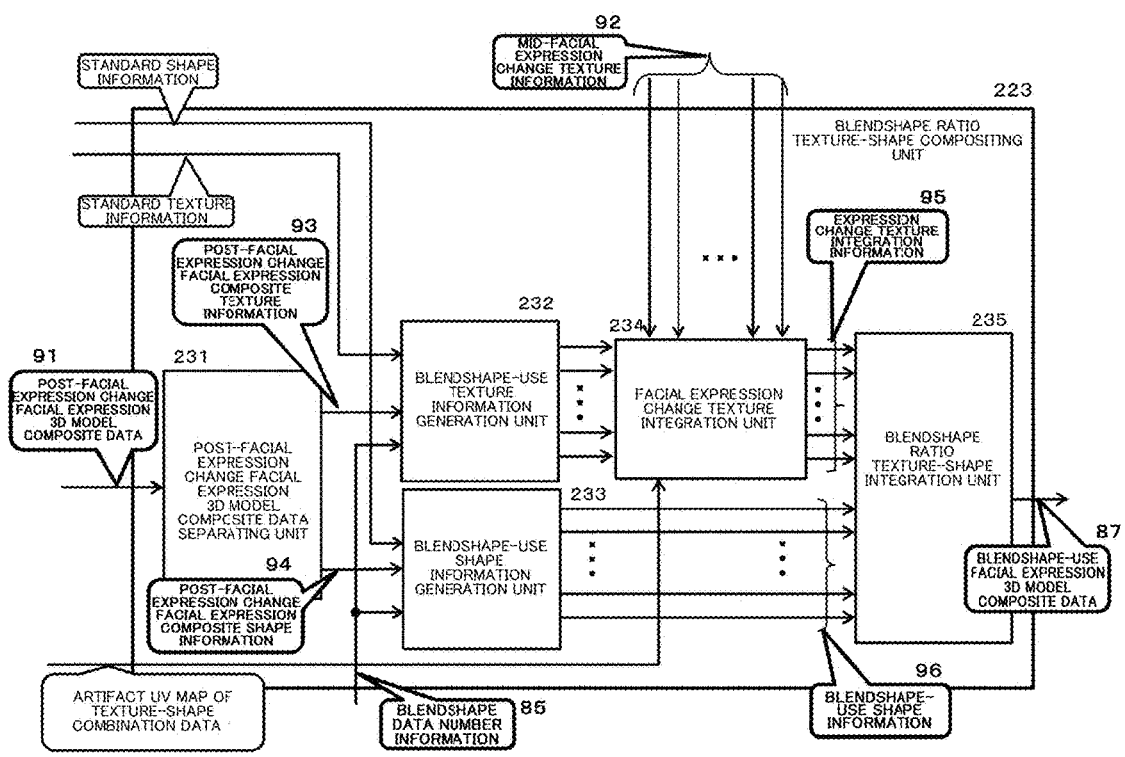
FIG. 49 is a diagram illustrating the configuration of, and processing executed by, a blendshape ratio texture shape compositing unit of the fifth embodiment.

The configuration of, and processing performed by, the blendshape ratio texture-shape compositing unit 223 will be described with reference to FIG. 49.

First, the post-facial expression change facial expression 3D model composite data 91 from the texture shape compositing unit 222 is input to a post-facial expression change facial expression 3D model composite data separating unit 231.

The post-facial expression change facial expression 3D model composite data separating unit 231 separates the post-facial expression change facial expression 3D model composite data 91 into post-facial expression change facial expression composite texture information 93 and post-facial expression change facial expression composite shape information 94.

A blendshape-use shape information generation unit 233 generates shape information for the types of weighting coefficients on the basis of the blendshape data number information 85 input from the storage unit 50.

Specifically, when the standard shape information is S0 and the post-facial expression change facial expression composite shape information 94 is Sn, and the weighting coefficient of the blendshape is represented by r (normalized as 0.0 to 1.0), weighting coefficient: $r=1.0$ The shape information of this weighting coefficient corresponds to post-facial expression change facial expression composite shape information 94=Sn. Additionally, weighting coefficient: $r=0.0$ The shape information of this weighting coefficient corresponds to the standard shape information S0.

The blendshape-use shape information generation unit 233 calculates blendshape-use shape information (Sk) corresponding to the weighting coefficient (0.0<r<1.0) therebetween as follows.

Now, assume that the weighting coefficient r is divided into 8 parts (n=8), and a kth weighting coefficient rk is $rk=k/8.0$ In this case, the blendshape-use shape information (Sk) corresponding to the weighting coefficient rk is expressed as the following (Equation 1).

$$Sk = S0 + rk \times (Sn - S0) \quad \text{(Equation 1)}$$

Here,
k=1, 2, ~, 6, 7
S0=standard shape information
Sn=post-facial expression change facial expression composite shape information On the other hand, for textures, a blendshape-use texture information generation unit 232 similarly generates the texture information for the types of weighting coefficients on the basis of the blendshape data number information 85.

Specifically, when the standard texture information is T0 and the post-facial expression change facial expression composite texture information 94 is Tn, blendshape weighting coefficient: $r=1.0$ The texture information of this weighting coefficient corresponds to post-facial expression change facial expression composite texture information 94=Tn. Additionally, blendshape weighting coefficient: $r=0.0$ The texture information of this weighting coefficient corresponds to standard texture information=T0.

The blendshape-use texture information generation unit 232 calculates texture information corresponding to the weighting coefficient (0.0<r<1.0) therebetween as follows, in the same manner as with the shapes.

Now, assume that the weighting coefficient r is divided into 8 parts (n=8), and a kth weighting coefficient rk is $rk=k/8.0$ In this case, the blendshape-use texture information (Tk) corresponding to the weighting coefficient rk is expressed as the following (Equation 2).

$$Tk = T0 + rk \times (Tn - T0) \quad \text{(Equation 2)}$$

Here,
k=1, 2, ~, 6, 7
T0=standard texture information
Tn=post-facial expression change facial expression composite texture information In the present fifth embodiment, furthermore, a facial expression change texture integration unit 234 performs processing for integrating mid-facial expression change texture information for a region having a high value for the artifact UV map of the texture-shape combination data 1.

A plurality of pieces of the mid-facial expression change texture information are assigned to correspond to the weighting coefficients rk (k=1, 2, ~, 6, 7), respectively. In this assignment processing, thinning and (motion) interpolation processing may be performed as necessary.

A plurality of pieces of mid-facial expression change texture data, which are assigned corresponding to the weighting coefficients rk (k=1, 2, ~, 6, 7), are indicated as ATk.

Here, if the value of the artifact UV map of texture-shape combination data 1 is represented by α1, expression change texture integration information ITk can be calculated according to the following (Equation 3).

$$ITk = (1.0 - \alpha1) \times Tk + \alpha1 \times ATk \quad \text{(Equation 3)}$$

Here, k=1, 2, ~, 6, 7.

Through this, the mid-facial expression change texture information 92 is assigned to regions where artifacts remain in the post-facial expression change facial expression composite texture information 93, which makes it possible to display animations by displaying facial expression changes as changes in textures, while preventing the occurrence of artifacts.

The expression change texture integration information ITk found in this manner is output to a blendshape ratio texture-shape integration unit 235 in a later stage.

The blendshape ratio texture-shape integration unit 235 inputs
(1) the expression change texture integration information 95 corresponding to the number of pieces of the blendshape data number information 85, from the facial expression change texture integration unit 234, and
(2) the blendshape-use shape information 96 corresponding to the number of pieces of the blendshape data number information 85, from the blendshape-use shape information generation unit 233.

These are input.

The blendshape ratio texture-shape integration unit 235 generates the blendshape-use facial expression 3D model composite data 87 in which the input information in the foregoing (1) and (2) are multiplexed, and outputs that data to the blendshape ratio texture-shape compositing unit 223.

This output is input to the blendshape-use 3D data output switching unit 176 illustrated in FIG. 43.

The blendshape-use 3D data output switching unit 176 of the present fifth embodiment switches the content of the data in the facial expression 3D model 52 which is ultimately output by using the facial expression substitution determination flag 73 input from the facial expression fidelity verification unit 160 and the reprocessing flag 41, in the same manner as the output switching unit 174 of the fourth embodiment.

However, the facial expression 3D model generation unit 170E of the present fifth embodiment illustrated in FIG. 43 generates a number of pieces of blendshape-use 3D data indicated by the blendshape data number information 85 input from the storage unit 50.

The configuration of, and processing performed by, the blendshape-use 3D data output switching unit 176 will be described with reference to FIG. 50.

Figure 50:
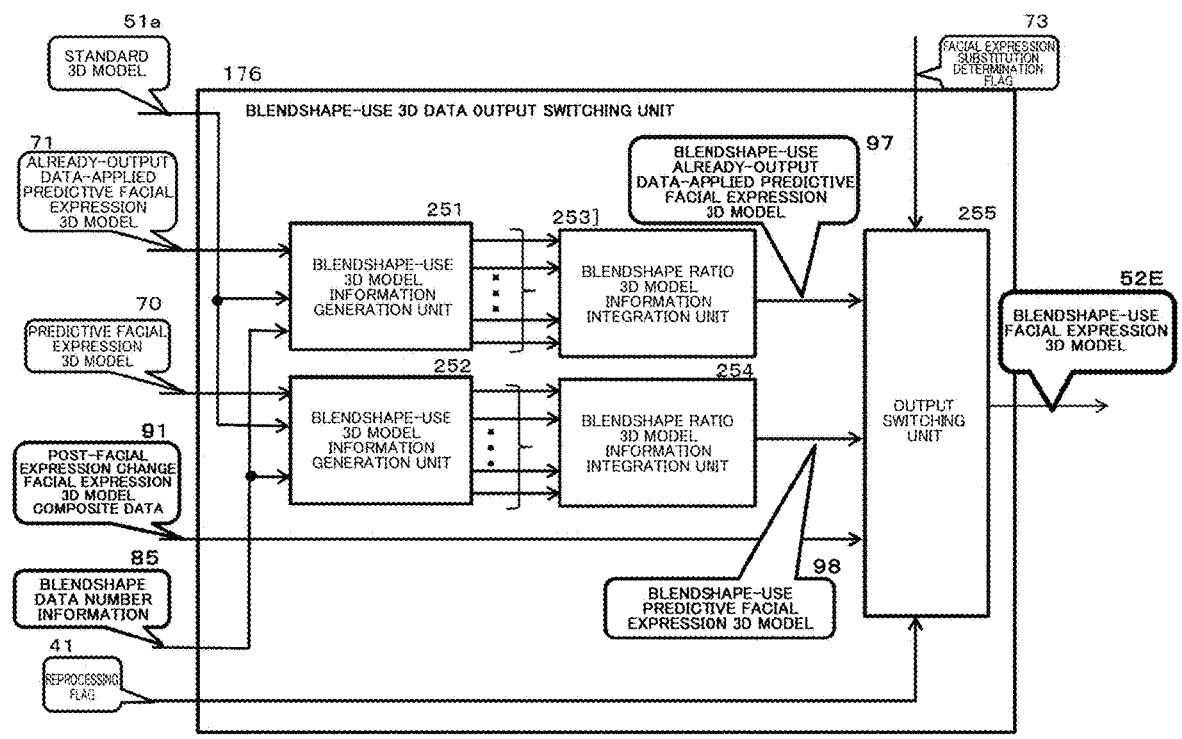
FIG. 50 is a diagram illustrating the configuration of, and processing executed by, a blendshape-use 3D data output switching unit of the fifth embodiment.

As illustrated in FIG. 50, the already-output data-applied predictive facial expression 3D model 71 and the predictive facial expression 3D model 70 input from the facial expression 3D model prediction unit 150 are input to a blendshape-use 3D model information generation unit 251 and a blendshape-use 3D model information generation unit 252.

The blendshape-use 3D model information generation units 251 and 252 perform the same processing as the blendshape-use texture information generation unit 232 and the blendshape-use shape information generation unit 233 described earlier with reference to FIG. 49 on the shape information and texture information constituting the already-output data-applied predictive facial expression 3D model 71 and the predictive facial expression 3D model 70, on the basis of the standard 3D model 51a input from the storage unit 50.

As a result of this processing, the blendshape-use 3D model information generation unit 251 generates a plurality of pieces of blendshape-use texture information and blendshape-use shape information based on the already-output data-applied predictive facial expression 3D model 71, and outputs this information to a blendshape ratio 3D model information integration unit 253 in a later stage.

Additionally, the blendshape-use 3D model information generation unit 252 generates a plurality of pieces of blendshape-use texture information and blendshape-use shape information based on the predictive facial expression 3D model 70, and outputs this information to a blendshape ratio 3D model information integration unit 254 in a later stage.

The blendshape ratio 3D model information integration unit 253 performs multiplexing processing on the blendshape-use texture information and the blendshape-use shape information based on a number of pieces of the already-output data-applied predictive facial expression 3D model 71 corresponding to the blendshape data number information 85 input from the blendshape-use 3D model information generation unit 251, and outputs the result to an output switching unit 255 in a later stage as a blendshape-use already-output data-applied predictive facial expression 3D model 97.

On the other hand, the blendshape ratio 3D model information integration unit 254 performs multiplexing processing on the blendshape-use texture information and the blendshape-use shape information based on a number of pieces of the predictive facial expression 3D model 70 corresponding to the blendshape data number information 85 input from the blendshape-use 3D model information generation unit 252, and outputs the result to the output switching unit 255 in a later stage as a blendshape-use predictive facial expression 3D model 98.

The output switching unit 255 switches the output in accordance with the value of the reprocessing flag 41, the facial expression substitution determination flag 73, and the like in the same manner as the output switching unit 174 described in the fourth embodiment with reference to FIG. 29.

Operations in the normal mode, when the reprocessing flag 41 is 0, will be described next.

When the facial expression substitution determination flag 73 is 1, the blendshape-use predictive facial expression 3D model 98 is output as a facial expression 3D model 52E.

When the facial expression substitution determination flag 73 is 2, the blendshape-use already-output data-applied predictive facial expression 3D model 97 is output as the facial expression 3D model 52E.

Furthermore, when the facial expression substitution determination flag 73 is 0, blendshape-use facial expression 3D model composite data 91, generated by the facial expression 3D model data compositing unit 175E illustrated in FIG. 45, is output as the facial expression 3D model 52.

Note that in the reprocessing mode too, when the reprocessing flag 41 is 1, blendshape-use facial expression 3D model composite data 91, generated by the facial expression 3D model data compositing unit 175E illustrated in FIG. 45, is output as the facial expression 3D model 52.

As described thus far, in the present fifth embodiment, when a plurality of different facial expressions of the user 10 illustrated in FIG. 1 are captured, the user 10 is first made to perform the same attitude and facial expression (e.g., expressionless) as the standard data 51, and then the facial expression is gradually changed to take on the target facial expression. The image capturing unit 20 captures time-series data (a moving image) as the face changes in this manner.

In other words, the data input to the image processing device 100E of the present fifth embodiment illustrated in FIG. 40 is continuous time-series data (moving image data).

In this manner, the image processing device 100E of the present fifth embodiment can perform 3D model generation processing that utilizes texture information of continuous time-series data (moving image data) by changing the attitude and facial expression (e.g., expressionless) from the same time as in the standard data 51 to a target facial expression. This processing makes it possible to present facial expressions of 3D models with motion.

It also becomes possible to reduce artifacts that occur during the 3D model prediction processing, 3D model generation processing, and the like, which makes it possible to generate 3D models with smooth motion with fewer artifacts.

7. Example of Hardware Configuration of Image Processing Device

An example of the hardware configuration of the image processing device of the present disclosure will be described next with reference to FIG. 51.

The image processing device of the present disclosure can be configured by an information processing device such as a Personal Computer (PC) or the like, for example.

Figure 51:
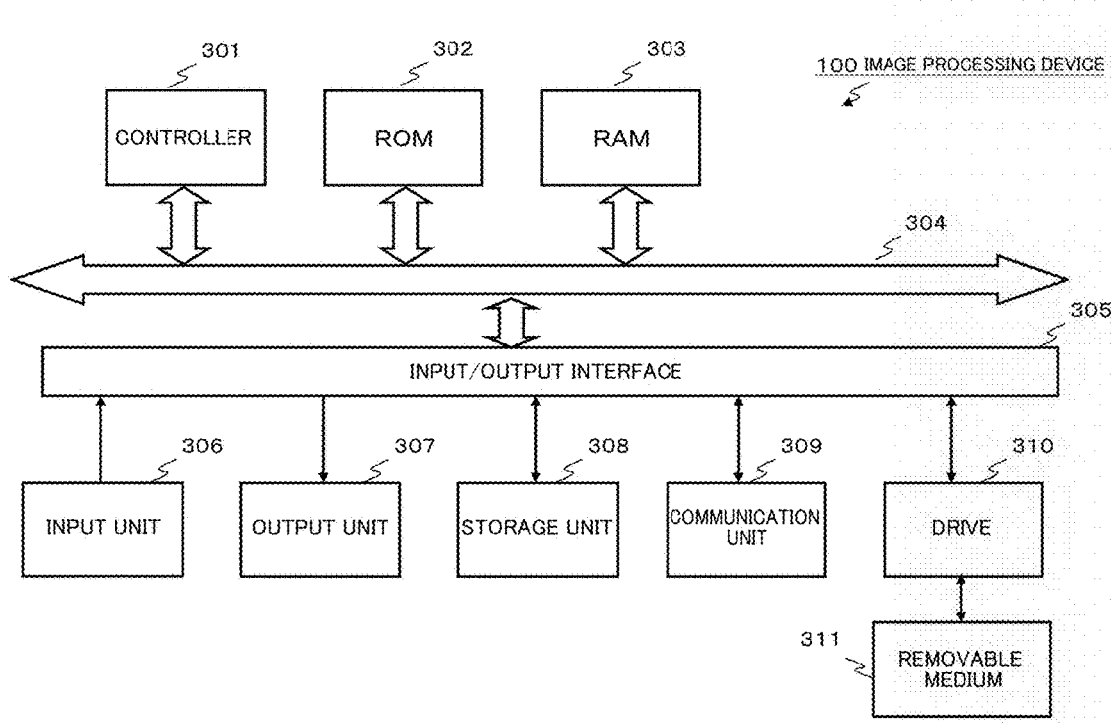
FIG. 51 is a diagram illustrating an example of the hardware configuration of an image processing device.

As illustrated in FIG. 51, the image processing device 100 includes a controller 301, Read Only Memory (ROM) 302, Random Access Memory (RAM) 303, an input/output interface 305, and a bus 304 that connects these elements to each other.

The controller 301 accesses the RAM 303 and the like as necessary, and controls all the blocks of the image processing device 300 while performing various types of arithmetic processing. The controller 301 may be a Central Processing Unit (CPU), a Graphics Processing Unit (GPU), or the like. The ROM 302 is non-volatile memory in which firmware such as OS, programs and various parameters to be executed by the controller 301 are stored in a rear-only manner. The RAM 303 is used as a work region and the like for the controller 301, and temporarily holds the OS, various applications being executed, and various data being processed.

An input unit 306, an output unit 307, a storage unit 308, a communication unit 309, and a drive 310 to which a removable medium 311 can be attached are connected to the input/output interface 305.

In addition to each of these elements, the input/output interface 305 may be configured to be capable of connecting to external peripheral devices via Universal Serial Bus (USB) terminals, IEEE terminals, and the like.

The input unit 306 is configured including the input unit 40, which is capable of inputting, for example, shot images from the image capturing unit 20 illustrated in FIG. 1, as well as user operation information and the like. The input unit 306 may be configured including an image capturing unit.

The input unit 306 includes, for example, a pointing device such as a mouse, a keyboard, a touch panel, and other input devices.

The output unit 307 outputs data to the display unit 30 illustrated in FIG. 1. The output unit 307 may be configured including a display unit.

The storage unit 308 is non-volatile memory such as, for example, a Hard Disk Drive (HDD), flash memory (SSD, Solid State Drive), or other solid-state memory. An OS, various applications, various data, and the like are stored in the storage unit 308. The storage unit 308 is also used as a storage region for input images, image information, generated output image groups, and the like.

The communication unit 309 is a Network Interface Card (NIC) for Ethernet (registered trademark), for example, and is responsible for communication processing over a network.

The drive 310 is used for data recording and playback processing using the removable medium 311.

The removable medium 311 is constituted by a BD, DVD, CD, HDD, flash memory, or the like, for example.

8. Summary of Configuration of Present Disclosure

Embodiments of the present disclosure have been described above in detail with reference to specific embodiments. However, it will be apparent to those skilled in the art that modifications and substitutions of the embodiments can be made without departing from the essential spirit of the technology disclosed in the present disclosure. That is, the present invention has been disclosed according to an illustrative form, but the present disclosure should not be interpreted as being limited thereto. The essential spirit of the present disclosure should be determined in consideration of the claims.

Meanwhile, the technology disclosed in the present description may also be configured as follows.

(1) An image processing device, including:
 a facial feature information detection unit that analyzes a facial image of a subject shot by an image capturing unit and detects facial feature information;
 an input data selection unit that selects, from a plurality of facial images shot by the image capturing unit and a plurality of pieces of facial feature information corresponding to the plurality of facial images, a set of a facial image and feature information optimal for generating a 3D model; and
 a facial expression 3D model generation unit that generates a 3D model using the facial image and the feature information selected by the input data selection unit.

(2) The image processing device according to (1), wherein as the facial image optimal for generating a 3D model, the input data selection unit selects a facial image having a facial expression having a large change from a facial expression of standard data of a 3D model of the subject held in a storage unit.

(3) The image processing device according to (2), wherein the standard data is an expressionless 3D model of the subject.

(4) The image processing device according to (2) or (3), wherein for each of the plurality of facial images shot by the image capturing unit, the input data selection unit compares strength of an action unit (AU) and selects a facial image having a high strength as the facial image optimal for generating a 3D model, the action unit being basic action definition data of a face.

(5) The image processing device according to any one of (1) to (4), wherein the input data selection unit selects feature information having a high reliability as the feature information optimal for generating a 3D model.

(6) The image processing device according to (5), wherein the input data selection unit analyzes a detection reliability of a facial feature point included in the feature information, and selects feature information constituted by a facial feature point having a high detection reliability as the feature information optimal for generating a 3D model.

(7) The image processing device according to any one of (1) to (6), further including: a facial expression 3D model prediction unit that generates a predictive facial expression 3D model and a predictive facial expression rendering image using a 3D model of the subject held in a storage unit and the facial image and the feature information selected by the input data selection unit, wherein when a predefined condition is satisfied, the facial expression 3D model generation unit omits processing of generating a 3D model using the facial image and the feature information selected by the input data selection unit, and outputs the predictive facial expression 3D model as a substitute.

(8) The image processing device according to (7), further including:

a facial expression fidelity verification unit that compares a facial expression in the predictive facial expression rendering image input from the facial expression 3D model prediction unit and the facial image selected by the input data selection unit, and executes facial expression similarity determination processing on the two facial expressions, wherein the facial expression 3D model generation unit executes one of the following processing of (a) or (b) in accordance with a verification result from the facial expression fidelity verification unit:

(a) generating and outputting a 3D model using the facial image and the feature information selected by the input data selection unit; or (b) outputting the predictive facial expression 3D model as a substitute.

(9) The image processing device according to (8), wherein the facial expression fidelity verification unit generates a facial expression substitution determination flag indicating whether or not the predictive facial expression 3D model can be output as a substitute by the facial expression 3D model generation unit, compares the facial expression in the predictive facial expression rendering image input from the facial expression 3D model prediction unit and the facial expression in the facial image selected by the input data selection unit, and generates actual person facial expression fidelity level information indicating a facial expression similarity between the two facial expressions.

(10) The image processing device according to (9), further including:

a reprocessing priority facial expression list generation unit that, on the basis of the actual person facial expression fidelity level information generated by the facial expression fidelity verification unit, generates a reprocessing priority facial expression list including a facial expression identification number identifying a facial expression of the subject such that the actual person facial expression fidelity level is low in an order, and outputs the reprocessing priority facial expression list to the input data selection unit.

(11) The image processing device according to (10), wherein on the basis of the reprocessing priority facial expression list input from the reprocessing priority facial expression list generation unit, the input data selection unit reobtains, and outputs to the facial expression 3D model generation unit, an already-obtained facial image and feature information to be reprocessed.

(12) The image processing device according to any one of (7) to (11), wherein the facial expression 3D model prediction unit inputs a 3D model generated by the facial expression 3D model generation unit, and generates the predictive facial expression 3D model and the predictive facial expression rendering image using the 3D model input.

(13) The image processing device according to any one of (2) to (4), further including:

a subject state determination/display unit that compares the facial image of the subject shot by the image capturing unit with the standard data and determines whether or not a position and orientation of a face of the subject is appropriate.

(14) The image processing device according to (13), wherein the subject state determination/display unit generates subject state determination information indicating whether or not the position and the orientation of the face of the subject are appropriate, and outputs the subject state determination information to a display unit.

(15) The image processing device according to any one of (7) to (12), wherein the facial expression 3D model generation unit:

executes quality analysis processing of analyzing a quality of a shape and a texture included in the predictive facial expression 3D model input from the facial expression 3D model prediction unit, and a quality of a shape and a texture included in the facial expression 3D model generated by the facial expression 3D model generation unit; and selects a shape and a texture to use to generate a 3D model in accordance with a result of the quality analysis processing.

(16) The image processing device according to (15), wherein as the quality analysis processing, the facial expression 3D model generation unit:

generates a rewriting-rendering image of a 3D model using a plurality of pieces of shape and texture combination data generated from a plurality of shapes and a plurality of textures among (a) a plurality of shapes and a plurality of textures included in the predictive facial expression 3D model input from the facial expression 3D model prediction unit and (b) a plurality of shapes and a plurality of textures included in the facial expression 3D model generated by the facial expression 3D model generation unit; and executes analysis processing on an artifact included in the writing-rendering image generated.

(17) The image processing device according to any one of (1) to (16), wherein the facial expression 3D model generation unit:

inputs a moving image of a change in a facial expression of the subject; generates facial expression change texture time-series information on the basis of the moving image; and outputs a blendshape-use 3D model that is a plurality of facial expression 3D models having slightly different facial expressions by applying the facial expression change texture time-series information generated.

(18) The image processing device according to (17), wherein the facial expression 3D model generation unit:

inputs a moving image of a change in a facial expression from a facial expression in standard data of a 3D model of the subject held in a storage unit;

generates facial expression change texture time-series information on the basis of the moving image; and outputs a blendshape-use 3D model that is a plurality of facial expression 3D models having slightly different facial expressions from the facial expression of the standard data by applying the facial expression change texture time-series information generated.

(19) An image processing method executed by an image processing device, the method including:

a facial feature information detection unit analyzing a facial image of a subject shot by an image capturing unit and detecting facial feature information;

an input data selection unit selecting, from a plurality of facial images shot by the image capturing unit and a plurality of pieces of facial feature information corresponding to the plurality of facial images, a set of a facial image and feature information optimal for generating a 3D model; and a facial expression 3D model generation unit generating a 3D model using the facial image and the feature information selected by the input data selection unit.

(20) A program that causes an image processing device to execute image processing, the program causing:

a facial feature information detection unit to analyze a facial image of a subject shot by an image capturing unit and detect facial feature information;

an input data selection unit to select, from a plurality of facial images shot by the image capturing unit and a plurality of pieces of facial feature information corresponding to the plurality of facial images, a set of a facial image and feature information optimal for generating a 3D model; and a facial expression 3D model generation unit to generate a 3D model using the facial image and the feature information selected by the input data selection unit.

Note that the series of processing described in the specification can be executed by hardware, software, or a composite configuration of both. When processing according to software is executed, a program in which a processing sequence has been recorded can be installed in a memory in a computer incorporated in dedicated hardware and executed or installed in a general-purpose computer capable of executing various types of processing and executed. For example, the program can be recorded in a recording medium in advance. In addition to installation of the program in a computer from a recording medium, the program can be received through a network such as a local area network (LAN) and the Internet and installed in a recording medium such as an embedded hard disk.

Additionally, various types of processing described in the description may be not only chronologically executed according to description but also executed in parallel or individually according to processing capability of a device that execute the processing or as necessary. In addition, in the present description, a system is a set of logical components of a plurality of devices and it does not matter whether or not all the components are arranged in a single housing.

INDUSTRIAL APPLICABILITY

As described above, according to the configuration of an embodiment of the present disclosure, a device and method that enable highly accurate and efficient three-dimensional model generation processing are realized.

Specifically, for example, the device includes: a facial feature information detection unit that analyzes a facial image of a subject shot by an image capturing unit and detects facial feature information; an input data selection unit that selects, from a plurality of facial images shot by the image capturing unit and a plurality of pieces of facial feature information corresponding to the plurality of facial images, a set of a facial image and feature information optimal for generating a 3D model; and a facial expression 3D model generation unit that generates a 3D model using the facial image and the feature information selected by the input data selection unit. As the data optimal for generating a 3D model, the input data selection unit selects, for example, a facial image having feature information with a large change from standard data constituted by an expressionless 3D model and high reliability, as well as feature information.

Through this configuration, a device and method that enable highly accurate and efficient three-dimensional model generation processing are realized. Furthermore, by checking the quality of the various types of data generated internally, it is possible to generate data with fewer breakdowns.

REFERENCE SIGNS LIST

10 User (subject)
20 Image capturing unit (capture unit)
30 Display unit (display)
50 Storage unit
51 Standard data
52 Facial expression 3D model
100 Image processing device
110 Facial feature information detection unit
111 Facial feature point detection unit
112 Facial expression action feature detection unit
113 Facial feature information multiplexing unit
116 Facial orientation information detection unit
117 Facial position information detection unit
120 Subject state determination/display unit
121 Facial orientation information detection unit
122 Facial position information detection unit
123 Facial expression attitude determination unit
124 Abnormal state display information generation unit
125 Display timing adjustment unit
131 Attitude information separating unit
132 Facial expression action feature information extraction unit
133 Facial expression change degree setting unit
134 Facial orientation abnormality degree calculation unit
135 Facial position abnormality degree calculation unit
140 Input data selection unit
141 Facial feature information buffer unit
142 Input capture signal buffer unit
143 Facial feature point detection status analysis unit
144 Facial expression action correspondence AU (action unit) extraction unit
145 Target facial expression data selection unit
146 Reprocessing priority facial feature information storage unit
147 Reprocessing priority input capture signal storage unit
148 Feature information switching unit
149 Input capture signal switching unit
150 Facial expression 3D model prediction unit
151 Facial expression shape predictive generation unit
152 Facial expression texture predictive generation unit
153 Facial expression rendering unit
154 Predictive facial expression 3D model multiplexing unit
160 Facial expression fidelity verification unit
161 Facial expression action feature detection unit
162 Facial image difference degree calculation unit
163 Facial expression difference degree calculation unit
164 Actual person facial expression fidelity level calculation unit
165 Facial expression substitution determination unit
170 Facial expression 3D model generation unit
171 Facial expression shape generation unit 172 Facial expression texture generation unit
173 Facial expression 3D model multiplexing unit
174 Output switching unit
175 Facial expression 3D model data compositing unit
180 Reprocessing priority facial expression list generation unit
181 Facial expression fidelity level sorting unit
182 Image buffering unit
241 Attitude information separating unit
242 Facial orientation information analysis unit
243 Facial position information analysis unit
281 Reenacting guide display image generation unit
300 Image processing device
301 Controller
302 ROM
303 RAM
304 Bus
305 Input/output interface
306 Input unit
307 Output unit
308 Storage unit
309 Communication unit
310 Drive
311 Removable medium

The invention claimed is:

1. An image processing device, comprising:
circuitry configured to:
acquire, from an image sensor, captured facial images, wherein each of the captured facial images includes a subject;
detect facial feature information of the captured facial images;
acquire, from a storage unit, a standard 3D model of the subject;
select, based on the facial feature information, an optimal facial image from the captured facial images, wherein the optimal facial image includes a first facial expression having a relatively large change from a second facial expression of standard data of the standard 3D model; and
generate a first 3D model based on the optimal facial image and the facial feature information of the optimal facial image.

2. The image processing device according to claim 1, wherein the standard 3D model is an expressionless 3D model of the subject.

3. The image processing device according to claim 1, wherein
the circuitry is configured to select, as the optimal facial image, a specific facial image having a relatively highest strength of an action unit (AU) among the captured facial images, and
the action unit being is basic action definition data of a face.

4. The image processing device according to claim 1, wherein the facial feature information of the optimal facial image has a highest reliability among the captured facial images.

5. The image processing device according to claim 4, wherein the circuitry is configured to:
analyze detection reliabilities of respective facial feature points of the facial feature information of the captured facial images; and
select the optimal facial image having the facial feature information including a facial feature point having a relatively highest detection reliability among the detection reliabilities of the respective facial feature points of the facial feature information of the captured facial images.

6. The image processing device according to claim 1, wherein the circuitry is further configured to:
generate a second 3D model and a predictive facial image using the standard 3D model, the optimal facial image and the facial feature information of the optimal facial image, wherein each of the second 3D model and the predictive facial image represents a predictive facial expression; and
output, when a predefined condition is satisfied, the second 3D model without generating the first 3D model.

7. The image processing device according to claim 6, wherein the circuitry is further configured to:
determine a similarity between a third facial expression of the predictive facial image and the first facial expression of the optimal facial image
output, when the similarity satisfies the predefined condition, the second 3D model without generating the first 3D model.

8. The image processing device according to claim 6, wherein the circuitry is further configured to generate the second 3D model based on the first 3D model.

9. The image processing device according to claim 1, wherein the circuitry is further configured to:
determine a state of the subject based on the captured facial images and the standard 3D model; and
determine whether or not a position and an orientation of a face of the subject is appropriate.

10. The image processing device according to claim 9, wherein the circuitry is further configured to output the determined state of the subject to a display screen.

11. The image processing device according to claim 6, wherein the circuitry is further configured to:
acquire lighting information of the captured facial images;
analyze a first quality of a shape and a texture of the first 3D model and a second quality of a shape and a texture of the second 3D model; and
generate, based on the first quality, the second quality and the lighting information, a 3D model to which a modification is applicable.

12. The image processing device according to claim 1, wherein
the captured facial images represent a first moving image that includes a change of a facial expression of the subject;
generate first time-series texture information based on the first moving image, wherein the first time-series texture information represents the change of the facial expression of the subject; and
output, based on the first time-series texture information, a 3D model for blendshape that is a plurality of facial expression 3D models having slightly different facial expressions.

13. The image processing device according to claim 12, wherein the circuitry is further configured to:
acquire, from the storage unit, a second moving image of the standard 3D model including the change of the facial expression of the subject;
generate second time-series texture information based on the the second moving image, wherein the second time-series texture information represents the change of the facial expression of the subject; and
output, based on the second time-series texture information, the 3D model for blendshape that is the plurality of facial expression 3D models having the slightly different facial expressions from the facial expression of the standard data.

14. An image processing method, comprising:
acquiring, from an image sensor, captured facial images, wherein each of the captured facial images includes a subject;
detecting facial feature information of the captured facial images;
acquiring, from a storage unit, a standard 3D model of the subject;
selecting, based on the facial feature information, an optimal facial image from the captured facial images, wherein the optimal facial image includes a first facial expression having a relatively large change from a second facial expression of standard data of the standard 3D model; and
generating a first 3D model based on the optimal facial image and the facial feature information of the optimal facial image.

15. A non-transitory computer-readable medium having stored thereon, computer-executable instructions which, when executed by a computer, cause the computer to execute operations, the operations comprising:
acquiring, from an image sensor, captured facial images, wherein each of the captured facial images includes a subject
detecting facial feature information of the captured facial images;
acquiring, from a storage unit, a standard 3D model of the subject:
selecting, based on the facial feature information, an optimal facial image from the captured facial images, wherein the optimal facial image includes a first facial expression having a relatively large change from a second facial expression of standard data of the standard 3D model; and
generating a first 3D model based on the optimal facial image and the facial feature information of the optimal facial image.

* * * * *